(12) United States Patent
Shirakami et al.

(10) Patent No.: US 10,467,361 B2
(45) Date of Patent: Nov. 5, 2019

(54) STRETCH FLANGE CRACK PREDICTION METHOD, STRETCH FLANGE CRACK PREDICTION APPARATUS, COMPUTER PROGRAM, AND RECORDING MEDIUM

(71) Applicant: NIPPON STEEL & SUMITOMO METAL CORPORATION, Tokyo (JP)

(72) Inventors: Satoshi Shirakami, Amagasaki (JP); Hiroshi Yoshida, Chiba (JP); Takashi Miyagi, Tokai (JP); Jun Nitta, Futtsu (JP); Tohru Yoshida, Chiba (JP)

(73) Assignee: NIPPON STEEL CORPORATION, Tokyo (JP)

( * ) Notice: Subject to any disclaimer, the term of this patent is extended or adjusted under 35 U.S.C. 154(b) by 272 days.

(21) Appl. No.: 15/322,409

(22) PCT Filed: Jul. 2, 2015

(86) PCT No.: PCT/JP2015/069129
§ 371 (c)(1),
(2) Date: Dec. 27, 2016

(87) PCT Pub. No.: WO2016/002880
PCT Pub. Date: Jan. 7, 2016

(65) Prior Publication Data
US 2018/0107772 A1 Apr. 19, 2018

(30) Foreign Application Priority Data
Jul. 2, 2014 (JP) .................................. 2014-137185

(51) Int. Cl.
*G06F 17/50* (2006.01)
*B21D 22/00* (2006.01)
*B21D 22/20* (2006.01)

(52) U.S. Cl.
CPC ......... *G06F 17/5018* (2013.01); *B21D 22/00* (2013.01); *B21D 22/201* (2013.01); *G06F 2217/16* (2013.01); *G06F 2217/42* (2013.01)

(58) Field of Classification Search
None
See application file for complete search history.

(56) References Cited

U.S. PATENT DOCUMENTS

2010/0121621 A1\* 5/2010 Uenishi ............... G06F 17/5095
703/2

FOREIGN PATENT DOCUMENTS

| CN | 102262688 A | 11/2011 |
|---|---|---|
| CN | 102565072 A | 7/2012 |

(Continued)

OTHER PUBLICATIONS

Zheng et al. "A Comparison of Models for Ductile Fracture Prediction in Forging Processes" Computer Methods in Materials Science vol. 7, 2007, No. 4, pp. 389-396. (Year: 2007).\*

(Continued)

*Primary Examiner* — Suzanne Lo
(74) *Attorney, Agent, or Firm* — Birch, Stewart, Kolasch & Birch, LLP

(57) ABSTRACT

A stretch flange crack prediction method of predicting initiation of stretch flange cracks that occurs in a flange end section during stretch flange forming of a deformable sheet, includes: a measurement value acquisition process of acquiring, for each of a plurality of sheet-shaped test pieces, a fracture strain measurement value, a normal strain gradient measurement value, and a circumferential strain gradient measurement value; a CAE analysis process of acquiring a maximum major strain maximum element having a highest maximum major strain, a normal strain gradient of the maximum major strain maximum element, and a circumfer- (Continued)

ential strain gradient of the maximum major strain maximum element; a fracture determination threshold acquisition process of acquiring a fracture determination threshold by converting the fracture strain measurement value; and a prediction process of predicting that stretch flange cracks will be initiated, when the maximum major strain is equal to or higher than the fracture determination threshold.

21 Claims, 25 Drawing Sheets

(56) References Cited

FOREIGN PATENT DOCUMENTS

| | | |
|---|---|---|
| CN | 103105477 A | 5/2013 |
| JP | 2001-76022 A | 3/2001 |
| JP | 2009-61477 A | 3/2009 |
| JP | 2011-43452 A | 3/2011 |
| JP | 2011-83813 A | 4/2011 |
| JP | 2011-140046 A | 7/2011 |
| JP | 2011-147949 A | 8/2011 |
| JP | 2011-245554 A | 12/2011 |

OTHER PUBLICATIONS

Istiwatari et al. "Press Forming Analysis Contributing to the Expansion of High Strength Steel Sheet Applications" JFE Technical Report, No. 18, Mar. 2013, pp. 96-102. (Year: 2013).*
Extended European Search Report, dated Feb. 1, 2018, for corresponding European Application No. 15815590.3.
Ishiwatari et al., "Press Forming Analysis Contributing to the Expansion of High Strength Steel Sheet Applications," JFE Technical Report, vol. 18, Mar. 31, 2013, pp. 96-102, XP055235424.
Yoshida et al., "Evaluation Method of Stretch Flange-ability by Strain Concentration and Strain Gradient," International Deep Drawing Research Group, IDDRG 2013 Conference, Zurich, Switzerland, Jun. 2-5, 2013, pp. 401-406, XP055443006.
Chinese Office Action and Search Report for counterpart Chinese Application No. 201580034909.1, dated Dec. 22, 2017, with an English translation of the Search Report.
International Search Report (Form PCT/ISA/210) for International Application No. PCT/JP2015/069129, dated Sep. 29, 2015, with an English translation.
Yoshida et al., "Evaluation and Improving Method of Stretch Flange-ability," Nippon Steel Technical Report, 2012, No. 393, pp. 18-24, with an English abstract.

* cited by examiner

TYPE 1

TYPE 2

TYPE 3

TYPE 4

TYPE 5

TYPE 6

STRETCH FLANGE CRACK PREDICTION METHOD, STRETCH FLANGE CRACK PREDICTION APPARATUS, COMPUTER PROGRAM, AND RECORDING MEDIUM

TECHNICAL FIELD OF THE INVENTION

The present invention relates to a stretch flange crack prediction method, a stretch flange crack prediction apparatus, a computer program, and a recording medium capable of accurately predicting initiation of stretch flange cracks that occurs in a flange end section during stretch flange forming of a deformable sheet.

Priority is claimed on Japanese Patent Application No. 2014-137185, filed on Jul. 2, 2014, the content of which is incorporated herein by reference.

RELATED ART

Hitherto, vehicle components or other components have been manufactured by press-forming deformable sheets (for example, 270 to 1470 MPa grade high strength steel sheets). However, there may be cases where cracks are initiated in an end section of a formed component during press forming depending on the material of the deformable sheet, component shape, forming conditions, and the like.

In-plane cracks initiated in a deformable sheet during drawing or forming can be evaluated by a sheet thickness decrease evaluation method or a forming limit diagram (FLD) (for example, refer to Patent Documents 1 to 3). However, since cracks initiated in the end section of the formed product are significantly influenced by the properties of the end section or a strain distribution of the surrounding area of the end section, an applicable degree of accuracy cannot be achieved during the evaluation by the existing evaluation methods disclosed in Patent Documents 1 to 3.

In a case where a deformable sheet is press-formed into a three-dimensional curved shape, high tensile stress occurs in the inner surface of the three-dimensional curved shape, and cracks called "stretch flange cracks" are likely to occur. Specifically, when a flat deformable sheet as illustrated in FIG. 1(a) is press-formed into a three-dimensional curved shape which has a hat-shaped cross-section and includes a flange section as illustrated in FIG. 1(b), a significant stretch greater than a uniform stretch of the material of the deformable sheet occurs in the flange section having a particularly flexible end section shape (portions A to D enclosed by dotted lines in FIG. 1). As a result, high tensile stress occurs on the inside of the flange section, and thus stretch flange cracks are likely to be initiated. This tendency is significant in a case where a high strength steel sheet having insufficient ductility is press-formed into a three-dimensional curved shape.

The applicant found that in order to predict a state of initiation of stretch flange cracks, the maximum major strain (a strain in a direction in which the strain is highest in a certain element) in an end section of a formed product as well as the strain gradient of the surrounding area thereof needs to be considered, and suggested a flange crack analysis method in Patent Document 4. According to the flange crack analysis method disclosed in Patent Document 4, a state of initiation of flange cracks can be analyzed after the strain gradient is considered. In addition, prediction analysis can be performed within a shorter period of time.

In addition, the applicant suggested a fracture strain specification method of a sheet-shaped material in Patent Document 5, in which the fracture strain during stretch flange forming can be accurately specified. According to the fracture strain specification method disclosed in Patent Document 5, the fracture strain of a flange end section during stretch flange forming is specified by a function or map of a strain gradient (normal strain gradient) from the end section of a steel sheet toward the inside and a strain concentration gradient (circumferential strain gradient) along the end section of the steel sheet, thereby predicting the presence or absence of fracture initiation.

However, in Patent Documents 4 and 5, a method of obtaining a threshold for determining the presence or absence of fracture initiation with high accuracy is not disclosed, and a phenomenon in which there is fracturing at a point at which fracturing has not been predicted, or a phenomenon in which there is no fracturing in practice at a point at which fracturing has been predicted may occur.

PRIOR ART DOCUMENT

Patent Document

[Patent Document 1] Japanese Unexamined Patent Application, First Publication No. 2001-076022
[Patent Document 2] Japanese Unexamined Patent Application, First Publication No. 2009-061477
[Patent Document 3] Japanese Unexamined Patent Application, First Publication No. 2011-245554
[Patent Document 4] Japanese Unexamined Patent Application, First Publication No. 2011-083813
[Patent Document 5] Japanese Unexamined Patent Application, First Publication No. 2011-140046

DISCLOSURE OF THE INVENTION

Problems to be Solved by the Invention

As described above, a prediction method of accurately predicting stretch flange cracks is required. However, a highly accurate prediction method that can be used at a practical level has not been obtained.

An object of the present invention is to provide a stretch flange crack prediction method, a stretch flange crack prediction apparatus, a computer program, and a recording medium capable of accurately predicting initiation of stretch flange cracks that occurs in a flange end section during stretch flange forming of a deformable sheet.

Means for Solving the Problem

The gist of the present invention is as follows.

(1) According to a first aspect of the present invention, a stretch flange crack prediction method of predicting initiation of stretch flange cracks that occurs in a flange end section during stretch flange forming of a deformable sheet, includes: a measurement value acquisition process of acquiring, for each of a plurality of sheet-shaped test pieces, under an experimental measurement environment with a predetermined gauge length and a predetermined gradient evaluation length, a fracture strain measurement value, a normal strain gradient measurement value, and a circumferential strain gradient measurement value; a CAE analysis process of acquiring, on the basis of forming data regarding the flange end section obtained through numerical analysis by a finite element method of a stretch flange forming process of the deformable sheet, under a CAE analysis measurement environment with a predetermined element size and a predetermined gradient evaluation length, a maximum major strain maximum element having a highest maximum major strain, a normal strain gradient of the maximum major strain maximum element, and a circumferential strain gradient of the maximum major strain maximum element; a fracture determination threshold acquisition process of acquiring a fracture determination threshold by converting the fracture strain measurement value obtained by the measurement value acquisition process under the experimental measurement environment, on the basis of, in addition to the normal strain gradient measurement value and the circumferential strain gradient measurement value, the element size, the gradient evaluation length, the normal strain gradient, and the circumferential strain gradient in the CAE analysis process; and a prediction process of predicting that stretch flange cracks will be initiated, when the maximum major strain is equal to or higher than the fracture determination threshold by comparing the maximum major strain of the maximum major strain maximum element and the fracture determination threshold to each other.

(2) The stretch flange crack prediction method described in (1), may further include: a fracture strain function acquisition process of acquiring a fracture strain function to define a fracture strain, using the normal strain gradient and the circumferential strain gradient as variables, on the basis of the fracture strain measurement value, the normal strain gradient measurement value, and the circumferential strain gradient measurement value obtained in the measurement value acquisition process, in which, in the fracture determination threshold acquisition process, the fracture determination threshold is acquired by converting the fracture strain function according to the CAE analysis measurement environment on the basis of the following Expressions (1) to (4).

$$\varepsilon_{1(CAE)}{}^{*}=f(\varepsilon_{1(exp)}{}^{*},GL,L_{s(exp)},\Delta\varepsilon_{N(exp)},\Delta\varepsilon_{C(exp)},ES,L_{s(CAE)},\Delta\varepsilon_{N(CAE)},\Delta\varepsilon_{C(CAE)})$$ Expression (1)

$$\varepsilon_{1(exp)}{}^{*}=f(\Delta\varepsilon_{N(exp)},\Delta\varepsilon_{C(exp)})$$ Expression (2)

$$\Delta\varepsilon_{N(exp)}=f(GL,L_{s(exp)},\Delta\varepsilon_{C(exp)},\varepsilon_{(CAE)},ES,L_{s(CAE)},\Delta\varepsilon_{N(CAE)},\Delta\varepsilon_{C(CAE)})$$ Expression (3)

$$\Delta\varepsilon_{C(exp)}=f(GL,L_{s(exp)},\Delta\varepsilon_{N(exp)},\varepsilon_{(CAE)},ES,L_{s(CAE)},\Delta\varepsilon_{N(CAE)},\Delta\varepsilon_{C(CAE)})$$ Expression (4)

here, $\varepsilon_{1(CAE)}{}^{*}$ is the fracture determination threshold, $\varepsilon_{1(exp)}{}^{*}$ is the fracture strain measurement value acquired in the measurement value acquisition process, GL is the gauge length used in the measurement value acquisition process, $L_{S(exp)}$ is the gradient evaluation length used in the measurement value acquisition process, $\Delta\varepsilon_{N(exp)}$ is the normal strain gradient measurement value acquired in the measurement value acquisition process, $\Delta\varepsilon_{C(exp)}$ is the circumferential strain gradient measurement value acquired in the measurement value acquisition process, $\varepsilon_{(CAE)}$ is the maximum major strain of the maximum major strain maximum element, ES is the element size used in the CAE analysis process, $L_{S(CAE)}$ is the gradient evaluation length used in the CAE analysis process, $\Delta\varepsilon_{N(CAE)}$ is the normal strain gradient acquired in the CAE analysis process, and $\Delta\varepsilon_{C(CAE)}$ is the circumferential strain gradient acquired in the CAE analysis process.

(3) The stretch flange crack prediction method described in (1), may further include: a fracture strain function acquisition process of acquiring a fracture strain function to define a fracture strain, using the normal strain gradient and the circumferential strain gradient as variables, on the basis of the fracture strain measurement value, the normal strain gradient measurement value, and the circumferential strain gradient measurement value obtained in the measurement value acquisition process, in which, in the fracture determination threshold acquisition process, the fracture determination threshold is acquired by converting the fracture strain function according to the CAE analysis measurement environment on the basis of the following Expressions (5) to (8).

$$\varepsilon_{1(CAE)}{}^{*}=f(\varepsilon_{1(exp)}{}^{*},GL,L_{s(exp)},\Delta\varepsilon_{N(exp)},\Delta\varepsilon_{C(exp)},ES,L_{s(CAE)},\Delta\varepsilon_{N(CAE)},\Delta\varepsilon_{C(CAE)})$$ Expression (5)

$$\varepsilon_{1(exp)}{}^{*}=f(\Delta\varepsilon_{N(exp)},\Delta\varepsilon_{C(exp)},Cl_{(exp)},Cl_{(CAE)})$$ Expression (6)

$$\Delta\varepsilon_{N(exp)}=f(GL,L_{s(exp)},\Delta\varepsilon_{C(exp)},\varepsilon_{(CAE)},ES,L_{s(CAE)},\Delta\varepsilon_{N(CAE)},\Delta\varepsilon_{C(CAE)})$$ Expression (7)

$$\Delta\varepsilon_{C(exp)}=f(GL,L_{s(exp)},\Delta\varepsilon_{N(exp)},\varepsilon_{(CAE)},ES,L_{s(CAE)},\Delta\varepsilon_{N(CAE)},\Delta\varepsilon_{C(CAE)})$$ Expression (8)

here, $\varepsilon_{1(CAE)}{}^{*}$ is the fracture determination threshold, $\varepsilon_{1(exp)}{}^{*}$ is the fracture strain measurement value acquired in the measurement value acquisition process, GL is the gauge length used in the measurement value acquisition process, $L_{S(exp)}$ is the gradient evaluation length used in the measurement value acquisition process, $Cl_{(exp)}$ is a processing condition when the sheet-shaped test pieces are obtained, $\Delta\varepsilon_{N(exp)}$ is the normal strain gradient measurement value acquired in the measurement value acquisition process, $\Delta\varepsilon_{C(exp)}$ is the circumferential strain gradient measurement value acquired in the measurement value acquisition process, $\varepsilon_{(CAE)}$ is the maximum major strain of the maximum major strain maximum element, ES is the element size used in the CAE analysis process, $L_{S(CAE)}$ is the gradient evaluation length used in the CAE analysis process, $Cl_{(CAE)}$ is a processing condition when the deformable sheet is obtained, $\Delta\varepsilon_{N(CAE)}$ is the normal strain gradient acquired in the CAE analysis process, and $\Delta\varepsilon_{C(CAE)}$ is the circumferential strain gradient acquired in the CAE analysis process.

(4) The stretch flange crack prediction method described in (1), may further include: a strain distribution data acquisition process of acquiring, for each of the plurality of sheet-shaped test pieces, strain distribution data representing a correlation among the fracture strain measurement value, the normal strain gradient measurement value, and the circumferential strain gradient measurement value obtained in the measurement value acquisition process, in which, in the fracture determination threshold acquisition process, the strain distribution data is processed according to the CAE analysis measurement environment, a fracture determination curved surface is generated by using the processed strain distribution data, and the fracture determination threshold is acquired from the fracture determination curved surface.

(5) In the stretch flange crack prediction method described in (4), in the fracture determination threshold acquisition process, a strain distribution function of the following Expression (9) may be used as the strain distribution data.

$$\varepsilon=f(B_N,C_N,B_C,C_C,\varepsilon_0)$$ Expression (9)

here, $\varepsilon_0$ is the maximum major strain, $B_N$ is a material parameter representing a broadening size of the vicinity of a peak in a normal direction, $C_N$ is a material parameter representing a severity of a gradient in the normal direction, $B_C$ is a material parameter representing a broadening size of the vicinity of a peak in a circumferential direction, and $C_C$ is a material parameter representing a severity of a gradient in the circumferential direction.

(6) The stretch flange crack prediction method described in (1), may further include: a strain distribution data acquisition process of acquiring, for each of the plurality of sheet-shaped test pieces, strain distribution data representing a correlation among the fracture strain measurement value, the normal strain gradient measurement value, and the circumferential strain gradient measurement value obtained in the measurement value acquisition process by using a plurality of sheet-shaped test pieces processed under a plurality of test piece processing conditions as the plurality of sheet-shaped test pieces, in which, in the fracture determination threshold acquisition process, the strain distribution data under the test piece processing conditions according to the CAE analysis measurement environment is processed according to the CAE analysis measurement environment, a fracture determination curved surface is generated by using the processed strain distribution data, and the fracture determination threshold is acquired from the fracture determination curved surface.

(7) In the stretch flange crack prediction method described in (1), the plurality of sheet-shaped test pieces may have end sections with notches having different shapes, and in the measurement value acquisition process, for each of the plurality of sheet-shaped test pieces, the fracture strain measurement value, the normal strain gradient measurement value, and the circumferential strain gradient measurement value may be measured and acquired while causing each of the plurality of sheet-shaped test pieces to fracture by applying in-plane tensile deformation and bending deformation so as to cause the notch to become a fractured portion.

(8) In the stretch flange crack prediction method described in (7), the shapes of the notches formed in the plurality of sheet-shaped test pieces may include at least a first notch shape having a relatively low normal strain gradient and a relatively low circumferential strain gradient, a second notch shape having a relatively high normal strain gradient and a relatively high circumferential strain gradient, a third notch shape having a relatively high normal strain gradient and a relatively low circumferential strain gradient, and a fourth notch shape having a relatively low normal strain gradient and a relatively high circumferential strain gradient.

(9) In the stretch flange crack prediction method described in (1), the fracture strain measurement value may be a measurement value of a fracture strain at a fractured portion of the sheet-shaped test piece, the normal strain gradient measurement value may be a measurement value of a strain gradient in an inward direction in the sheet-shaped test piece from the fractured portion, and the circumferential strain gradient measurement value may be a measurement value of a strain gradient in a direction along the end section of the sheet-shaped test piece from the fractured portion.

(10) In the stretch flange crack prediction method described in (1), the CAE analysis process may include: an element extraction process of extracting the maximum major strain maximum element having the maximum major strain from the forming data; an element array specification process of specifying, by using the maximum major strain maximum element as a reference element, an element array directed toward an inside of the deformable sheet from the flange end section and an element array along the flange end section, on the basis of an element selection algorithm; and a strain gradient calculation process of calculating, for the specified element array, the normal strain gradient of the maximum major strain maximum element and the circumferential strain gradient of the maximum major strain maximum element.

(11) According to a second aspect of the present invention, a stretch flange crack prediction apparatus for predicting initiation of stretch flange cracks that occurs in a flange end section during stretch flange forming of a deformable sheet, includes: a measurement value acquisition unit which acquires, for each of a plurality of sheet-shaped test pieces, under an experimental measurement environment with a predetermined gauge length and a predetermined gradient evaluation length, a fracture strain measurement value, a normal strain gradient measurement value, and a circumferential strain gradient measurement value; a CAE analysis unit which acquires, on the basis of forming data regarding the flange end section obtained through numerical analysis by a finite element method of a stretch flange forming process of the deformable sheet, under a CAE analysis measurement environment with a predetermined element size and a predetermined gradient evaluation length, a maximum major strain maximum element having a highest maximum major strain, a normal strain gradient of the maximum major strain maximum element, and a circumferential strain gradient of the maximum major strain maximum element; a fracture determination threshold acquisition unit which acquires a fracture determination threshold by converting the fracture strain measurement value obtained by the measurement value acquisition unit under the experimental measurement environment, on the basis of, in addition to the normal strain gradient measurement value and the circumferential strain gradient measurement value, the element size, the gradient evaluation length, the normal strain gradient, and the circumferential strain gradient in the CAE analysis unit; and a prediction unit which predicts that stretch flange cracks will be initiated, when the maximum major strain is equal to or higher than the fracture determination threshold by comparing the maximum major strain of the maximum major strain maximum element and the fracture determination threshold to each other.

(12) The stretch flange crack prediction apparatus described in (11), may further include: a fracture strain function acquisition unit which acquires a fracture strain function to define a fracture strain, using the normal strain gradient and the circumferential strain gradient as variables, on the basis of the fracture strain measurement value, the normal strain gradient measurement value, and the circumferential strain gradient measurement value obtained by the measurement value acquisition unit, in which the fracture determination threshold acquisition unit acquires the fracture determination threshold by converting the fracture strain function according to the CAE analysis measurement environment on the basis of the following Expressions (1) to (4).

$$\varepsilon_{1(CAE)}{}^* = f(\varepsilon_{1(exp)}{}^*, GL, L_{s(exp)}, \Delta\varepsilon_{N(exp)}, \Delta\varepsilon_{C(exp)}, ES, L_{s(CAE)}, \Delta\varepsilon_{N(CAE)}, \Delta\varepsilon_{C(CAE)}) \quad \text{Expression (1)}$$

$$\varepsilon_{1(exp)}{}^* = f(\Delta\varepsilon_{N(exp)}, \Delta\varepsilon_{C(exp)}) \quad \text{Expression (2)}$$

$$\Delta\varepsilon_{N(exp)} = f(GL, L_{s(exp)}, \Delta\varepsilon_{C(exp)}, \varepsilon_{(CAE)}, ES, L_{s(CAE)}, \Delta\varepsilon_{N(CAE)}, \Delta\varepsilon_{C(CAE)}) \quad \text{Expression (3)}$$

$$\Delta\varepsilon_{C(exp)} = f(GL, L_{s(exp)}, \Delta\varepsilon_{N(exp)}, \varepsilon_{(CAE)}, ES, L_{s(CAE)}, \Delta\varepsilon_{N(CAE)}, \Delta\varepsilon_{C(CAE)}) \quad \text{Expression (4)}$$

here, $\varepsilon_{1(CAE)}{}^*$ is the fracture determination threshold, $\varepsilon_{1(exp)}$ is the fracture strain measurement value acquired by the measurement value acquisition unit, GL is the gauge length used in the measurement value acquisition unit, $L_{S(exp)}$ is the gradient evaluation length used in the measurement value acquisition unit, $\Delta\varepsilon_{N(exp)}$ is the normal strain gradient measurement value acquired by the measurement value acquisition unit, $\Delta\varepsilon_{C(exp)}$ is the circumferential strain gradient measurement value acquired by the measurement value acquisition unit, $\varepsilon_{(CAE)}$ is the maximum major strain of the maximum major strain maximum element, ES is the element size used in the CAE analysis unit, $L_{S(CAE)}$ is the gradient evaluation length used in the CAE analysis unit, $\Delta\varepsilon_{N(CAE)}$ is the normal strain gradient acquired by the CAE analysis unit, and $\Delta\varepsilon_{C(CAE)}$ is the circumferential strain gradient acquired by the CAE analysis unit.

(13) The stretch flange crack prediction apparatus described in (11), may further include: a fracture strain function acquisition unit which acquires a fracture strain function to define a fracture strain, using the normal strain gradient and the circumferential strain gradient as variables, on the basis of the fracture strain measurement value, the normal strain gradient measurement value, and the circumferential strain gradient measurement value obtained by the measurement value acquisition unit, in which the fracture determination threshold acquisition unit acquires the fracture determination threshold by converting the fracture strain function according to the CAE analysis measurement environment on the basis of the following Expressions (5) to (8).

$$\varepsilon_{1(CAE)}{}^*=f(\varepsilon_{1(exp)}{}^*,GL,L_{s(exp)},\Delta\varepsilon_{N(exp)},\Delta\varepsilon_{C(exp)},ES,L_{s(CAE)},\Delta\varepsilon_{N(CAE)},\Delta\varepsilon_{C(CAE)}) \quad \text{Expression (5)}$$

$$\varepsilon_{1(exp)}{}^*=f(\Delta\varepsilon_{N(exp)},\Delta\varepsilon_{C(exp)},Cl_{(exp)},Cl_{(CAE)}) \quad \text{Expression (6)}$$

$$\Delta\varepsilon_{N(exp)}=f(GL,L_{s(exp)},\Delta\varepsilon_{C(exp)},\varepsilon_{(CAE)},ES,L_{s(CAE)},\Delta\varepsilon_{N(CAE)},\Delta\varepsilon_{C(CAE)}) \quad \text{Expression (7)}$$

$$\Delta\varepsilon_{C(exp)}=f(GL,L_{s(exp)},\Delta\varepsilon_{N(exp)},\varepsilon_{(CAE)},ES,L_{s(CAE)},\Delta\varepsilon_{N(CAE)},\Delta\varepsilon_{C(CAE)}) \quad \text{Expression (8)}$$

here, $\varepsilon_{1(CAE)}{}^*$ is the fracture determination threshold, $\varepsilon_{1(exp)}{}^*$ is the fracture strain measurement value acquired by the measurement value acquisition unit, GL is the gauge length used in the measurement value acquisition unit, $L_{S(exp)}$ is the gradient evaluation length used in the measurement value acquisition unit, $Cl_{(exp)}$ is a processing condition when the sheet-shaped test pieces are obtained, $\Delta\varepsilon_{N(exp)}$ is the normal strain gradient measurement value acquired by the measurement value acquisition unit, $\Delta\varepsilon_{C(exp)}$ is the circumferential strain gradient measurement value acquired by the measurement value acquisition unit, $\varepsilon_{(CAE)}$ is the maximum major strain of the maximum major strain maximum element, ES is the element size used in the CAE analysis unit, $L_{S(CAE)}$ is the gradient evaluation length used in the CAE analysis unit, $Cl_{(CAE)}$ is a processing condition when the deformable sheet is obtained, $\Delta\varepsilon_{N(CAE)}$ is the normal strain gradient acquired by the CAE analysis unit, and $\Delta\varepsilon_{C(CAE)}$ is the circumferential strain gradient acquired by the CAE analysis unit.

(14) The stretch flange crack prediction apparatus described in (11), may further include: a strain distribution data acquisition unit which acquires, for each of the plurality of sheet-shaped test pieces, strain distribution data representing a correlation among the fracture strain measurement value, the normal strain gradient measurement value, and the circumferential strain gradient measurement value obtained by the measurement value acquisition unit, in which the fracture determination threshold acquisition unit processes the strain distribution data according to the CAE analysis measurement environment, generates a fracture determination curved surface by using the processed strain distribution data, and acquires the fracture determination threshold from the fracture determination curved surface.

(15) In the stretch flange crack prediction apparatus described in (14), the fracture determination threshold acquisition unit may use a strain distribution function of the following Expression (9) as the strain distribution data.

$$\varepsilon=f(B_N,C_N,B_C,C_C,\varepsilon_0) \quad \text{Expression (9)}$$

here, $\varepsilon_0$ is the maximum major strain, $B_N$ is a material parameter representing a broadening size of the vicinity of a peak in a normal direction, $C_N$ is a material parameter representing a severity of a gradient in the normal direction, $B_C$ is a material parameter representing a broadening size of the vicinity of a peak in a circumferential direction, and $C_C$ is a material parameter representing a severity of a gradient in the circumferential direction.

(16) The stretch flange crack prediction apparatus described in (11), may further include: a strain distribution data acquisition unit which acquires, for each of the plurality of sheet-shaped test pieces, strain distribution data representing a correlation among the fracture strain measurement value, the normal strain gradient measurement value, and the circumferential strain gradient measurement value obtained by the measurement value acquisition unit by using a plurality of sheet-shaped test pieces processed under a plurality of test piece processing conditions as the plurality of sheet-shaped test pieces, in which the fracture determination threshold acquisition unit according to the CAE analysis measurement environment, processes the strain distribution data under the test piece processing conditions according to the CAE analysis measurement environment, generates a fracture determination curved surface by using the processed strain distribution data, and acquires the fracture determination threshold from the fracture determination curved surface.

(17) In the stretch flange crack prediction apparatus described in (11), the plurality of sheet-shaped test pieces may have end sections with notches having different shapes, and the measurement value acquisition unit may measure and acquire, for each of the plurality of sheet-shaped test pieces, the fracture strain measurement value, the normal strain gradient measurement value, and the circumferential strain gradient measurement value while causing each of the plurality of sheet-shaped test pieces to fracture by applying in-plane tensile deformation and bending deformation so as to cause the notch to become a fractured portion.

(18) In the stretch flange crack prediction apparatus described in (17), the shapes of the notches formed in the plurality of sheet-shaped test pieces may include at least a first notch shape having a relatively low normal strain gradient and a relatively low circumferential strain gradient, a second notch shape having a relatively high normal strain gradient and a relatively high circumferential strain gradient, a third notch shape having a relatively high normal strain gradient and a relatively low circumferential strain gradient, and a fourth notch shape having a relatively low normal strain gradient and a relatively high circumferential strain gradient.

(19) In the stretch flange crack prediction apparatus described in (11), the fracture strain measurement value may be a measurement value of a fracture strain at a fractured portion of the sheet-shaped test piece, the normal strain gradient measurement value may be a measurement value of a strain gradient in an inward direction in the sheet-shaped test piece from the fractured portion, and the circumferential strain gradient measurement value may be a measurement value of a strain gradient in a direction along the end section of the sheet-shaped test piece from the fractured portion.

(20) In the stretch flange crack prediction apparatus described in (11), the CAE analysis unit may include: an element extraction unit which extracts the maximum major strain maximum element having the maximum major strain from the forming data; an element array specification unit which specifies, by using the maximum major strain maximum element as a reference element, an element array directed toward an inside of the deformable sheet from the flange end section and an element array along the flange end section, on the basis of an element selection algorithm; and a strain gradient calculation unit which calculates, for the specified element array, the normal strain gradient of the maximum major strain maximum element and the circumferential strain gradient of the maximum major strain maximum element.

(21) According to a third aspect of the present invention, there is provided a program which causes the stretch flange crack prediction method described in (1) to be executed by the stretch flange crack prediction apparatus described in (11).

(22) According to a fourth aspect of the present invention, there is provided a computer-readable recording medium on which the program described in (21) is recorded.

Effects of the Invention

According to the present invention, a portion which will be fractured and a portion which will not be fractured during stretch flange forming of a deformable sheet can be accurately predicted.

BRIEF DESCRIPTION OF THE DRAWINGS

FIG. 1 is a view illustrating an aspect of press forming, in which FIG. 1(a) illustrates a deformable sheet (blank) before press forming, and FIG. 1(b) illustrates a three-dimensional curved shape before the press forming.

EMBODIMENTS OF THE INVENTION

The inventors intensively studied methods to solve the problems. As a result, the inventors found that (i) by focusing on the fact that in an inward direction from a flange end section (hereinafter, sometimes called a normal direction), stretch flange cracks are less likely to be initiated as the strain gradient of a maximum major strain increases, and in a direction along the flange end section (hereinafter, sometimes called a circumferential direction), stretch flange cracks are more likely to be initiated as the strain gradient of a maximum major strain increases, initiation of stretch flange cracks can be predicted by acquiring fracture strain measurement values associated with the strain gradients in the two directions from sheet-shaped test pieces, and (ii) by acquiring a fracture determination threshold through conversion of the fracture strain measurement value associated with the strain gradients in the two directions on the basis of information of CAE analysis and by comparing the fracture determination threshold to data of the maximum major strains obtained through CAE analysis, initiation of stretch flange cracks can be more accurately predicted.

The present invention has been made on the basis of the findings. Hereinafter, the present invention will be described in detail with reference to embodiments. In the present invention, stretch flange cracks can be predicted using a deformable sheet (plastically deformable material) in the present invention as a press forming object. However, in the following description, a steel sheet (steel) is exemplified.

Figure 1:
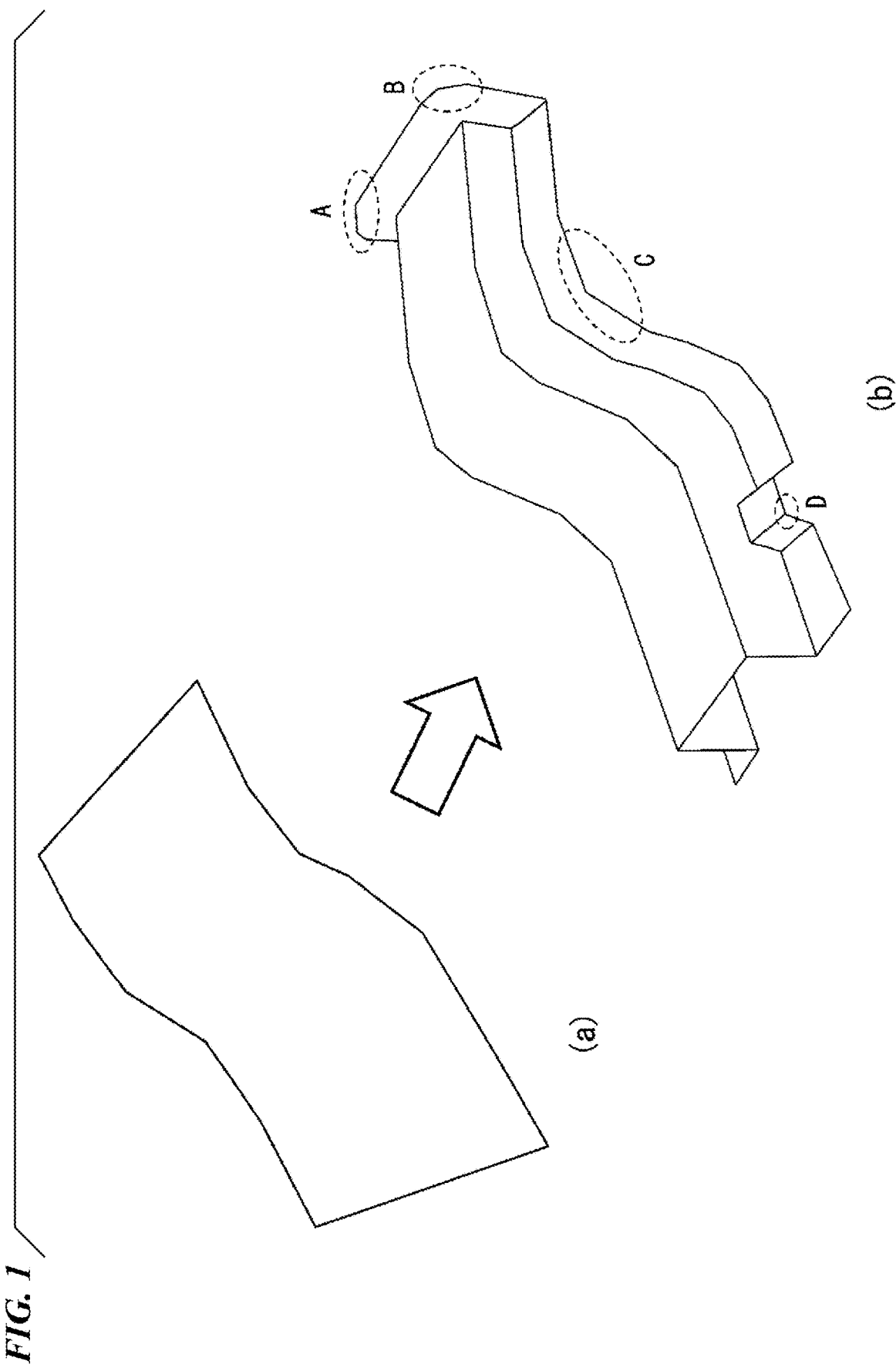
Figure 2:
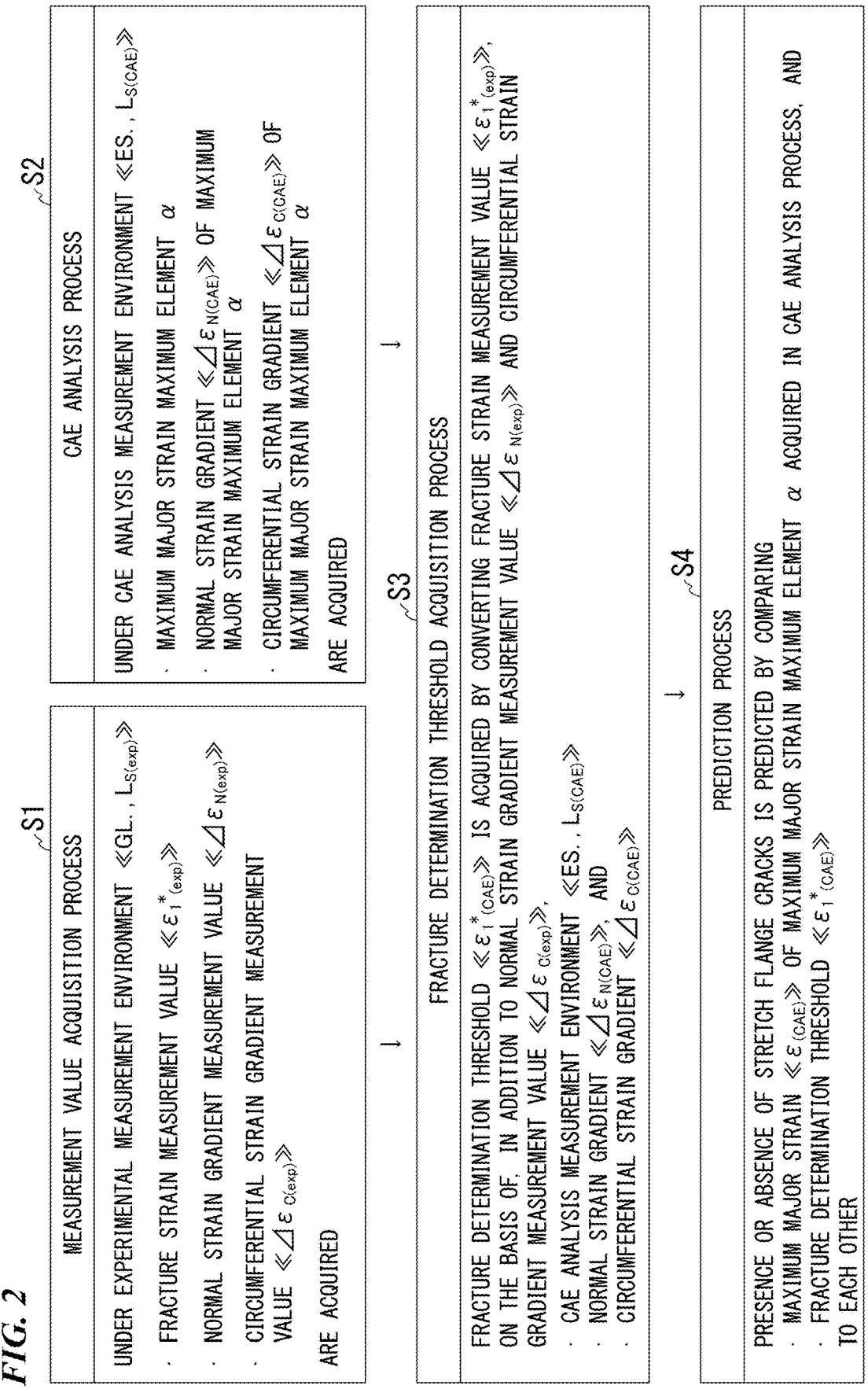
FIG. 2 is a view schematically showing main processes of a stretch flange crack prediction method according to a first embodiment of the present invention.

FIG. 2 schematically shows main processes of a stretch flange crack prediction method according to a first embodiment of the present invention.

The stretch flange crack prediction method according to this embodiment includes, as shown in FIG. 2, a measurement value acquisition process S1, a CAE analysis process S2, a fracture determination threshold acquisition process S3, and a prediction process S4. Hereinafter, each process will be described in detail.

(Measurement Value Acquisition Process S1)

In the measurement value acquisition process S1, under an experimental measurement environment with a predetermined gauge length GL and a predetermined gradient evaluation length $L_{S(exp)}$, for each of a plurality of sheet-shaped test pieces 1, a fracture strain measurement value $\varepsilon_{1(exp)}^{*}$ which is a measurement value of the fracture strain at a fractured portion of the sheet-shaped test piece 1, a normal strain gradient measurement value $\Delta\varepsilon_{N(exp)}$ which is a measurement value of a strain gradient in a normal direction from the fractured portion of the sheet-shaped test piece 1, and a circumferential strain gradient measurement value $\Delta\varepsilon_{C(exp)}$ which is a measurement value of a strain gradient in a circumferential direction from the fractured portion of the sheet-shaped test piece 1 are acquired.

As a method of acquiring the fracture strain measurement value $\varepsilon_{1(exp)}^{*}$, the normal strain gradient measurement value $\Delta\varepsilon_{N(exp)}$, and the circumferential strain gradient measurement value $\Delta\varepsilon_{C(exp)}$, for example, the plurality of sheet-shaped test pieces 1 having end sections with notches 6 having different shapes may be prepared, and strain may be measured while causing each of the sheet-shaped test pieces 1 to fracture by applying in-plane tensile deformation and bending deformation so as to cause the notch 6 to become the fractured portion.

The material of the sheet-shaped test piece 1 is preferably a kind of steel equivalent to the kind of steel of a steel sheet as an actual stretch flange crack prediction object, more preferably the same kind of steel.

The sheet-shaped test piece 1 may be produced by processing a sheet-shaped member in a processing method such as punching or laser processing under predetermined processing conditions (clearance conditions for punching, laser output conditions for laser processing, and the like).

(Side Bend Tester 10)

Figure 3:
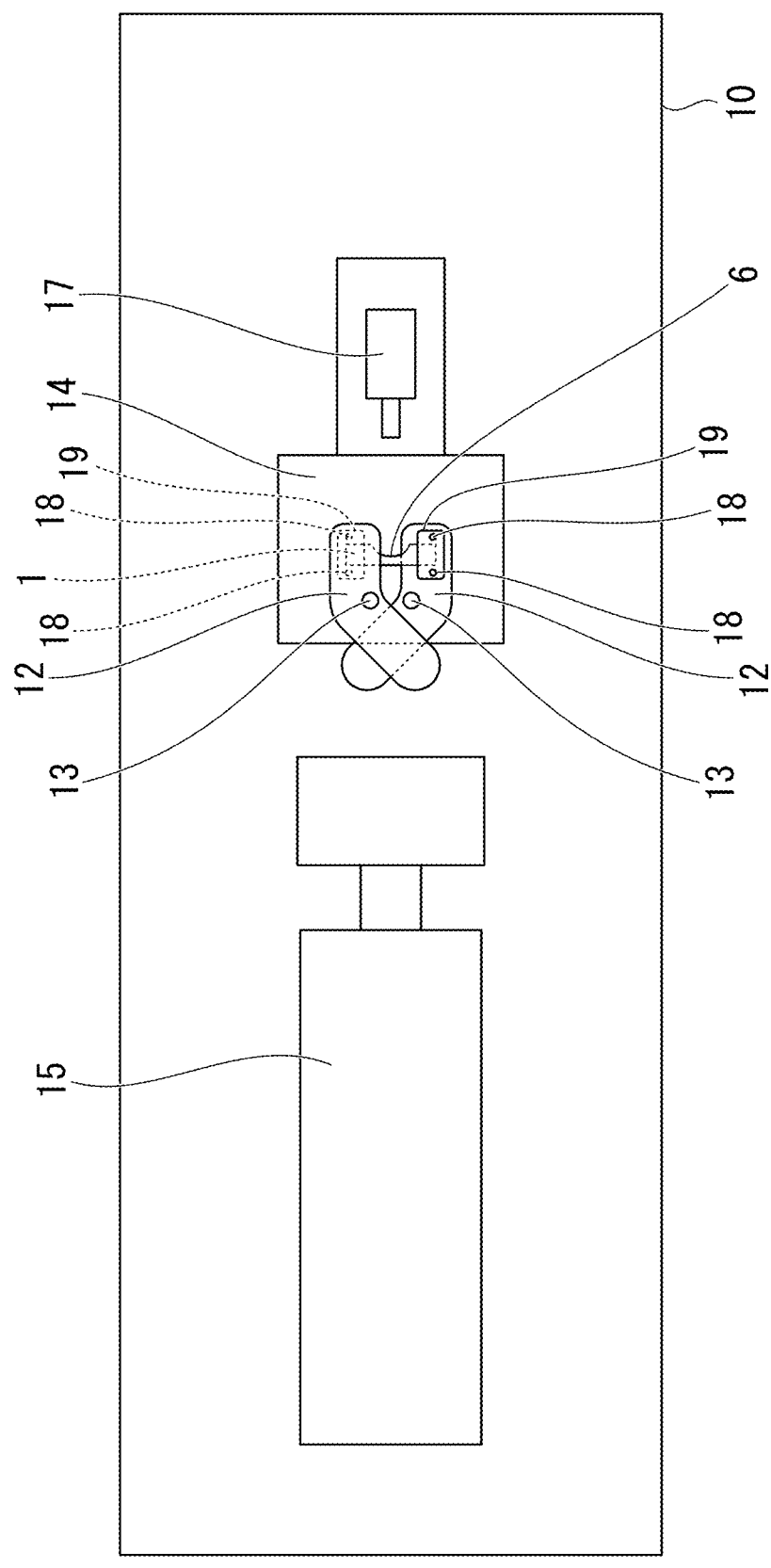
FIG. 3 is a plan view illustrating a state in which a sheet-shaped test piece 1 is mounted on a side bend tester 10.
Figure 4:
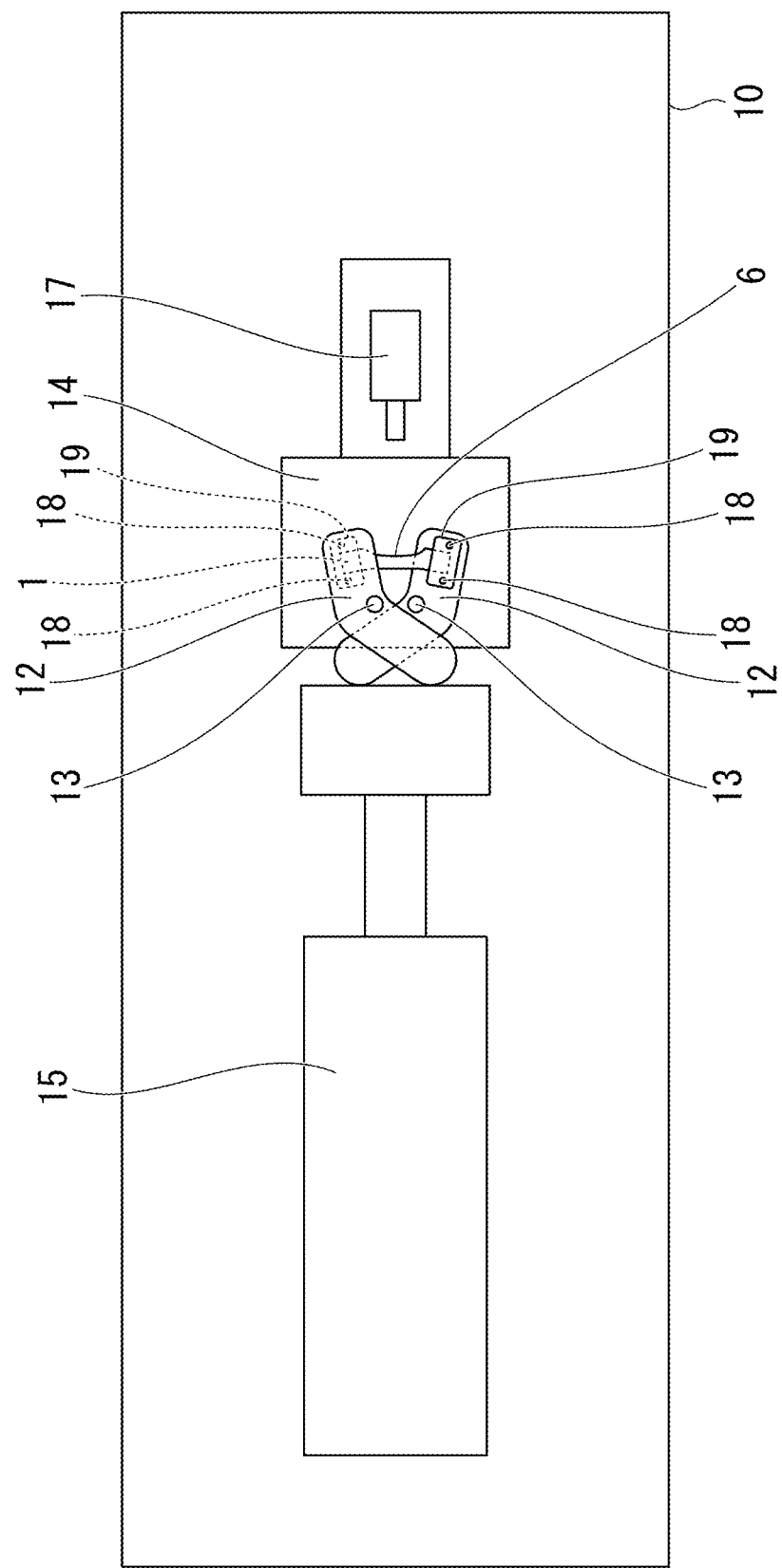
FIG. 4 is a plan view illustrating a state in which a strain is applied to the sheet-shaped test piece 1 by the side bend tester 10.
Figure 5A:
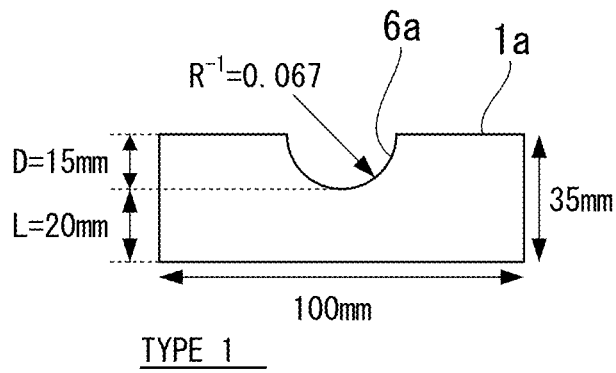
FIG. 5A is a plan view illustrating a sheet-shaped test piece 1a of a type 1.
Figure 5B:
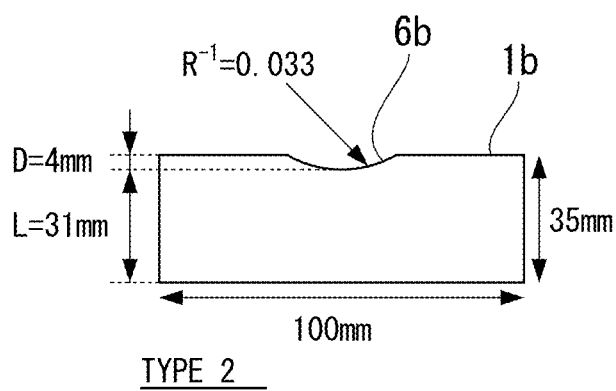
FIG. 5B is a plan view illustrating a sheet-shaped test piece 1b of a type 2.
Figure 5C:
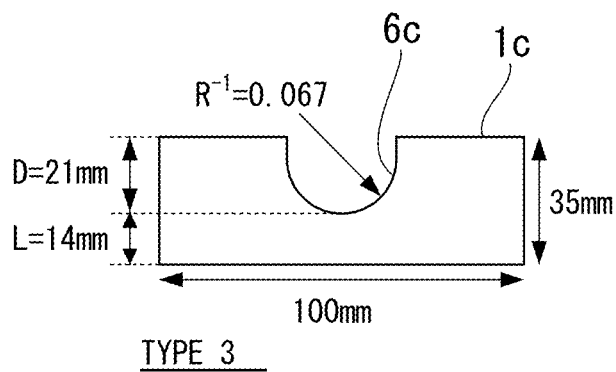
FIG. 5C is a plan view illustrating a sheet-shaped test piece 1c of a type 3.
Figure 5D:
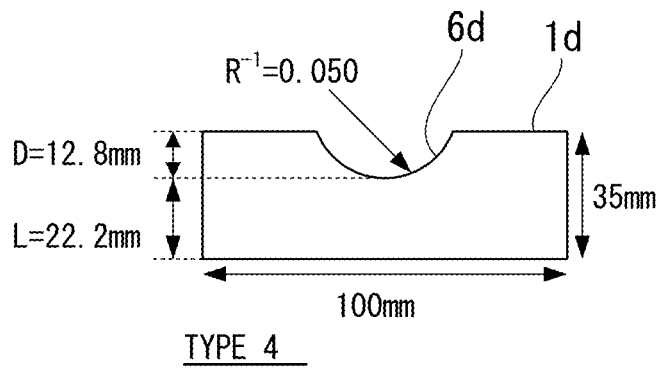
FIG. 5D is a plan view illustrating a sheet-shaped test piece 1d of a type 4.
Figure 5E:
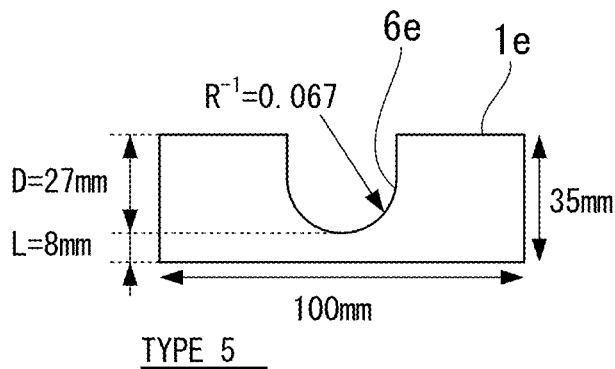
FIG. 5E is a plan view illustrating a sheet-shaped test piece 1e of a type 5.
Figure 5F:
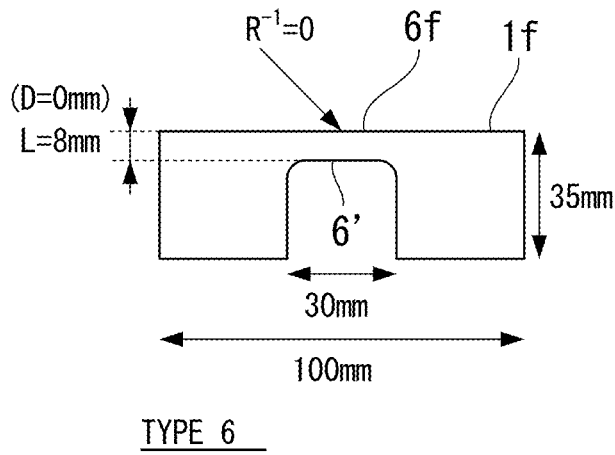
FIG. 5F is a plan view illustrating a sheet-shaped test piece 1f of a type 6.
Figure 6A:
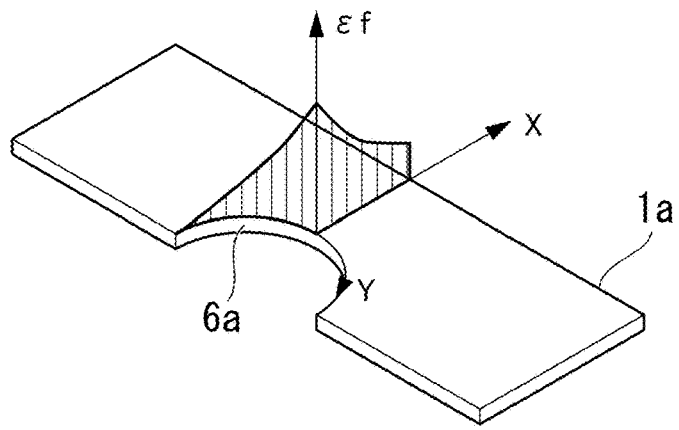
FIG. 6A is a view schematically illustrating the relationship between the normal strain gradient X and the circumferential strain gradient Y of the sheet-shaped test piece 1a of the type 1.
Figure 6B:
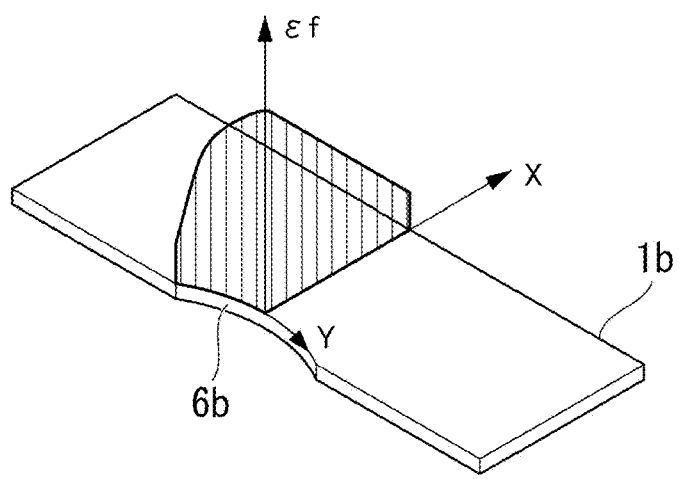
FIG. 6B is a view schematically illustrating the relationship between the normal strain gradient X and the circumferential strain gradient Y of the sheet-shaped test piece 1b of the type 2.
Figure 6C:
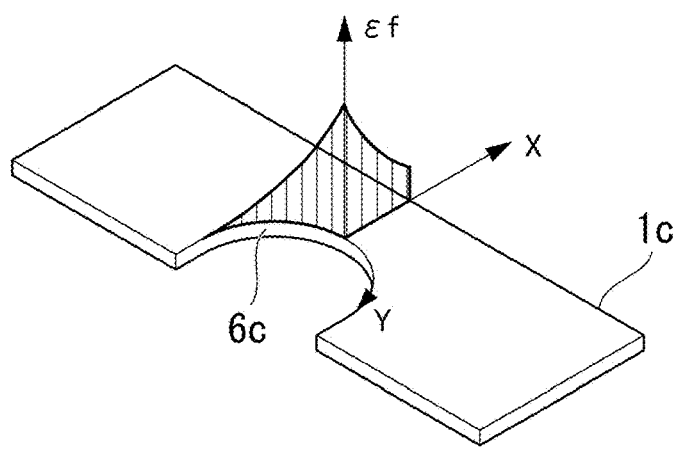
FIG. 6C is a view schematically illustrating the relationship between the normal strain gradient X and the circumferential strain gradient Y of the sheet-shaped test piece 1c of the type 3.
Figure 6D:
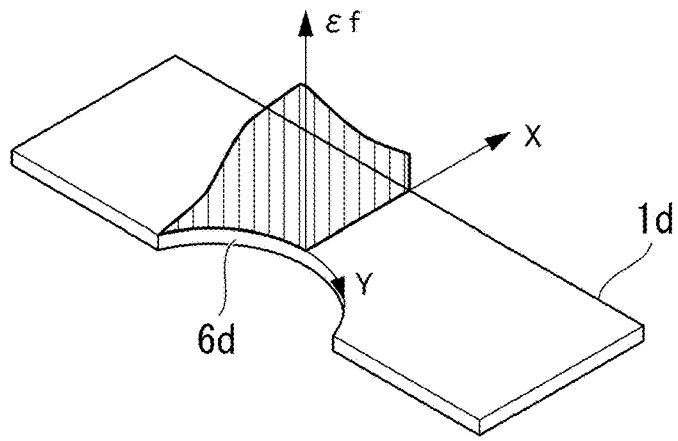
FIG. 6D is a view schematically illustrating the relationship between the normal strain gradient X and the circumferential strain gradient Y of the sheet-shaped test piece 1d of the type 4.
Figure 6E:
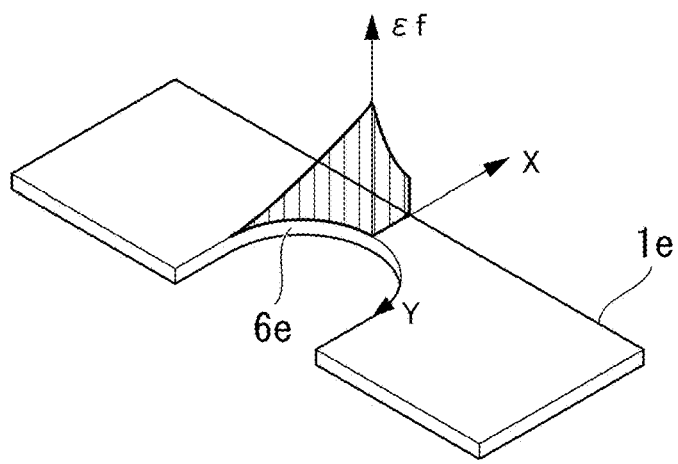
FIG. 6E is a view schematically illustrating the relationship between the normal strain gradient X and the circumferential strain gradient Y of the sheet-shaped test piece 1e of the type 5.
Figure 6F:
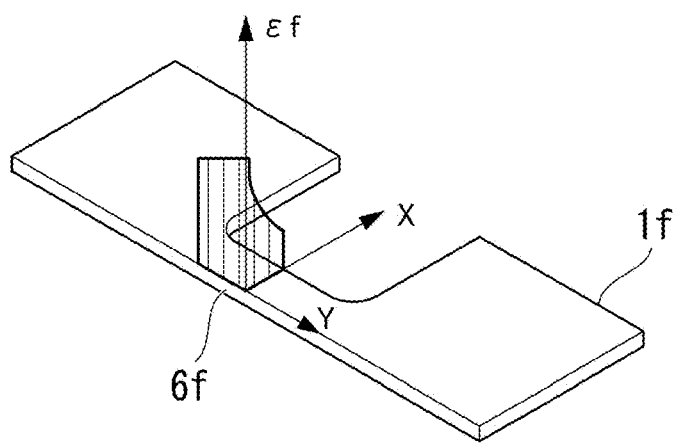
FIG. 6F is a view schematically illustrating the relationship between the normal strain gradient X and the circumferential strain gradient Y of the sheet-shaped test piece 1f of the type 6.

As a specific example, FIGS. 3 and 4 show an aspect of a side bend tester 10 for measuring the fracture strain measurement value $\varepsilon_{1(exp)}^*$, the normal strain gradient measurement value $\Delta\varepsilon_{N(exp)}$, and the circumferential strain gradient measurement value $\Delta\varepsilon_{C(exp)}$ of the sheet-shaped test piece 1.

FIG. 3 is a plan view illustrating a state in which the sheet-shaped test piece 1 is mounted on the side bend tester 10, and FIG. 4 is a plan view illustrating a state in which a strain is applied to the sheet-shaped test piece 1 by the side bend tester 10.

The side bend tester 10 is configured such that two arms 12 having bent portions which cross in an X shape are pivoted on axes 13 to a base 14 at intermediate points of the arms 12. The sheet-shaped test piece 1 is held by holding portions 19 which are respectively mounted on the front ends of the two arms 12 via bolts 18 in a state in which the notch 6 faces the outside. The other end of the arm 12 protrudes from the base 14 and can be pressed to be widened against a hydraulic cylinder 15 as illustrated in FIG. 4. As a result, the sheet-shaped test piece 1 undergoes in-plane tensile deformation and bending deformation. Accordingly, in the sheet-shaped test piece 1, the same type of deformation as stretch flange forming is realized.

Since fracture occurs in a portion of the notch 6, an image capturing device 17 is disposed in the rear of the base 14 (see FIG. 3 or 4) to take images of the behavior during fracturing. Since the strain rate during processing with a press is 0.01 to 1/sec, the strain rate applied to the sheet-shaped test piece 1 by the side bend tester 10 is preferably 0.01 to 1/sec.

(Plurality of Sheet-Shaped Test Pieces 1)

Since the plurality of sheet-shaped test pieces 1 are provided with the notches 6 formed in different shapes, fracture strain measurement values $\varepsilon_{1(exp)}^*$, normal strain gradient measurement values $\Delta\varepsilon_{N(exp)}$, and circumferential strain gradient measurement values $\Delta\varepsilon_{C(exp)}$ which vary with the sheet-shaped test pieces 1 can be obtained.

For example, the notch shapes of the notches 6 of the sheet-shaped test pieces 1 may have depths D of 0 to 100 mm, curvatures $R^{-1}$ of 0 to 1.0, and ligament lengths L of 1 to 500 mm.

FIGS. 5A to 5F illustrate sheet-shaped test pieces 1a to 1f formed by punching notches 6a to 6f having various shapes in a rectangular steel sheet of 35 mm×100 mm as specific examples (types 1 to 6) of the sheet-shaped test pieces 1.

The sheet-shaped test piece 1a of the type 1 has the notch 6a with a notch depth D of 15 mm, a curvature $R^{-1}$ of 0.067, and a ligament length L of 20 mm.

The sheet-shaped test piece 1b of the type 2 has the notch 6b with a notch depth D of 4 mm, a curvature $R^{-1}$ of 0.033, and a ligament length L of 31 mm.

The sheet-shaped test piece 1c of the type 3 has the notch 6c with a notch depth D of 21 mm, a curvature $R^{-1}$ of 0.067, and a ligament length L of 14 mm.

The sheet-shaped test piece 1d of the type 4 has the notch 6d with a notch depth D of 12.8 mm, a curvature $R^{-1}$ of 0.050, and a ligament length L of 22.2 mm.

The sheet-shaped test piece 1e of the type 5 has the notch 6e with a notch depth D of 27 mm, a curvature $R^{-1}$ of 0.067, and a ligament length L of 8 mm.

The sheet-shaped test piece 1f of the type 6 is a test piece having an adjustment notch 6' formed to adjust the ligament length L. This test piece may be regarded as having the notch 6f with a notch depth D of 0 mm, a curvature $R^{-1}$ of 0, and a ligament length L of 8 mm on the opposite side of the adjustment notch 6'.

(Method of Selecting Plurality of Sheet-Shaped Test Pieces 1)

FIGS. 6A to 6F schematically illustrate the fracture strain measurement values $\varepsilon_{1(exp)}^*$ (εf in the figures), the normal strain gradient measurement values $\Delta\varepsilon_{N(exp)}$ (X in the figures), and the circumferential strain gradient measurement values $\Delta\varepsilon_{C(exp)}$ (Y in the figures) of the sheet-shaped test pieces 1a to 1f. As illustrated in FIGS. 6A to 6F, the normal strain gradient measurement value $\Delta\varepsilon_{N(exp)}$ tends to increase as the ligament length L decreases, and the circumferential strain gradient measurement value $\Delta\varepsilon_{C(exp)}$ tends to increase as the curvature $R^{-1}$ increases.

According to this rule, the shapes of the notches 6 of the plurality of sheet-shaped test pieces 1 are preferably selected to include (1) a first notch shape having a relatively low normal strain gradient and a relatively low circumferential strain gradient (for example, the notch 6a), (2) a second notch shape having a relatively high normal strain gradient and a relatively high circumferential strain gradient (for example, the notch 6e), (3) a third notch shape having a relatively high normal strain gradient and a relatively low circumferential strain gradient (for example, the notch 6f), and (4) a fourth notch shape having a relatively low normal strain gradient and a relatively high circumferential strain gradient (for example, the notch 6b).

Here, for example, "a sheet-shaped test piece having a relatively low normal strain gradient" means a sheet-shaped test piece of which the slope of a straight line fitted by the method of least squares to data points of the normal strain gradient is lower than the average value of all the sheet-shaped test pieces. This is also applied to "a sheet-shaped test piece having a relatively circumferential strain gradient".

In order to obtain data with higher accuracy, notch shapes (for example, the notch 6c and the notch 6d) different from the first to fourth notch shapes may be further included.

(Normal Strain Gradient Measurement Value $\Delta\varepsilon_{N(exp)}$)

Figure 7:
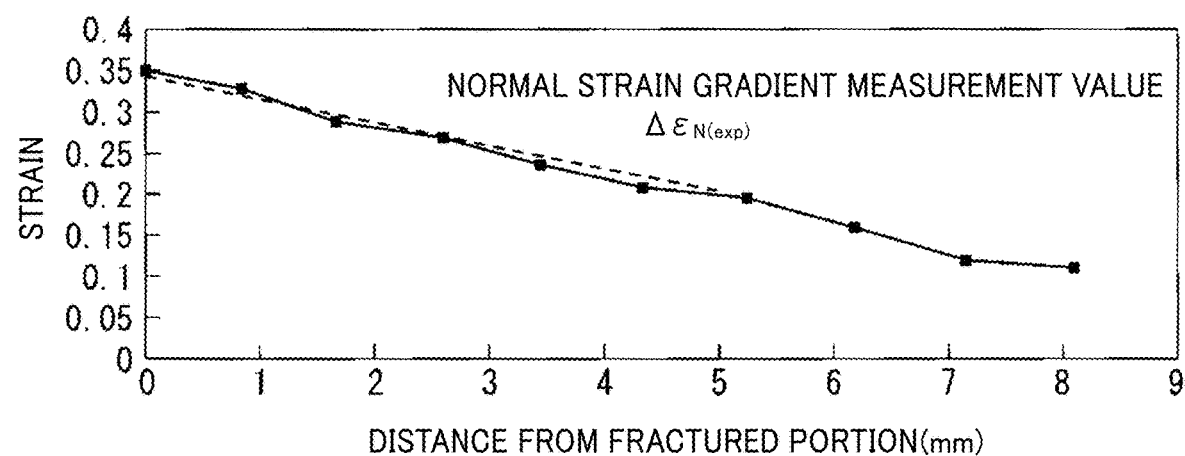
FIG. 7 is a graph showing the normal strain gradient measurement value of the sheet-shaped test piece 1b.

FIG. 7 shows the normal strain gradient measurement value $\Delta\varepsilon_{N(exp)}$ of the sheet-shaped test piece 1b (type 2) as an example. The normal strain gradient measurement value $\Delta\varepsilon_{N(exp)}$ is a value obtained by dividing the difference between the strain of a fracture origin (the position of the position 0 in the figures) and the strain at a position inwardly away from the fracture origin by the distance between the fracture origin and the position, and is an indication of the strain distribution in an inward direction from the sheet end section.

(Circumferential Strain Gradient Measurement Value $\Delta\varepsilon_{C(exp)}$)

Figure 8:
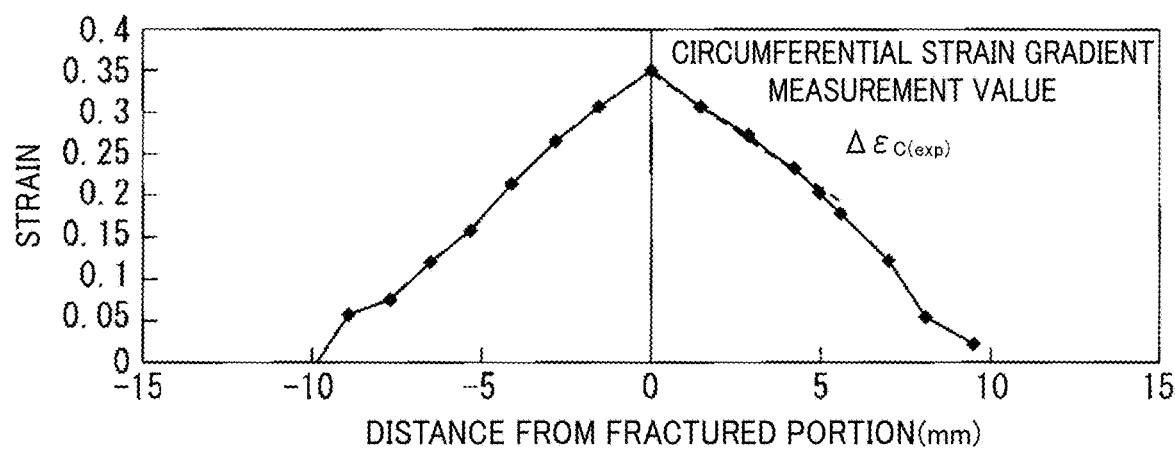
FIG. 8 is a graph showing the circumferential strain gradient measurement value of the sheet-shaped test piece 1b.

FIG. 8 shows the circumferential strain gradient measurement value $\Delta\varepsilon_{C(exp)}$ of the sheet-shaped test piece 1b (type 2) as an example. The circumferential strain gradient measurement value $\Delta\varepsilon_{C(exp)}$ is a value obtained by dividing the difference between the strain of the fracture origin (the position of the position 0 in the figures) and the strain at a position away from the fracture origin along the sheet end section by the distance between the fracture origin and the position, and is an indication of the strain distribution in a direction along the sheet end section. The circumferential strain gradient measurement value $\Delta\varepsilon_{C(exp)}$ may be obtained along two directions (rightward and leftward directions in FIG. 8) with respect to the fracture origin as the center. Otherwise, only one thereof may be used, or the average of the two may also be used.

In order to detect a change in dimensions before and after a test, lines or points are printed in advance on the surface of the sheet-shaped test piece 1 with predetermined intervals, or fine uneven portions are formed at predetermined intervals. The form of detection of the dimensional change is arbitrary as long as the change in dimensions before and after the test can be detected.

Figure 9:
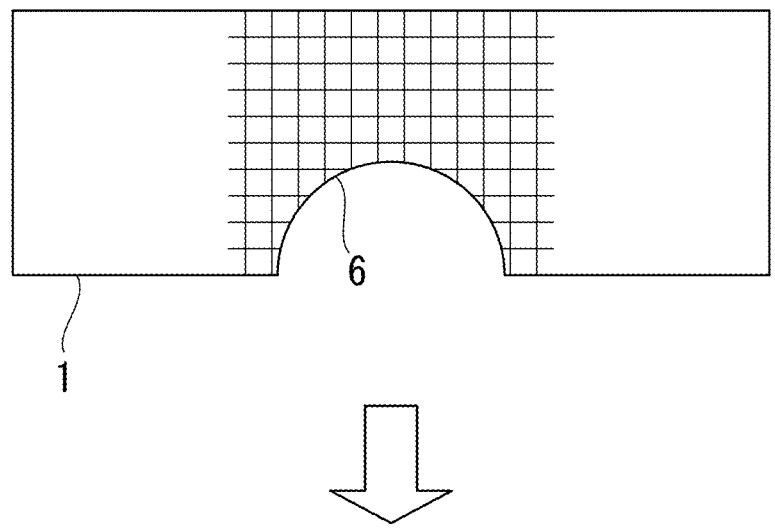
FIG. 9 is a schematic view showing a change in grid lines when the sheet-shaped test piece 1 on which the grid lines are drawn with predetermined intervals is subjected to a side bend test.
Figure 9:
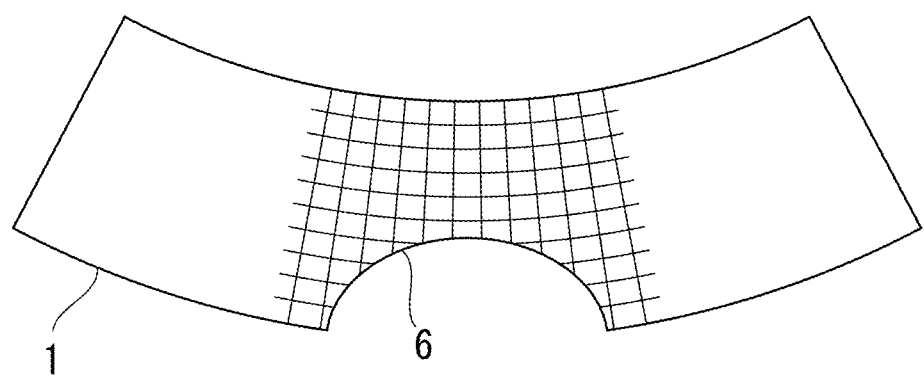

FIG. 9 illustrates a change in grid lines when the sheet-shaped test piece 1 on which the grid lines are drawn in the vicinity of the notch 6 with predetermined intervals is subjected to a side bend test. In FIG. 9, it is known that after the test, the grid lines in the vicinity of the notch 6 spread.

The strain at a measurement point can be obtained from a change in grid lines or points on the surface of the sheet-shaped test piece 1 or a change in uneven patterns, and a change in the sheet thickness of the end section. Otherwise, the strain may also be obtained from the positional correlation between uneven portions of 1 mm or smaller formed on the surface of the sheet-shaped test piece 1 before and after a test. In addition, the normal strain gradient measurement value $\Delta\varepsilon_{N(exp)}$ and the circumferential strain gradient measurement value $\Delta\varepsilon_{C(exp)}$ are obtained by dividing the difference between the strain at the fracture origin and the strain at a position of 1 to 100 mm from the fracture origin by the distance therebetween. Since the gradients are not constant, the gradients may be fitted to straight lines by the method of least squares or the like.

When a strain measurement point from the fracture origin is greater than 100 mm, an effect of strains on the fracture strain can be neglected. Therefore, the upper limit of the position of a strain measurement point from the fracture origin is preferably 100 mm. The lower limit of a strain measurement position is preferably 1 mm.

(Fracture Strain Function)

On the basis of the fracture strain measurement value $\varepsilon_{1(exp)}^*$, the normal strain gradient measurement value $\Delta\varepsilon_{N(exp)}$, and the circumferential strain gradient measurement value $\Delta\varepsilon_{C(exp)}$ obtained in the measurement value acquisition process S1, a function to define the fracture strain $\varepsilon f$, using the normal strain gradient X and the circumferential strain gradient Y as variables (hereinafter, called a fracture strain function), that is, $\varepsilon f=f(X, Y)$ may be specified.

As a specific example of the fracture strain function, $\varepsilon f=a+bX^c+dX^eY^f+gY^h$ may be used, provided that a to h are constants.

Furthermore, by also considering a processing condition $Cl_{(exp)}$ of the sheet-shaped test piece 1, a fracture strain function with higher accuracy, that is, $\varepsilon f=f(X, Y, Cl_{(exp)}, Cl_{(CAE)})$ may be specified.

The processing condition $Cl_{(exp)}$ is a parameter such as the clearance conditions for punching of the sheet-shaped test piece 1 or the laser output conditions for laser processing, and a processing condition $Cl_{(CAE)}$ is a parameter such as clearance conditions for punching to obtain a deformable sheet or laser output conditions for laser processing. Since the fracture strain $\varepsilon f$ is influenced by such processing conditions, the fracture strain $\varepsilon f$ can be specified with high accuracy by considering the processing conditions $Cl_{(exp)}$ and $Cl_{(CAE)}$.

In addition, the inventors experimentally confirmed that $\varepsilon f=a+bX^{1.5}+cY^{1.5}$ (a to c: constants) may be used as a simplified function.

Table 1 shows results of acquiring the fracture strain measurement values $\varepsilon_{1(exp)}^*$, the normal strain gradient measurement values $\Delta\varepsilon_{N(exp)}$, and the circumferential strain gradient measurement values $\Delta\varepsilon_{C(exp)}$ by conducting a side bend test on the sheet-shaped test pieces 1a to 1f (Kind A of steel) of the types 1 to 6 illustrated in FIGS. 5A to 5F under an experimental measurement environment with GL=2.0 mm and $L_{S(exp)}$=8.0 mm.

When a to c of a fracture strain function represented by $\varepsilon f=a+bX^{1.5}+cY^{1.5}$ are determined on the basis of the results, a=0.389, b=5.26, and c=−5.93 are obtained.

TABLE 1

| Sheet-shaped test piece (type A) | Circumferential strain gradient measurement value $\Delta\varepsilon_{C(exp)}$ (Y) | Normal strain gradient measurement value $\Delta\varepsilon_{N(exp)}$ (X) | Fracture strain measurement value $\varepsilon_{1(exp)}^*$ $\varepsilon f$ |
|---|---|---|---|
| Type 1 | 0.0310 | 0.0452 | 0.407 |
| Type 2 | 0.0440 | 0.0323 | 0.364 |
| Type 3 | 0.0269 | 0.0249 | 0.383 |
| Type 4 | 0.0715 | 0.0816 | 0.398 |
| Type 5 | 0.0415 | 0.0673 | 0.429 |
| Type 6 | 0.0195 | 0.0650 | 0.459 |

(Three-Dimensional Map)

In addition, the fracture strain of may also be specified by a three-dimensional map of the normal strain gradient X and the circumferential strain gradient Y. A function and a map are mathematically equivalent to each other.

Figure 10:
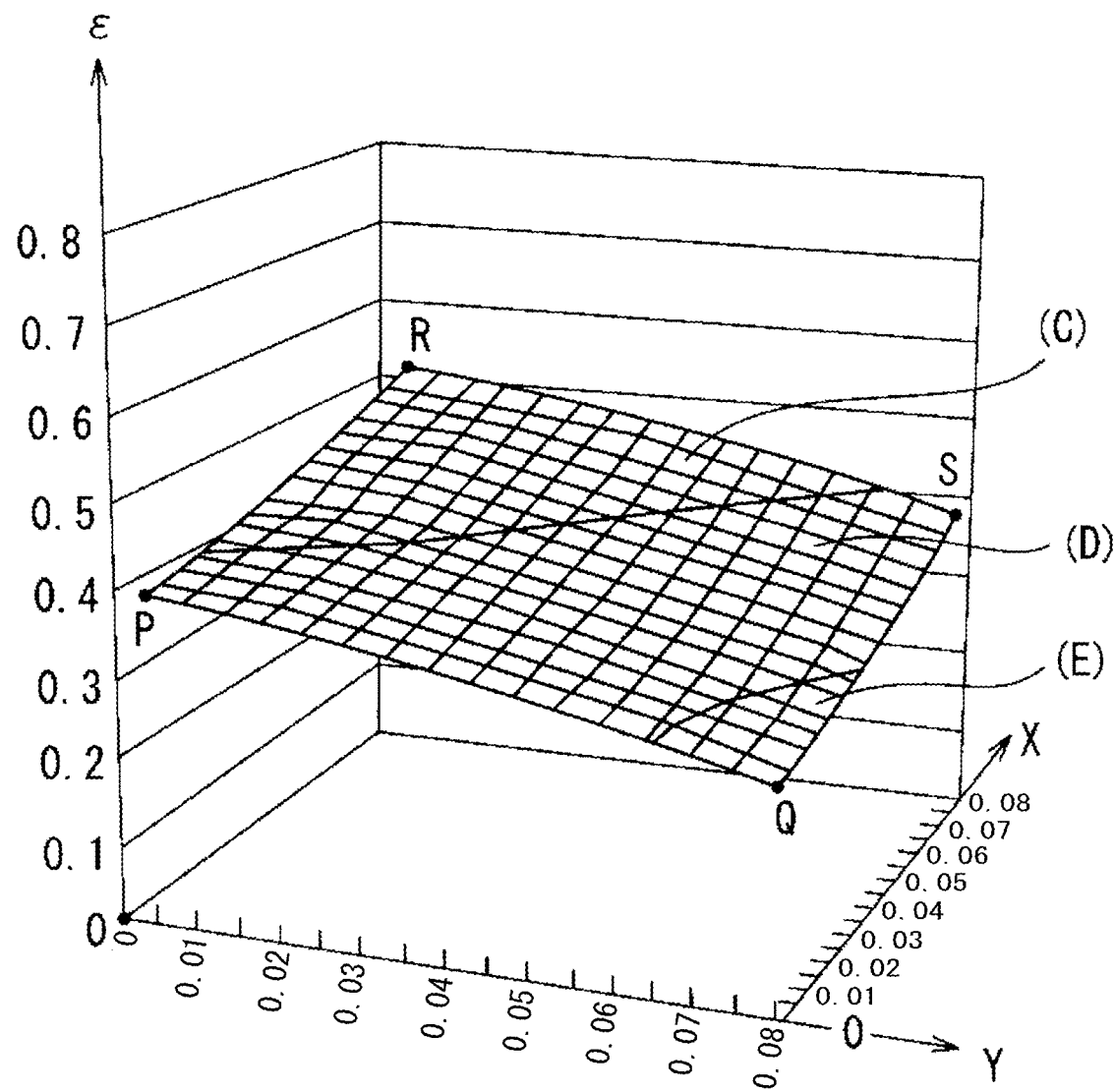
FIG. 10 is a view showing a three-dimensional map of the fracture strain $\varepsilon f$, the normal strain gradient X, and the circumferential strain gradient Y for a kind A of steel.

FIG. 10 shows a three-dimensional map of the fracture strain $\varepsilon f$, the normal strain gradient X, and the circumferential strain gradient Y for a kind A of steel. The three-dimensional map can be created by using a response surface methodology (RSM) method on the basis of the fracture strain measurement values $\varepsilon_{1(exp)}^*$, the normal strain gradient measurement values $\Delta\varepsilon_{N(exp)}$, and the circumferential strain gradient measurement values $\Delta\varepsilon_{C(exp)}$ acquired in the measurement value acquisition process S1. The vertical axis represents the strain $\varepsilon$, the horizontal axis represents the circumferential strain gradient Y, and the lateral axis represents the normal strain gradient X. The fracture strain $\varepsilon f$ is displayed as a curved surface (a curved surface surrounded by PRSQ). A section (C) with a strain $\varepsilon$ of 0.4 to 0.5, a section (D) with a strain $\varepsilon$ of 0.3 to 0.4, and a section (E) with a strain $\varepsilon$ of 0.2 to 0.3 are displayed.

In FIG. 10, the point P is a point where the normal strain gradient X and the circumferential strain gradient Y are approximately zero, and corresponds to the fracture strain $\varepsilon f$ in a case where a sheet-shaped test piece 1 without a notch is simply pulled.

The point Q is a point where there is a circumferential strain gradient Y while the normal strain gradient X is approximately zero, and corresponds to the fracture strain $\varepsilon f$ in a case where a sheet-shaped test piece 1 with a notch is simply pulled.

The point R is a point where the circumferential strain gradient Y is approximately zero while there is a normal strain gradient X, and corresponds to the fracture strain $\varepsilon f$ in a case where a sheet-shaped test piece 1 without a notch is subjected to in-plane bending. At this time, the fracture strain $\varepsilon f$ is maximized.

The point S corresponds to the fracture strain $\varepsilon f$ in a case where a sheet-shaped test piece 1 with a notch is subjected to in-plane bending.

It can be seen from FIG. 10 that the fracture strain $\varepsilon f$ decreases as the circumferential strain gradient Y increases, while the fracture strain εf increases as the normal strain gradient X increases. It is thought that this is because when the normal strain gradient X increases, the strain rapidly decreases toward the inside even slightly from the sheet end section and thus fracture is less likely to propagate.

Figure 11:
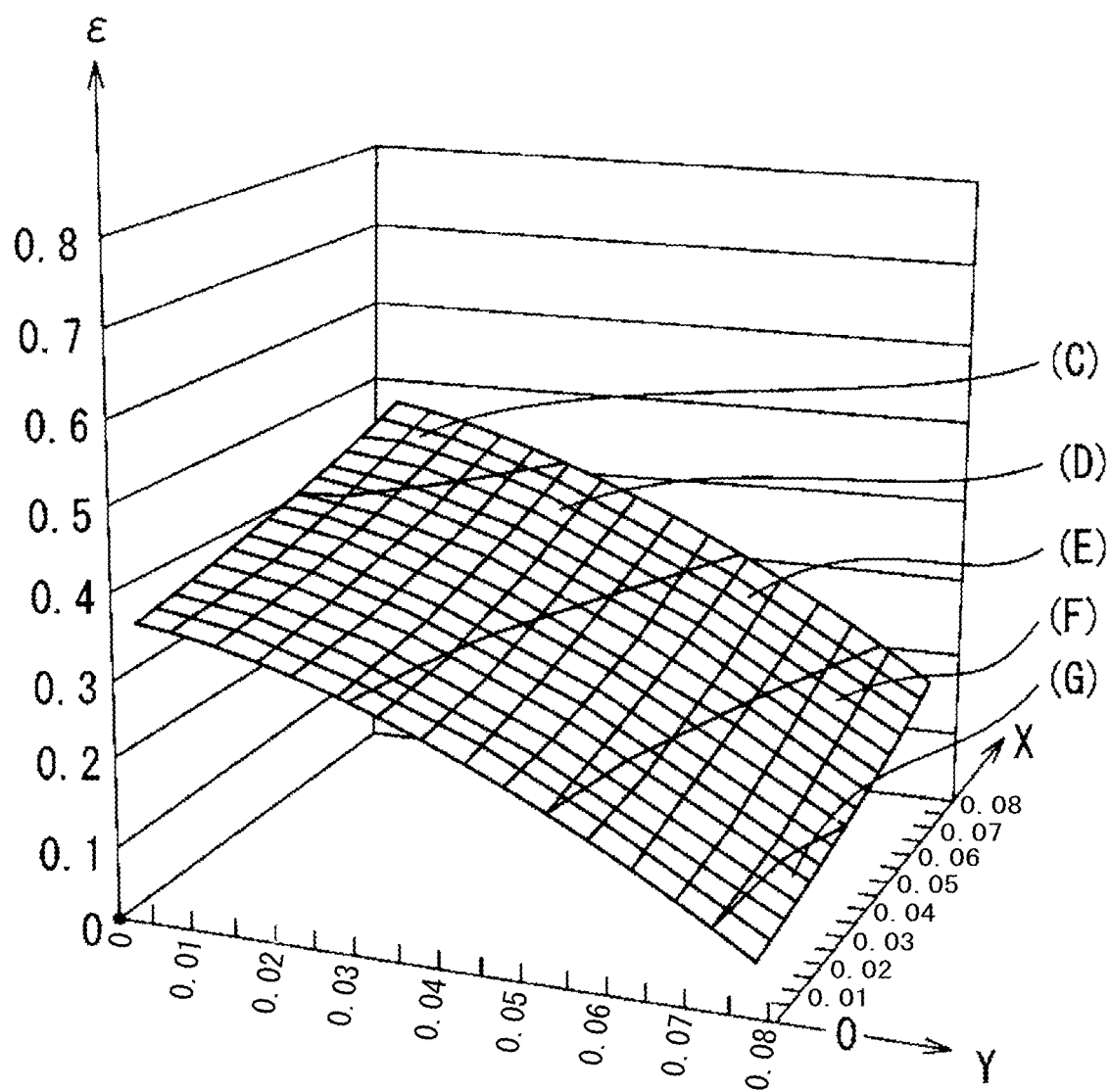
FIG. 11 is a view showing a three-dimensional map of the fracture strain $\varepsilon f$, the normal strain gradient X, and the circumferential strain gradient Y for a kind B of steel.
Figure 12:
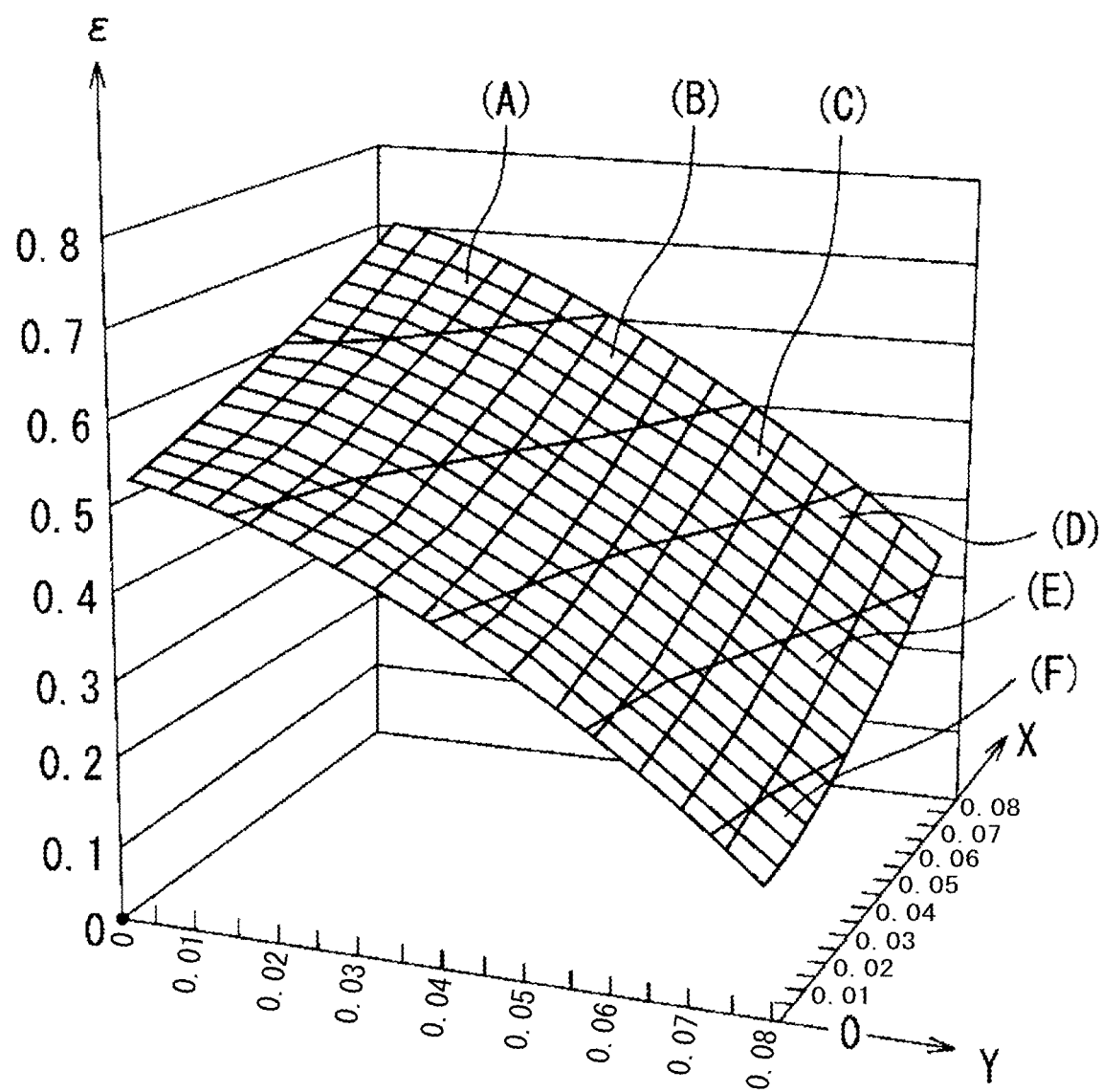
FIG. 12 is a view showing a three-dimensional map of the fracture strain $\varepsilon f$, the normal strain gradient X, and the circumferential strain gradient Y for a kind C of steel.

FIG. 11 shows a three-dimensional map of the fracture strain εf, the normal strain gradient X, and the circumferential strain gradient Y for another kind B of steel. FIG. 12 shows a three-dimensional map of the fracture strain εf, the normal strain gradient X, and the circumferential strain gradient Y for still another kind C of steel.

In FIGS. 11 and 12, a section with a fracture strain εf of 0.6 to 0.7 is displayed as (A), a section with a fracture strain εf of 0.5 to 0.6 is displayed as (B), a section with a fracture strain εf of 0.4 to 0.5 is displayed as (C), a section with a fracture strain εf of 0.3 to 0.4 is displayed as (D), a section with a fracture strain εf of 0.2 to 0.3 is displayed as (E), a section with a fracture strain εf of 0.1 to 0.2 is displayed as (F), and a section with a fracture strain εf of 0 to 0.1 is displayed as (G). When the kinds of steel are different, the fracture strains εf change. However, the shapes of the curved surfaces for displaying the fracture strains εf are substantially the same.

(CAE Analysis Process S2)

Next, in the CAE analysis process, on the basis of forming data regarding the flange end section obtained through numerical analysis by a finite element method of a stretch flange forming process of a steel sheet (deformable sheet) under a CAE analysis measurement environment with a predetermined element size ES and a predetermined gradient evaluation length $L_{S(CAE)}$, a maximum major strain maximum element α having the highest maximum major strain ε, the normal strain gradient $\Delta\varepsilon_{N(CAE)}$ of the maximum major strain maximum element α, and the circumferential strain gradient $\Delta\varepsilon_{C(CAE)}$ of the maximum major strain maximum element α are acquired.

As the normal strain gradient $\Delta\varepsilon_{N(CAE)}$ increases, stretch flange cracks are less likely to be initiated. A high normal strain gradient $\Delta\varepsilon_{N(CAE)}$ means that the strain rapidly decreases toward the inside even slightly from the flange end section. Therefore, when the normal strain gradient $\Delta\varepsilon_{N(CAE)}$ is high, even when microcracks are initiated in the flange end section, the cracks do not propagate.

In addition, as the circumferential strain gradient $\Delta\varepsilon_{C(CAE)}$ increases, stretch flange cracks are more likely to be initiated. A high circumferential strain gradient $\Delta\varepsilon_{C(CAE)}$ means that a tensile stress is concentrated on a specific position of the flange end section (the position of a reference element). Therefore, when the circumferential strain gradient $\Delta\varepsilon_{C(CAE)}$ is high, cracks are likely to be initiated in the flange end section.

As described above, initiation of stretch flange cracks can be accurately predicted by considering the circumferential strain gradient $\Delta\varepsilon_{C(CAE)}$ and the normal strain gradient $\Delta\varepsilon_{N(CAE)}$ in the flange end section.

In the flange end section, the circumferential strain gradient $\Delta\varepsilon_{C(CAE)}$ from the reference element can be easily calculated from the strains of elements constituting the end section. However, it is not easy to automatically calculate the normal strain gradient $\Delta\varepsilon_{N(CAE)}$ from the reference element.

Here, for the calculation of the normal strain gradient $\Delta\varepsilon_{N(CAE)}$ from the reference element, an element selection algorithm for automatically specifying element arrays which are adjacent in a direction toward the inside of the end section from the reference element is embedded into a calculation process, and the strain gradient in an inward direction from the end section is calculated from the strains of the elements of the element arrays specified on the basis of the element selection algorithm.

As a specific example, the CAE analysis process S2 may include an element extraction process S21, an element array specification process S22, and a strain gradient calculation process S23.

(Element Extraction Process S21)

In the element extraction process S21, a maximum major strain maximum element α having the maximum major strain ε is extracted from the forming data regarding the flange end section.

First, a formed product is analyzed as a set of a large number of elements according to the finite element method by performing a forming simulation (regarding the analysis method, for example, refer to Japanese Patent Application No. 2006-167766). In addition, forming data (data of the shapes and strains of the elements) in the forming process is acquired. From the forming data, forming data regarding the end section of the flange is extracted. The extraction may be automatically performed by a computer according to a method of selecting elements that do not have adjacent elements.

For the extracted end section, the maximum major strain maximum element α having the maximum major strain ε (the highest value of the maximum major strain) is extracted.

(Element Array Specification Process S22)

In the element array specification process S22, by using the maximum major strain maximum element α as a reference element A, an element array directed toward the inside of the steel sheet from the flange end section and an element array along the flange end section are specified by the element selection algorithm.

Hereinafter, the element selection algorithm will be described on the basis of a specific example.

Figure 13:
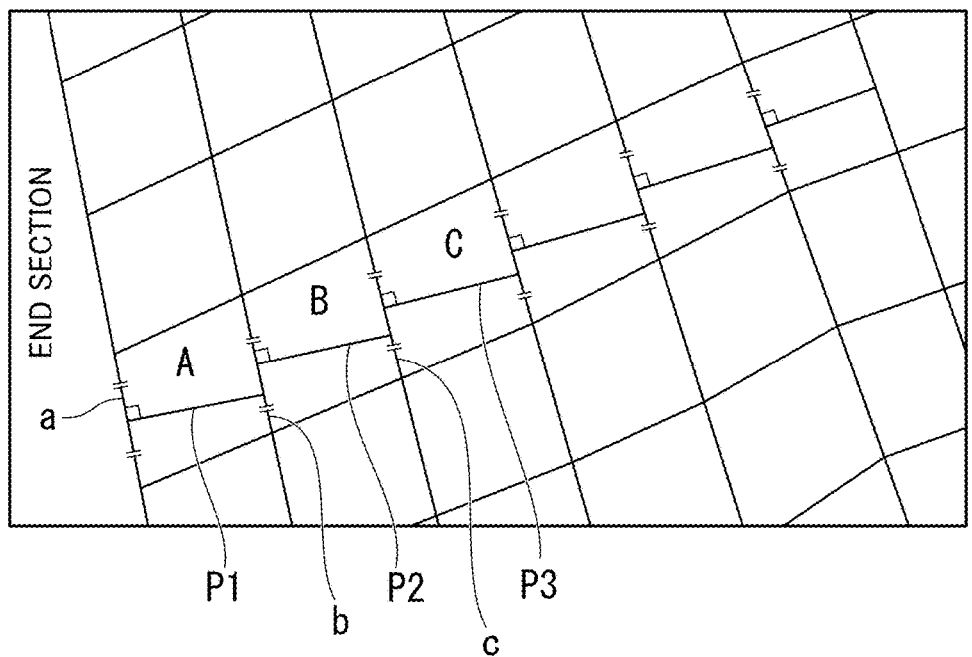
FIG. 13 is a view illustrating a first example of an element selection algorithm for specifying an element array directed toward the inside of a steel sheet from a flange end section.

FIG. 13 illustrates a first example of the element selection algorithm for specifying the element array directed toward the inside of the steel sheet from the flange end section. A straight line P1 perpendicular to the end section through the midpoint of a side a along the end section of the reference element A is postulated. Next, a side b intersecting the straight line P1 is specified, and an adjacent element B that shares the side b is extracted. Next, a side c intersecting a straight line P2 perpendicular to the side b through the midpoint of the side b of the adjacent element B is specified, and a straight line C that shares the side b is extracted. By repeating "specification of a side" to "extraction of an adjacent element", an element array is specified.

By extracting the maximum major strain ε from the strains of the element arrays specified in this manner, the strain gradient in the inward direction from the end section (normal direction) can be calculated.

Figure 14:
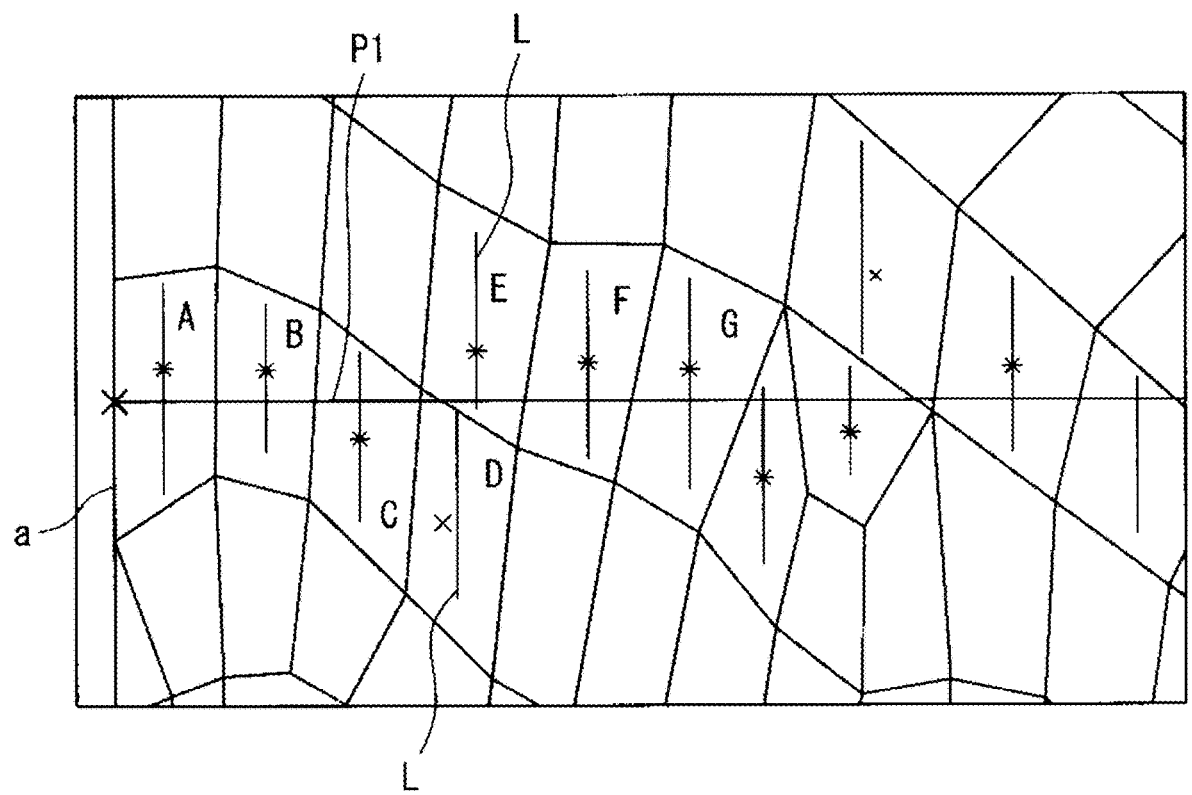
FIG. 14 is a view illustrating a second example of the element selection algorithm for specifying an element array directed toward the inside of the steel sheet from the flange end section.

FIG. 14 illustrates a second example of the element selection algorithm for specifying the element array directed toward the inside of the steel sheet from the flange end section. A straight line P1 perpendicular to the end section through the midpoint of a side a along the end section of the reference element A is postulated. Elements A, B, C, D, E, F, ... that intersect the straight line P1 at two or more points are selected. Regarding elements of which the end sections slightly intersect the straight line P1, like the elements D and E, it is necessary to establish the standard of which is to be selected.

Here, elements in which normal lines L drawn toward the straight line P1 from the centroids of the elements intersect the straight lines P1 in the corresponding elements are selected, and elements that do not satisfy this standard are not selected. As a result, the element D is not selected, and the element E is selected. In FIG. 14, elements with asterisks (*) are selected elements.

Figure 15:
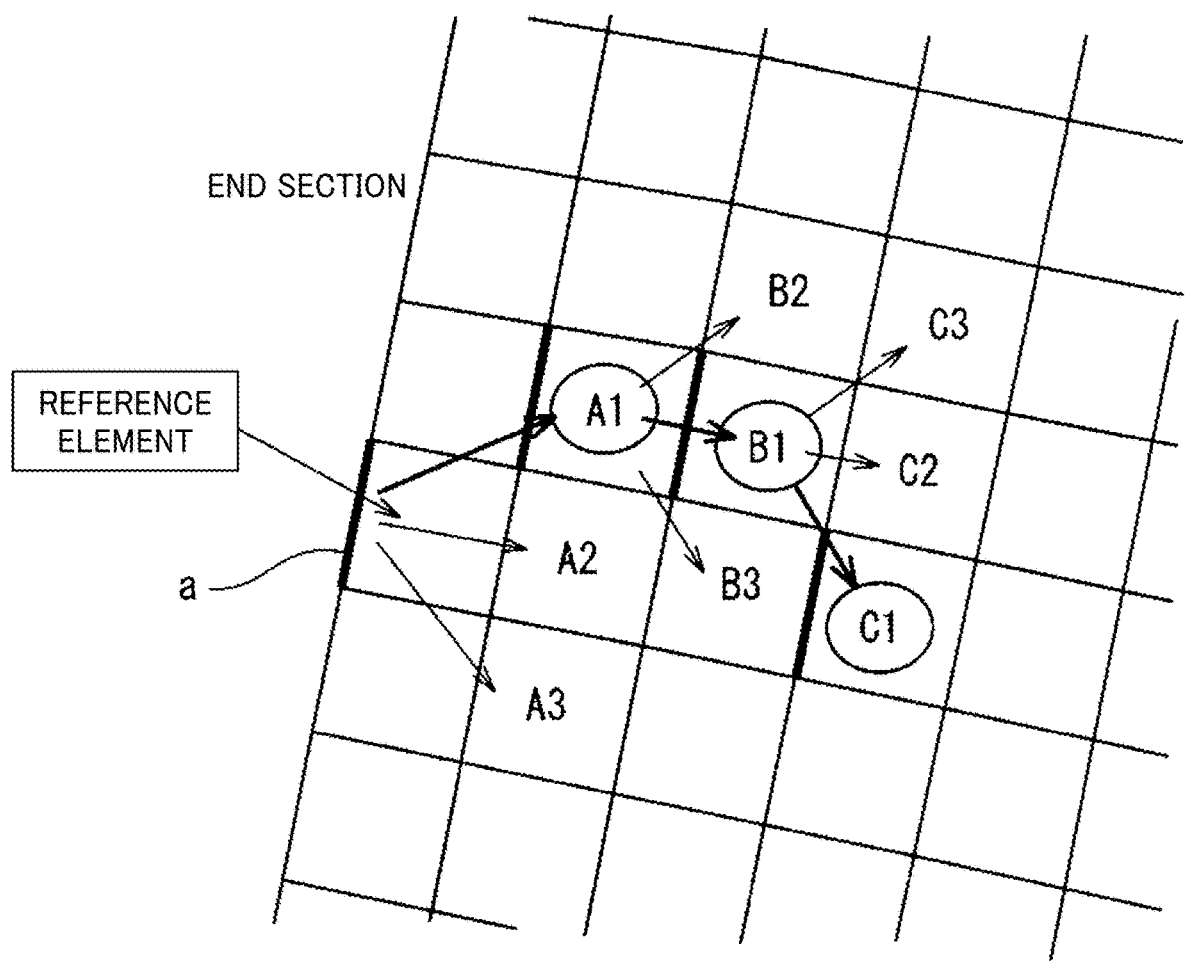
FIG. 15 is a view illustrating a third example of the element selection algorithm for specifying an element array directed toward the inside of the steel sheet from the flange end section.

FIG. 15 illustrates a third example of the element selection algorithm for specifying the element array directed toward the inside of the steel sheet from the flange end section. In a strain propagation direction different from a direction along a side a of the end section of the reference element A, an adjacent element B1 having the highest maximum major strain ε is extracted from among a plurality of adjacent elements B1, B2, and B3 that share a side, and an adjacent element C1 having the highest maximum major strain ε is extracted from among a plurality of adjacent elements C1, C2, and C3 that share a side different from the side of the adjacent element B1. By repeating the extraction, an element array is specified.

According to this algorithm, since the adjacent elements having the highest maximum major strain ε are sequentially extracted, the strain propagation direction can be followed even when the strain propagation direction changes during the forming process, and thus the strain gradient in this direction can be calculated.

Figure 16:
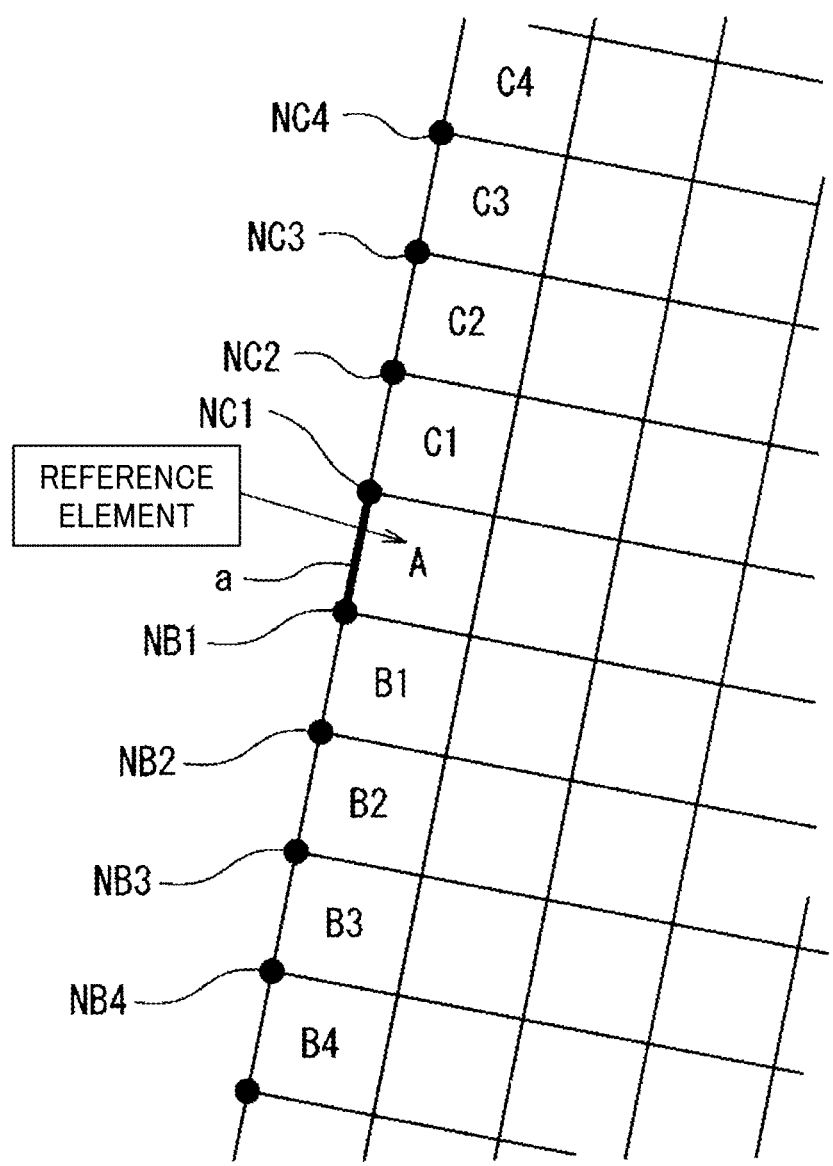
FIG. 16 is a view illustrating an example of the element selection algorithm for specifying an element array along the flange end section.

FIG. 16 illustrates an example of the element selection algorithm for specifying the element array along the flange end section. Elements in a direction along a side a of the end section of the reference element A are extracted in the order of B1 and B2 and are extracted in the order of C1 and C2. By repeating the extraction, an element array is specified.

(Strain Gradient Calculation Process S23)

In the strain gradient calculation process S23, for the element array specified in the element extraction process S22, the normal strain gradient $\Delta\varepsilon_{N(CAE)}$ of the maximum major strain maximum element α and the circumferential strain gradient $\Delta\varepsilon_{C(CAE)}$ of the maximum major strain maximum element α are calculated.

When a case of the element selection algorithm illustrated in FIG. 16 is exemplified, the circumferential strain gradient $\Delta\varepsilon_{C(CAE)}$ is calculated by calculating the displacement between nodes in a time series manner in the order of nodes NB1 and NB2 along the end section from the specified element array and in the order of nodes NC1 and NC2.

(Fracture Determination Threshold Acquisition Process S3)

As described above, in the measurement value acquisition process S1, regarding each of the plurality of sheet-shaped test pieces 1, the fracture strain measurement value $\varepsilon_{1(exp)}^*$ associated with the normal strain gradient measurement value $\Delta\varepsilon_{N(exp)}$ and the circumferential strain gradient measurement value $\Delta\varepsilon_{C(exp)}$ can be obtained.

However, there may be a case where it is difficult to accurately predict stretch flange cracks even when the fracture strain function (εf=f(X, Y)) obtained from the measurement values as fracture determination threshold data is directly compared to data of the maximum major strain ε associated with the normal strain gradient $\Delta\varepsilon_{N(CAE)}$ and the circumferential strain gradient $\Delta\varepsilon_{C(CAE)}$ obtained in the CAE analysis process S2.

This is because the data obtained in the measurement value acquisition process S1 and the data obtained in the CAE analysis process S2 are obtained under different measurement environments.

The data obtained in the measurement value acquisition process S1 is data obtained under the experimental measurement environment with a predetermined gauge length GL and a predetermined gradient evaluation length $L_{S(exp)}$, while the data obtained in the CAE analysis process S2 is data obtained under the CAE analysis measurement environment with a predetermined element size ES and a predetermined gradient evaluation length $L_{S(CAE)}$.

Therefore, since the datas obtained under different measurement environments are compared to each other, there may be case where it is difficult to realize prediction of stretch flange cracks with higher accuracy.

Here, in the fracture determination threshold acquisition process S3, a fracture determination threshold $\varepsilon_{1(CAE)}^*$ is acquired by converting the fracture strain measurement value $\varepsilon_{1(exp)}^*$ obtained under the experimental measurement environment, on the basis of, in addition to the normal strain gradient measurement value $\Delta\varepsilon_{N(exp)}$ and the circumferential strain gradient measurement value $\Delta\varepsilon_{C(exp)}$, the element size ES,
the gradient evaluation length $L_{S(CAE)}$,
the normal strain gradient $\Delta\varepsilon_{N(CAE)}$, and
the circumferential strain gradient $\Delta\varepsilon_{C(CAE)}$,
in the CAE analysis process S2.

Accordingly, the datas obtained under the same measurement environment can be compared to each other, and thus it is possible to realize prediction of stretch flange cracks with higher accuracy.

More preferably, by converting the fracture strain measurement value $\varepsilon_{1(exp)}^*$ on the basis of processing conditions of the sheet-shaped test pieces or processing conditions of the steel sheet, the fracture determination threshold $\varepsilon_{1(CAE)}^*$ is acquired. The processing conditions are clearance conditions or the like, for example in a case of punching. Accordingly, it is possible to realize prediction of stretch flange cracks with high accuracy.

As a specific measure to acquire the fracture determination threshold $\varepsilon_{1(CAE)}^*$, two measures described below are exemplified.

(First Measure)

As the first measure, the fracture determination threshold $\varepsilon_{1(CAE)}^*$ that considers the CAE analysis measurement environment is acquired by acquiring the fracture strain measurement value $\varepsilon_{1(exp)}^*$ associated with the normal strain gradient measurement value $\Delta\varepsilon_{N(exp)}$ and the circumferential strain gradient measurement value $\Delta\varepsilon_{C(exp)}$ obtained in the measurement value acquisition process S1, that is, the fracture strain function (fracture strain function acquisition process), and converting the acquired values on the basis of the following Expressions (1) to (4).

$$\varepsilon_{1(CAE)}^* = f(\varepsilon_{1(exp)}^*, GL, L_{s(exp)}, \Delta\varepsilon_{N(exp)}, \Delta\varepsilon_{C(exp)}, ES, L_{s(CAE)}, \Delta\varepsilon_{N(CAE)}, \Delta\varepsilon_{C(CAE)})$$ Expression (1)

$$\varepsilon_{1(exp)}^* = f(\Delta\varepsilon_{N(exp)}, \Delta\varepsilon_{C(exp)})$$ Expression (2)

$$\Delta\varepsilon_{N(exp)} = f(GL, L_{s(exp)}, \Delta\varepsilon_{C(exp)}, \varepsilon_{(CAE)}, ES, L_{s(CAE)}, \Delta\varepsilon_{N(CAE)}, \Delta\varepsilon_{C(CAE)})$$ Expression (3)

$$\Delta\varepsilon_{C(exp)} = f(GL, L_{s(exp)}, \Delta\varepsilon_{N(exp)}, \varepsilon_{(CAE)}, ES, L_{s(CAE)}, \Delta\varepsilon_{N(CAE)}, \Delta\varepsilon_{C(CAE)})$$ Expression (4)

In the above Expressions (1) to (4),
$\varepsilon_{1(CAE)}^*$ is the fracture determination threshold,
$\varepsilon_{1(exp)}^*$ is the fracture strain measurement value acquired in the measurement value acquisition process S1,
GL is the gauge length used in the measurement value acquisition process S1,
$L_{S(exp)}$ is the gradient evaluation length used in the measurement value acquisition process S1,
$\Delta\varepsilon_{N(exp)}$ is the normal strain gradient measurement value acquired in the measurement value acquisition process S1, $\Delta\varepsilon_{C(exp)}$ is the circumferential strain gradient measurement value acquired in the measurement value acquisition process S1, $\varepsilon_{(CAE)}$ is the maximum major strain of the maximum major strain maximum element, ES is the element size used in the CAE analysis process S2, $L_{S(CAE)}$ is the gradient evaluation length used in the CAE analysis process S2, $\Delta\varepsilon_{N(CAE)}$ is the normal strain gradient used in the CAE analysis process S2, and $\Delta\varepsilon_{C(CAE)}$ is the circumferential strain gradient used in the CAE analysis process S2.

In addition, the fracture determination threshold may also be acquired by considering the processing conditions $Cl_{(exp)}$ for obtaining the plurality of sheet-shaped test pieces 1 and the processing conditions $Cl_{(CAE)}$ for obtaining the deformable sheet and converting the fracture strain function according to the CAE analysis measurement environment on the basis of the following Expressions (5) to (8).

$$\varepsilon_{1(CAE)}{}^* = f(\varepsilon_{1(exp)}{}^*, GL, L_{s(exp)}, \Delta\varepsilon_{N(exp)}, \Delta\varepsilon_{C(exp)}, ES, L_{s(CAE)}, \Delta\varepsilon_{N(CAE)}, \Delta\varepsilon_{C(CAE)})$$ Expression (5)

$$\varepsilon_{1(exp)}{}^* = f(\Delta\varepsilon_{N(exp)}, \Delta\varepsilon_{C(exp)}, Cl_{(exp)}, Cl_{(CAE)})$$ Expression (6)

$$\Delta\varepsilon_{N(exp)} = f(GL, L_{s(exp)}, \Delta\varepsilon_{C(exp)}, \varepsilon_{(CAE)}, ES, L_{s(CAE)}, \Delta\varepsilon_{N(CAE)}, \Delta\varepsilon_{C(CAE)})$$ Expression (7)

$$\Delta\varepsilon_{C(exp)} = f(GL, L_{s(exp)}, \Delta\varepsilon_{N(exp)}, \varepsilon_{(CAE)}, ES, L_{s(CAE)}, \Delta\varepsilon_{N(CAE)}, \Delta\varepsilon_{C(CAE)})$$ Expression (8)

(Second Measure)

In the second measure, strain distribution data representing the correlation between the measurement values acquired for each of the plurality of sheet-shaped test pieces 1 in the measurement value acquisition process S1 is converted according to the CAE analysis measurement environment.

First, strain distribution data representing the correlation among the fracture strain measurement value $\varepsilon_{1(exp)}{}^*$, the normal strain gradient measurement value $\Delta\varepsilon_{N(exp)}$, and the circumferential strain gradient measurement value $\Delta\varepsilon_{C(exp)}$ obtained in the measurement value acquisition process S1 is acquired with a gauge length GL smaller than the element size ES of the CAE measurement environment for each of the plurality of sheet-shaped test pieces 1 (strain distribution data acquisition process). The range of the gauge length GL is preferably a range of 0.1 mm to 1.0 mm, and more preferably 0.1 mm.

In addition, the strain distribution data is processed according to the element size ES of the CAE analysis measurement environment, a fracture determination curved surface is generated by using the processed strain distribution data, and the fracture determination threshold $\varepsilon_{1(CAE)}{}^*$ is acquired from the fracture determination curved surface. As a processing method, for example, a strain distribution is acquired with a pitch of 0.1 mm, and in a case where processing is performed according to an element size of ES=2.0 mm in the CAE analysis measurement environment, processing for obtaining an average value of 20 points as 1 point is performed.

Strain distribution data representing the correlation among the fracture strain measurement value $\varepsilon_{1(exp)}{}^*$, the normal strain gradient measurement value, $\Delta\varepsilon_{N(exp)}$, and the circumferential strain gradient measurement value $\Delta\varepsilon_{C(exp)}$ may also be acquired for each of the sheet-shaped test pieces 1 by using the plurality of sheet-shaped test pieces 1 processed under a plurality of test piece processing conditions (punching with different clearances, laser processing with different laser output conditions, and the like) (strain distribution data acquisition process). In this case, the fracture determination threshold $\varepsilon_{1(CAE)}{}^*$ with higher accuracy than that obtained by considering the processing conditions can be acquired by processing, according to the CAE analysis measurement environment, the strain distribution data of the test piece processing conditions according to the CAE analysis measurement environment and generating a fracture determination curved surface.

As the strain distribution data, a strain distribution function of the following Expression (9) may be used.

$$\varepsilon = f(B_N, C_N, B_C, C_C, \varepsilon_0)$$ Expression (9)

In Expression (9), $\varepsilon_0$ is the maximum major strain, $B_N$ is a material parameter representing the broadening size of the vicinity of a peak in the normal direction, $C_N$ is a material parameter representing the severity of a gradient in the normal direction, $B_C$ is a material parameter representing the broadening size of the vicinity of a peak in the circumferential direction, and $C_C$ is a material parameter representing the severity of a gradient in the circumferential direction.

(Prediction Process S4)

In the prediction process, in order to more accurately predict initiation of stretch flange cracks during stretch flange forming, the maximum major strain $\varepsilon$ obtained in the CAE analysis process S2 to the fracture determination threshold $\varepsilon_{1(CAE)}{}^*$ obtained in the fracture determination threshold acquisition process S3.

When the maximum major strain $\varepsilon$ obtained in the CAE analysis process S2 is equal to or higher than the fracture determination threshold $\varepsilon_{1(CAE)}{}^*$ obtained in the fracture determination threshold acquisition process S3 ($\varepsilon \geq \varepsilon_{1(CAE)}{}^*$), the maximum major strain $\varepsilon$ is equal to or higher than the fracture strain of the end section, which is a condition of initiation of stretch flange cracks. Therefore, it is predicted that stretch flange cracks will be initiated.

When the maximum major strain $\varepsilon$ obtained in the CAE analysis process S2 is lower than the fracture determination threshold $\varepsilon_{1(CAE)}{}^*$ obtained in the fracture determination threshold acquisition process S3 ($\varepsilon < \varepsilon_{1(CAE)}{}^*$), the maximum major strain $\varepsilon$ is lower than the fracture strain of the end section, which is a condition of initiation of stretch flange cracks. Therefore, it is predicted that stretch flange cracks will not be initiated.

In a case where it is predicted that stretch flange cracks will be initiated, a kind of steel, a blank shape before forming, a product shape, forming conditions, and the like are changed, and the prediction method is repeated until it is predicted that stretch flange cracks will not be initiated.

In a case where it is predicted that stretch flange cracks will not be initiated, an actual steel sheet is formed into a product shape under the CAE analysis conditions.

Second Embodiment

Figure 17:
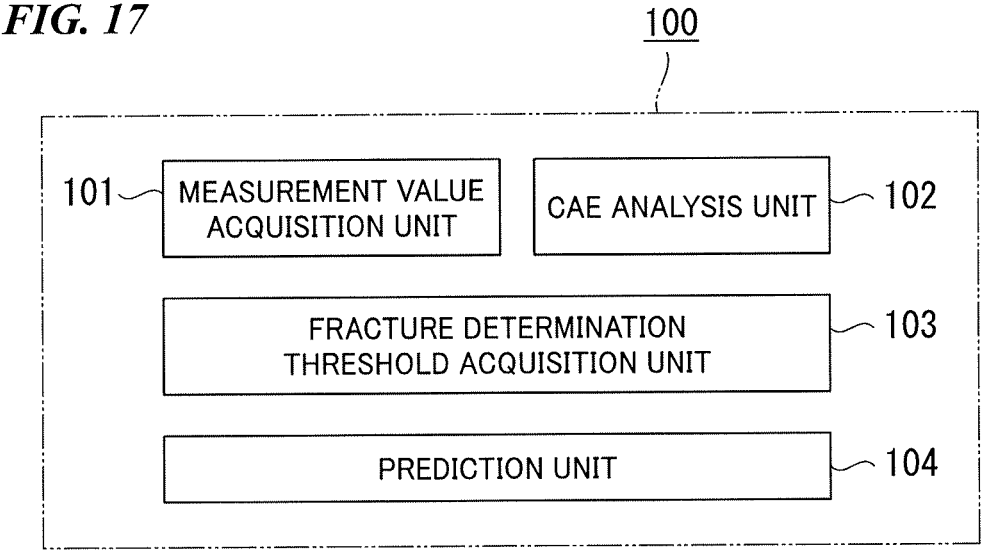
FIG. 17 is a view schematically illustrating a stretch flange crack prediction apparatus 100 according to a second embodiment of the present invention.

A stretch flange crack prediction apparatus 100 according to a second embodiment of the present invention executes a stretch flange crack prediction method described in the first embodiment according to an embedded computer program. As illustrated in FIG. 17, the stretch flange crack prediction apparatus 100 includes a measurement value acquisition unit 101, a CAE analysis unit 102, a fracture determination threshold acquisition unit 103, and a prediction unit 104.

The measurement value acquisition unit 101 acquires a fracture strain measurement value, a normal strain gradient measurement value, and a circumferential strain gradient measurement value, for each of a plurality of sheet-shaped test pieces, under an experimental measurement environment with a predetermined gauge length and a predetermined gradient evaluation length.

The CAE analysis unit 102 acquires, on the basis of forming data regarding a flange end section obtained through numerical analysis by a finite element method of a stretch flange forming process of a deformable sheet under a CAE analysis measurement environment with a predetermined element size and a predetermined gradient evaluation length, a maximum major strain maximum element having the highest maximum major strain, the normal strain gradient of the maximum major strain maximum element, and the circumferential strain gradient of the maximum major strain maximum element.

The fracture determination threshold acquisition unit 103 acquires a fracture determination threshold by converting the fracture strain measurement value obtained by the measurement value acquisition unit under the experimental measurement environment, on the basis of, in addition to the normal strain gradient measurement value and the circumferential strain gradient measurement value, the element size, the gradient evaluation length, the normal strain gradient, and the circumferential strain gradient in the CAE analysis unit.

The prediction unit 104 predicts that stretch flange cracks will be initiated, when the maximum major strain is equal to or higher than the fracture determination threshold by comparing the maximum major strain of the maximum major strain maximum element to the fracture determination threshold.

The measurement value acquisition unit 101, the CAE analysis unit 102, the fracture determination threshold acquisition unit 103, and the prediction unit 104 described above respectively correspond to the measurement value acquisition process S1, the CAE analysis unit process S2, the fracture determination threshold acquisition process S3, and the prediction process S4 described in the first embodiment. The stretch flange crack prediction apparatus 100 according to the second embodiment may have configurations corresponding to various processes described in the first embodiment, for example, a fracture strain function acquisition unit, a strain distribution data acquisition unit, an element extraction unit, an element array specification unit, a strain gradient calculation unit, and the like.

Figure 18:
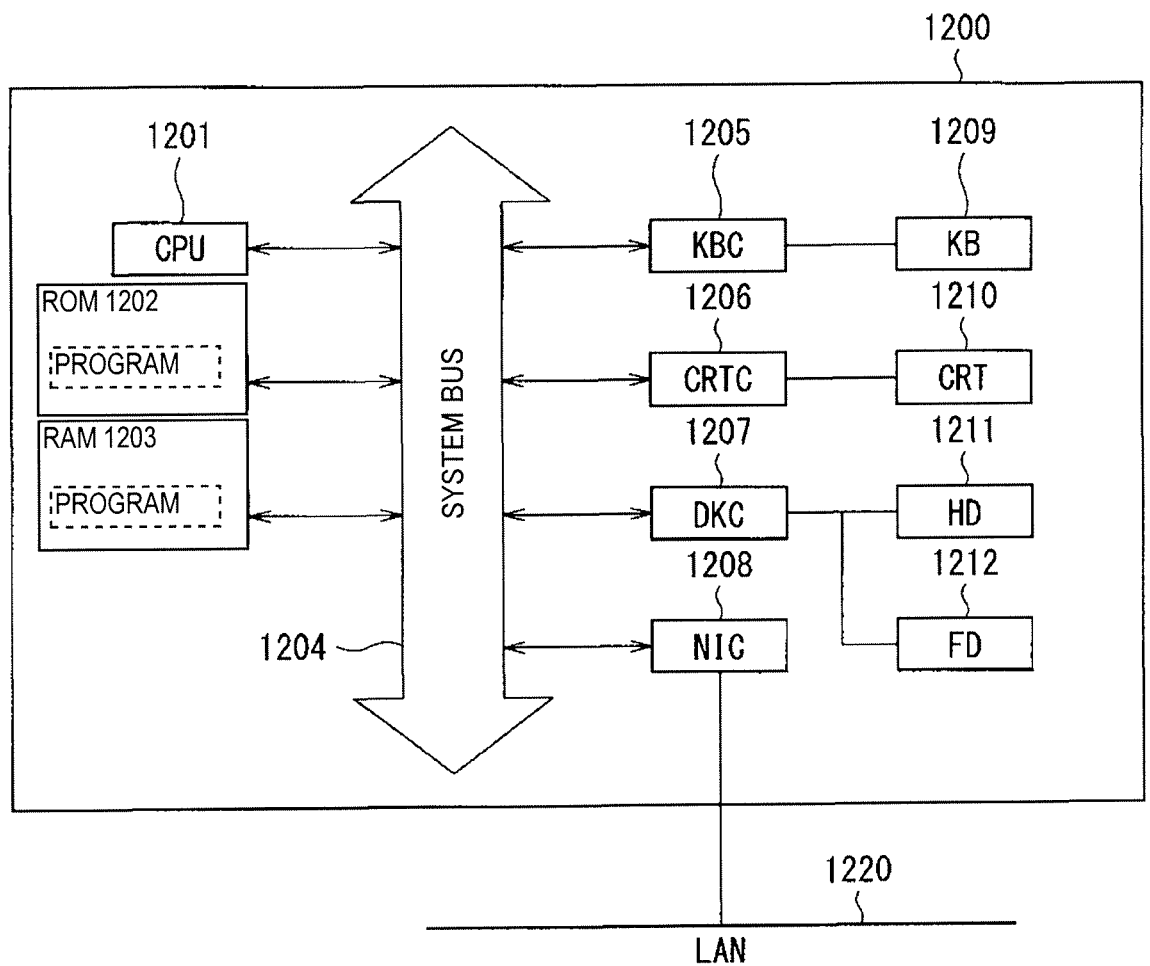
FIG. 18 is a view illustrating a system bus for operating a computer program.

FIG. 18 illustrates a system bus for operating a computer program.

The function of each of units constituting the stretch flange crack prediction apparatus 100 described above may be realized by operating a program stored in a RAM, ROM, or the like of a computer. Similarly, each step of the prediction method may be realized by operating the program stored in the RAM, ROM, or the like of the computer. The program and a computer-readable storage medium on which the program is recorded are included in the present invention.

Specifically, the program is provided for the computer by being recorded on a recording medium such as a CD-ROM or via various transmission media. As the recording medium on which the program is recorded, in addition to the CD-ROM, a flexible disk, a hard disk, a magnetic tape, a magneto-optical disc, a non-volatile memory card, or the like may be used. On the other hand, as the transmission medium of the program, a communication medium in a computer network system for supplying program information by causing carriers to propagate may be used. Here, the computer network is a LAN, a WAN such as the Internet, a wireless communication network, or the like. The communication medium is a wire line such as an optical fiber, a wireless line, or the like.

In addition, the program included in the present invention is not limited only to the functions of the above-described embodiment realized by the computer to execute the supplied program. For example, even in a case where the functions of the above-described embodiment are realized in cooperation with an OS (operating system) operated according to the program in the computer or another application software, the program is included in the embodiment. In addition, even in a case where the functions of the above-described embodiment are realized by executing the entirety or a part of the processes of the supplied program in a function expansion board or function expansion unit of the computer, the program is included in the present invention.

For example, FIG. 18 is a schematic view illustrating the internal configuration of a personal user terminal device. In FIG. 18, 1200 denotes a personal computer (PC) provided with a CPU 1201. The PC 1200 executes a device control software stored in a ROM 1202 or a hard disk (HD) 1211 or supplied from a flexible disk (FD) 1212. The PC 1200 collectively controls each device connected to a system bus 1204.

By the program stored in the CPU 1201, the ROM 1202, or the hard disk (HD) 1211 of the PC 1200, each procedure in the embodiment is realized.

1203 denotes a RAM and functions as a main memory, work area, or the like of the CPU 1201. 1205 denotes a keyboard controller (KBC), which controls an instruction input from a keyboard (KB) 1209, a device (not illustrated), or the like.

1206 denotes a CRT controller (CRTC), which controls displaying of a CRT display (CRT) 1210. 1207 denotes a disk controller (DKC). A DKC 1207 controls access to the hard disk (HD) 1211 which stores a boot program, a plurality of applications, an edit file, a user file, a network management program, and the like, and to the flexible disk (FD) 1212. Here, the boot program is a start up program: a program for starting execution (operation) of hard disks, softwares, and the like of a PC.

1208 denotes a network interface card (NIC), which enables two-way data exchange with a network printer, another network device, or another PC via a LAN 1220.

According to the personal user terminal, without a calculation that takes a long time due to matrix operations of large-scale simultaneous equations, initiation of stretch flange cracks can be predicted more rapidly, reliably, and more accurately by a simple calculation.

As described above, another aspect of the present invention includes the program that causes the stretch flange crack prediction method described in the first embodiment to be executed by the stretch flange crack prediction apparatus described in the second embodiment, and further includes a computer-readable recording medium on which the program is recorded.

While the present invention has been described in detail on the basis of the embodiment, the embodiment describes only a specific example to realize the present invention, and the technical scope of the present invention should not be construed as being limited thereto.

For example, in the above description, the steel sheet is used as the deformable sheet. However, as the material of the deformable sheet, a metallic material such as aluminum or titanium, a glass-fibre-reinforced resin material such as FRP or FRTP, or a composite material thereof may be used.

In addition, regarding the measurement value acquisition process, various measurement values are acquired on the basis of the experiment in the above description. However, methods to acquire various measurement values are not limited thereto.

Example

Next, an example of the present invention will be described. A condition of the example is a conditional example employed to confirm the applicability and effects of the present invention, and is not limited to the conditional example. The present invention can employ various conditions as long as the object of the present invention can be accomplished without departing from the gist of the present invention.

Figure 19:
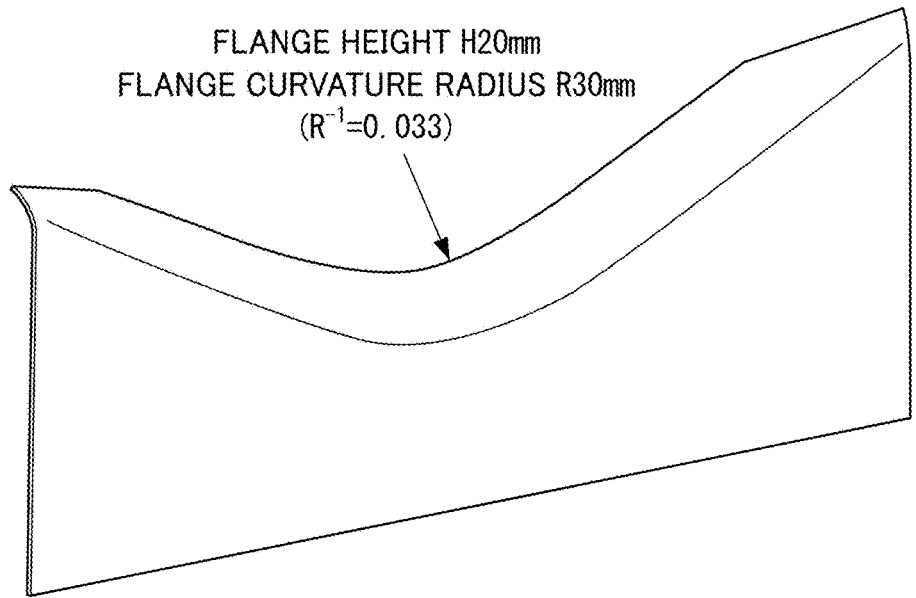
FIG. 19 is a perspective view of a press-formed component used in an example.

Prediction of flange cracks in a case where a saddle-shaped molded product having a shape illustrated in FIG. 19 is formed by using a cold rolled steel sheet having a sheet thickness of 1.6 mm in a tensile strength grade of 590 MPa as a black material was performed. A flange section of the saddle-shaped molded product has a height of H=20 mm and a curvature of $R^{-1}$=0.033.

(Measurement Value Acquisition)

By performing punching on a cold rolled steel sheet having a sheet thickness of 1.6 mm in a tensile strength grade of 590 MPa, sheet-shaped test pieces of six types illustrated in FIGS. 5A to 6F were acquired.

In addition, for each of the sheet-shaped test pieces, by using a side bend tester illustrated in FIGS. 3 and 4, a fracture strain measurement value $\varepsilon_{1(exp)}^{*}$, a normal strain gradient measurement value $\Delta\varepsilon_{N(exp)}$, and a circumferential strain gradient measurement value $\Delta\varepsilon_{C(exp)}$ under an experimental measurement environment with GL=2.0 mm and $L_{S(exp)}$=8.0 mm were acquired. The results are shown in Table 2.

TABLE 2

| Sheet-shaped test piece | Circumferential strain gradient measurement value $\Delta\varepsilon_{C(exp)}$ | Normal strain gradient measurement value $\Delta\varepsilon_{N(exp)}$ | Fracture strain measurement value $\varepsilon_{1\ (exp)}^{*}$ |
|---|---|---|---|
| Type 1 | 0.0310 | 0.0452 | 0.407 |
| Type 2 | 0.0440 | 0.0323 | 0.364 |
| Type 3 | 0.0269 | 0.0249 | 0.383 |
| Type 4 | 0.0715 | 0.0816 | 0.398 |
| Type 5 | 0.0415 | 0.0673 | 0.429 |
| Type 6 | 0.0195 | 0.0650 | 0.459 |

(CAE Analysis)

Figure 20:
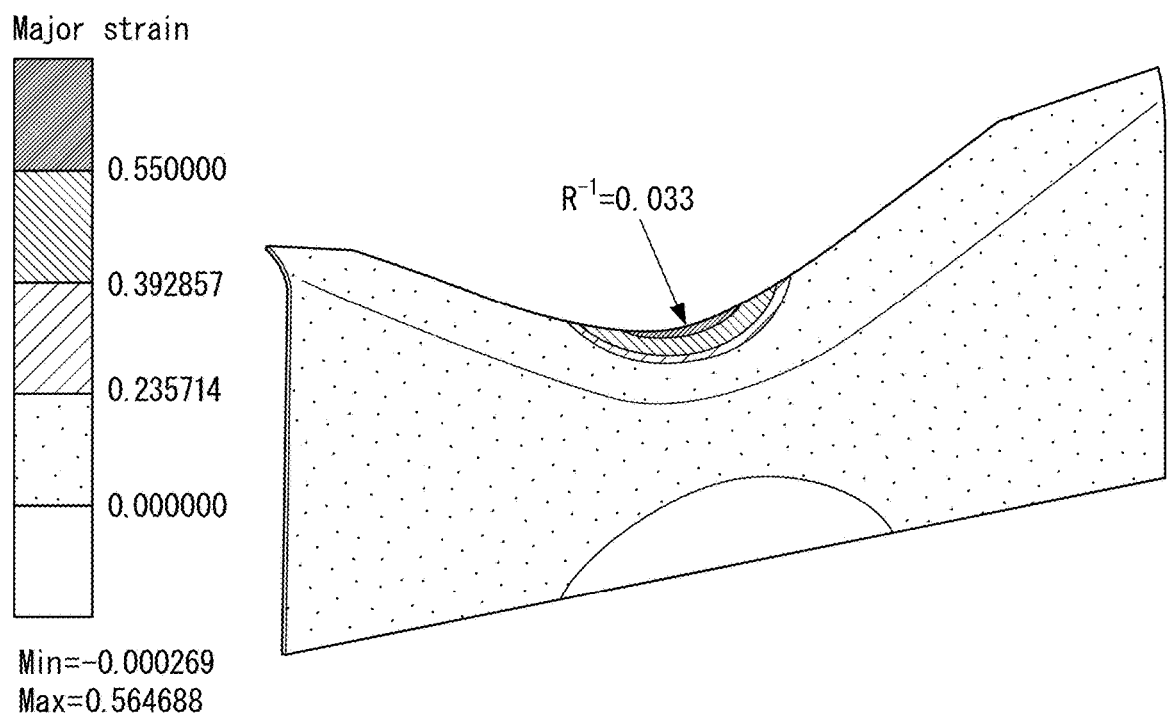
FIG. 20 is a contour diagram illustrating the distribution of major strains obtained through CAE analysis of the press-formed component.
Figure 21A:
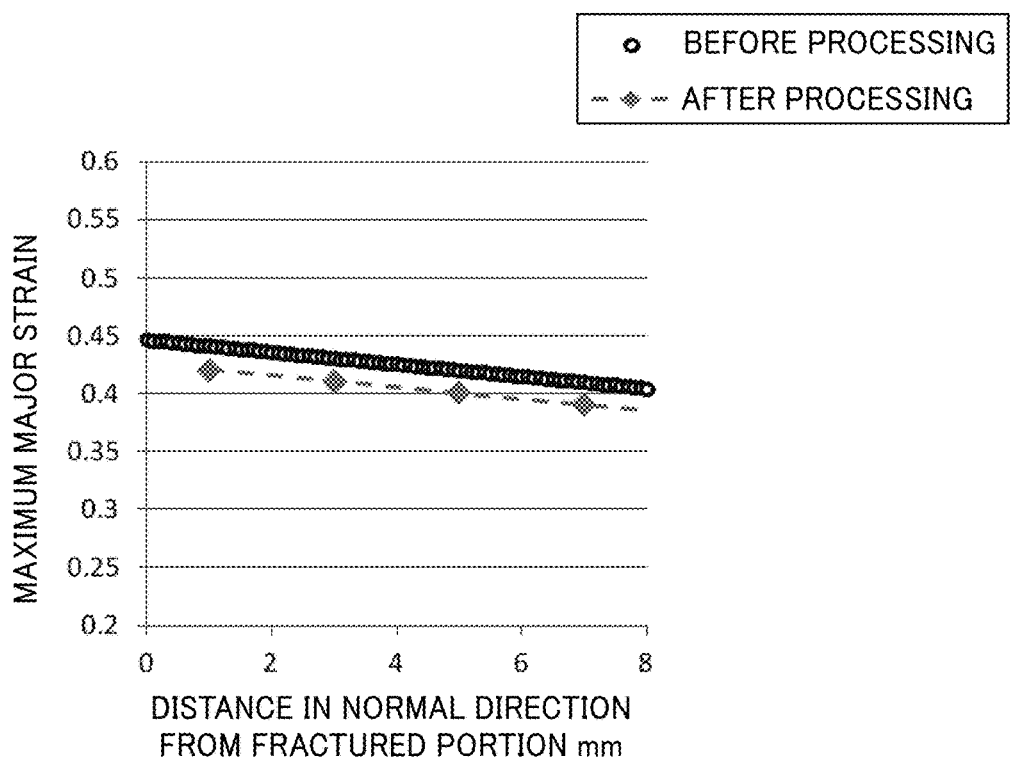
FIG. 21A is a diagram of strain distributions before and after being processed into data of normal strain gradients under a CAE analysis measurement environment for the sheet-shaped test piece 1a of the type 1.
Figure 21B:
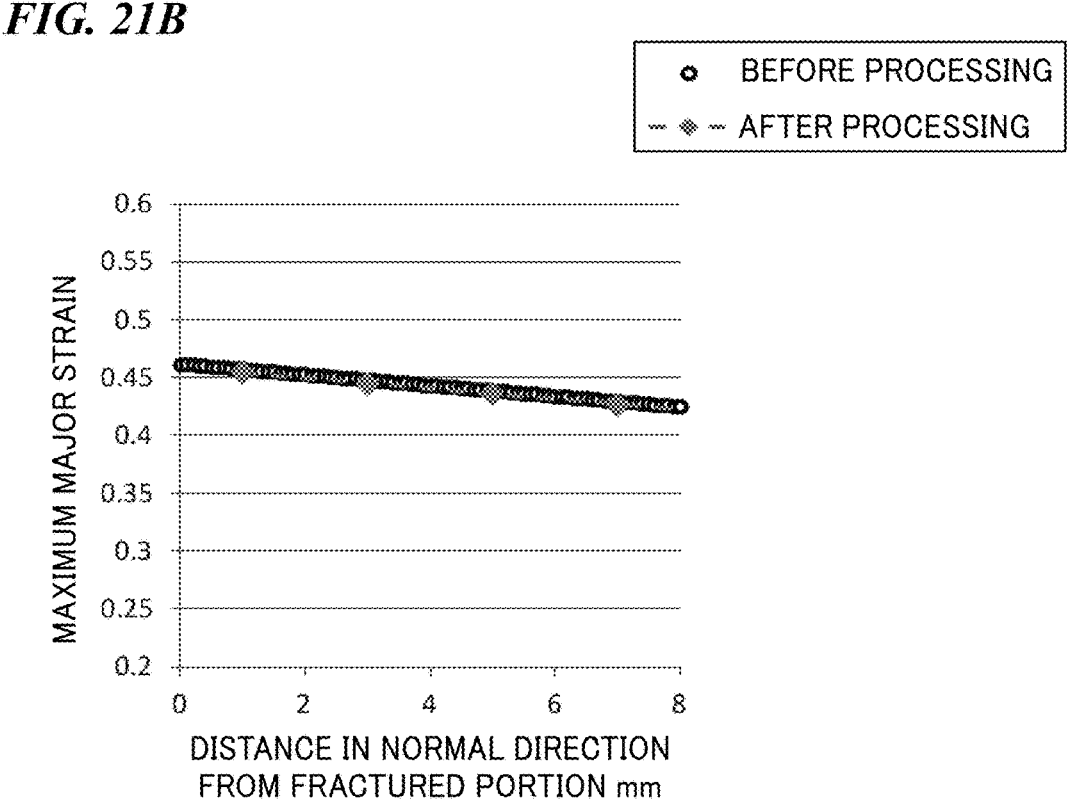
FIG. 21B is a diagram of strain distributions before and after being processed into data of normal strain gradients under the CAE analysis measurement environment for the sheet-shaped test piece 1b of the type 2.
Figure 21C:
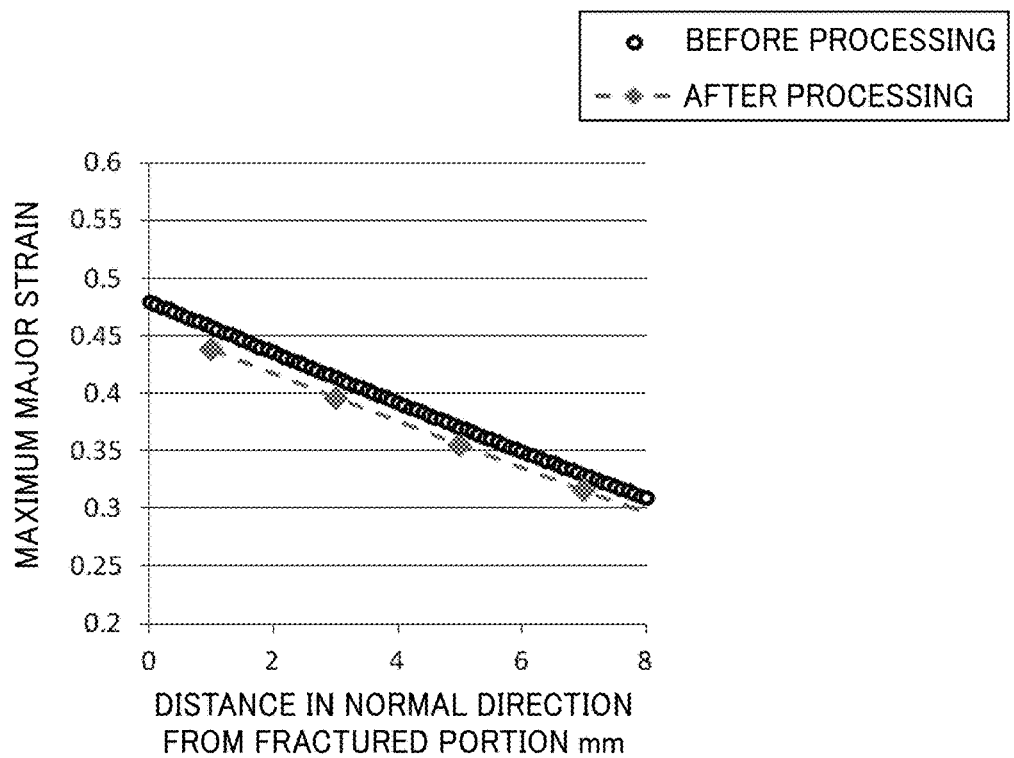
FIG. 21C is a diagram of strain distributions before and after being processed into data of normal strain gradients under the CAE analysis measurement environment for the sheet-shaped test piece 1c of the type 3.
Figure 21D:
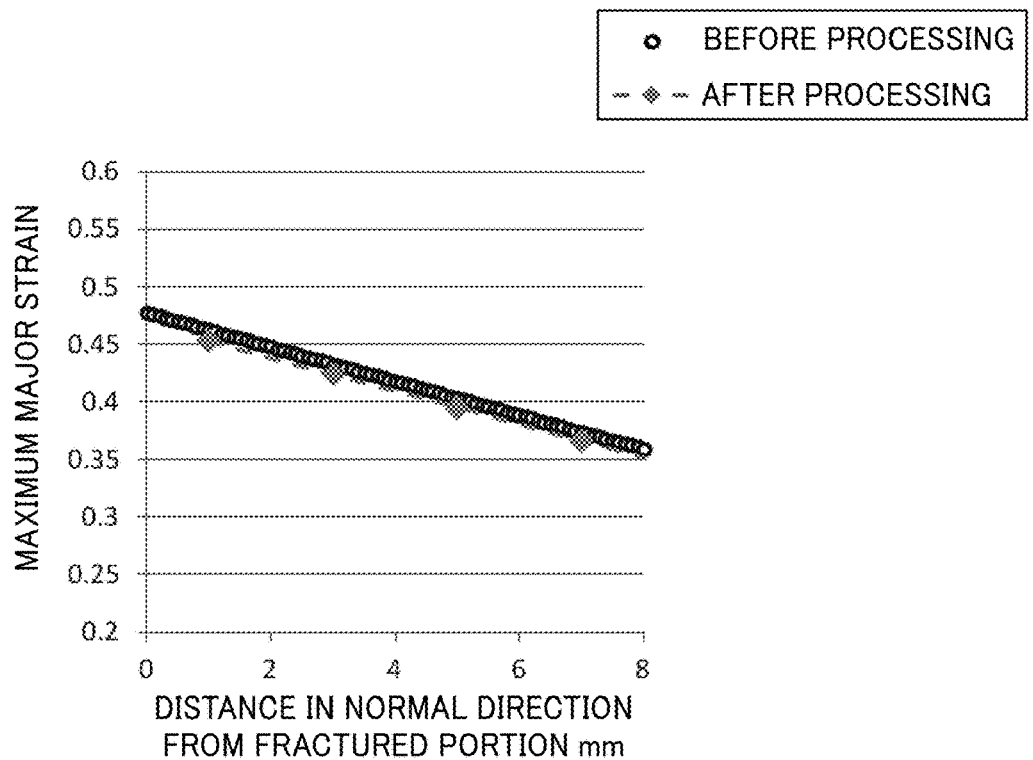
FIG. 21D is a diagram of strain distributions before and after being processed into data of normal strain gradients under the CAE analysis measurement environment for the sheet-shaped test piece 1d of the type 4.
Figure 21E:
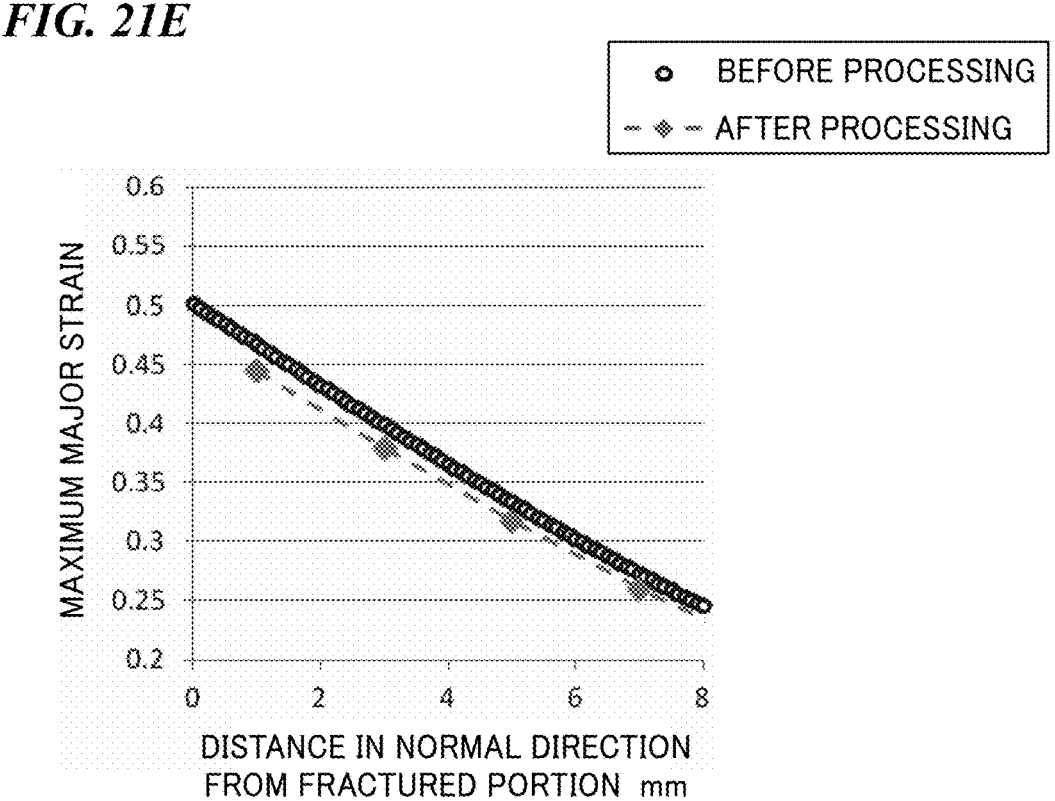
FIG. 21E is a diagram of strain distributions before and after being processed into data of normal strain gradients under the CAE analysis measurement environment for the sheet-shaped test piece 1e of the type 5.
Figure 21F:
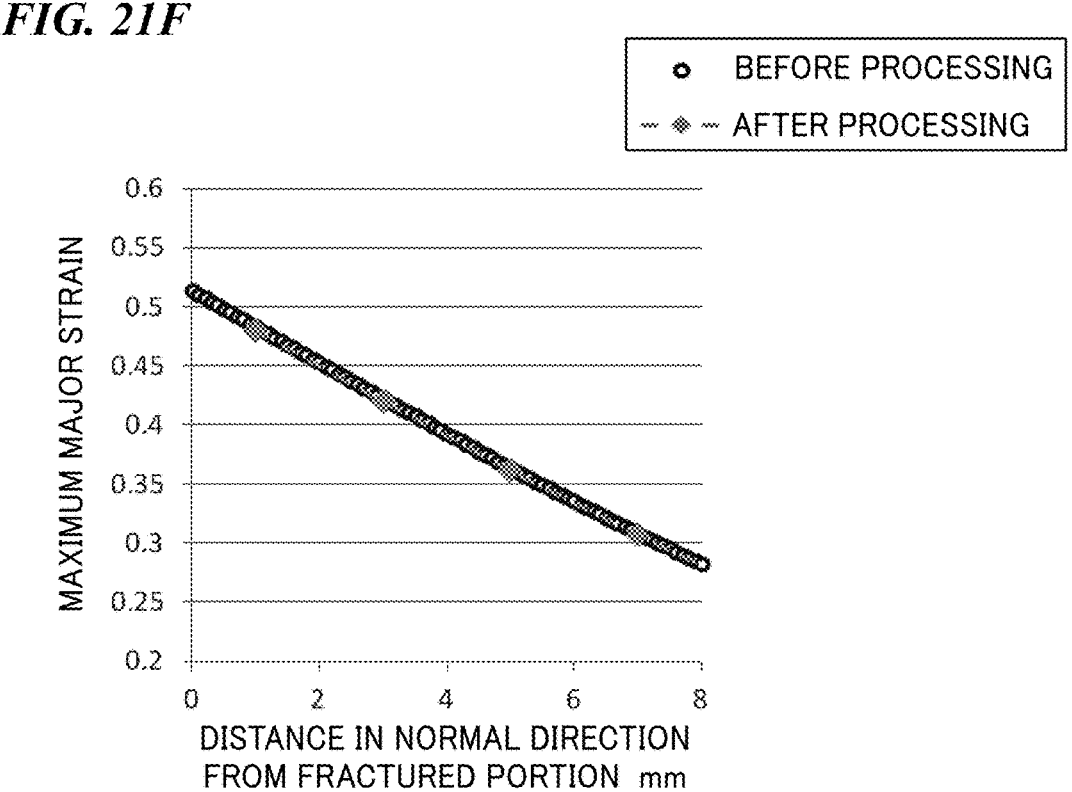
FIG. 21F is a diagram of strain distributions before and after being processed into data of normal strain gradients under the CAE analysis measurement environment for the sheet-shaped test piece 1f of the type 6.
Figure 22A:
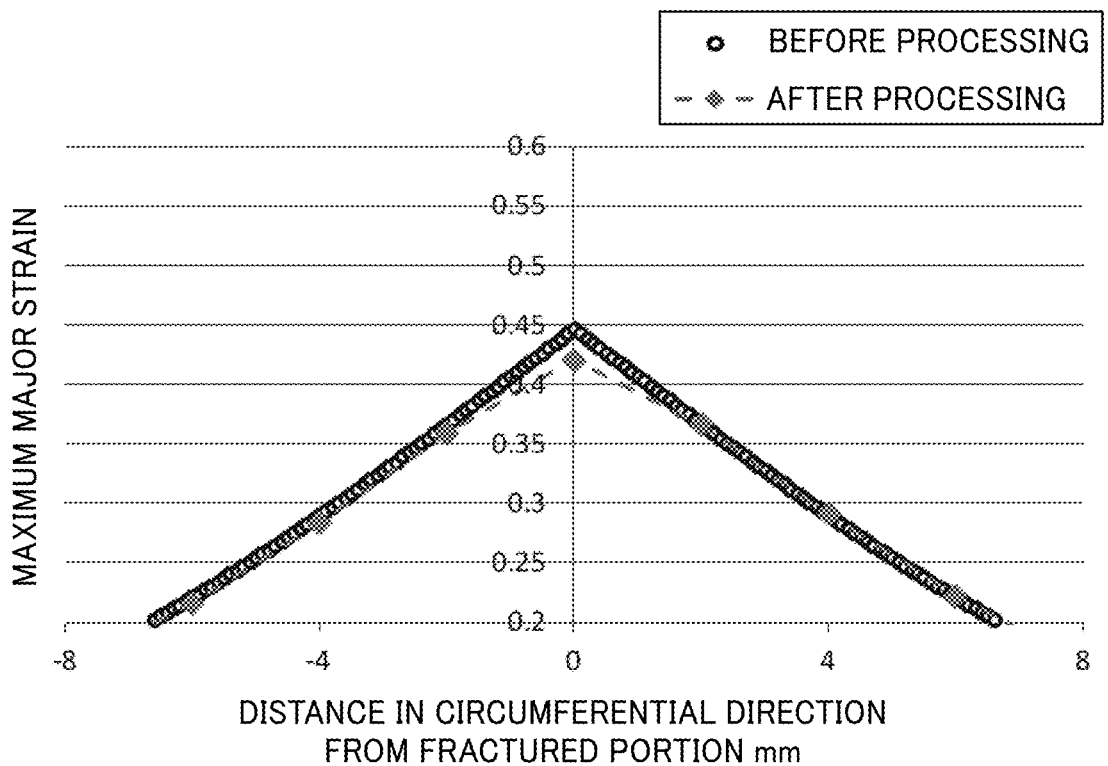
FIG. 22A is a diagram of strain distributions before and after being processed into data of circumferential strain gradients under the CAE analysis measurement environment for the sheet-shaped test piece 1a of the type 1.
Figure 22B:
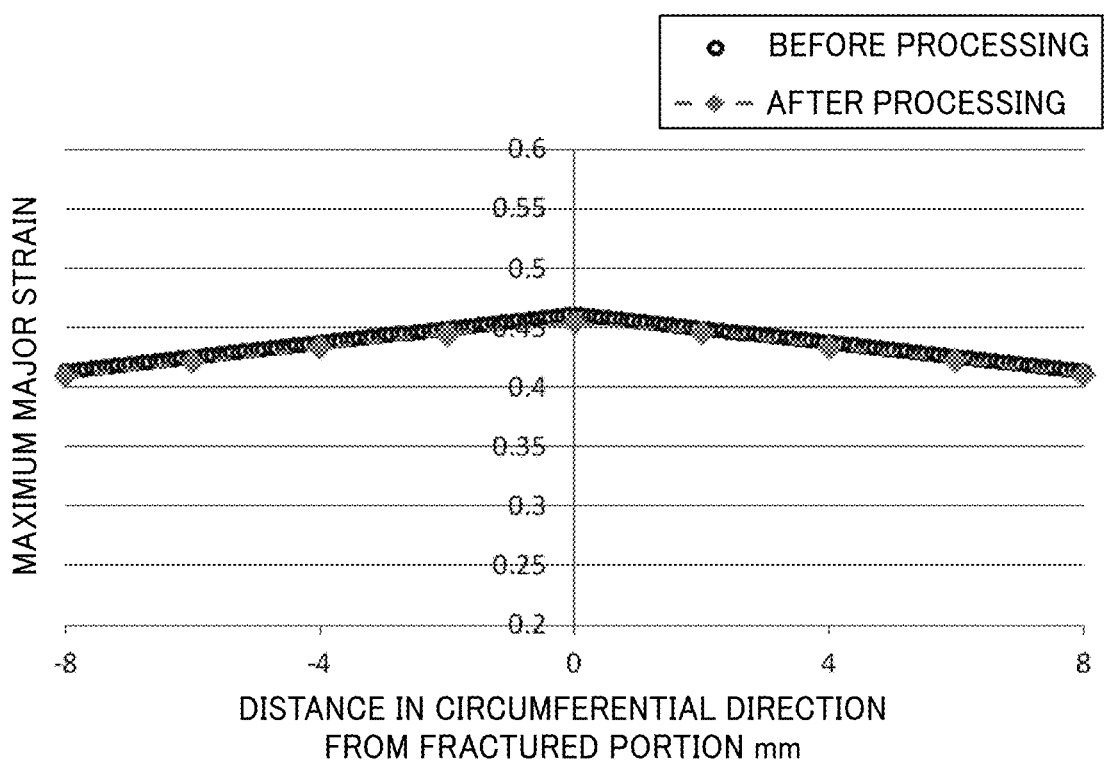
FIG. 22B is a diagram of strain distributions before and after being processed into data of circumferential strain gradients under the CAE analysis measurement environment for the sheet-shaped test piece 1b of the type 2.
Figure 22C:
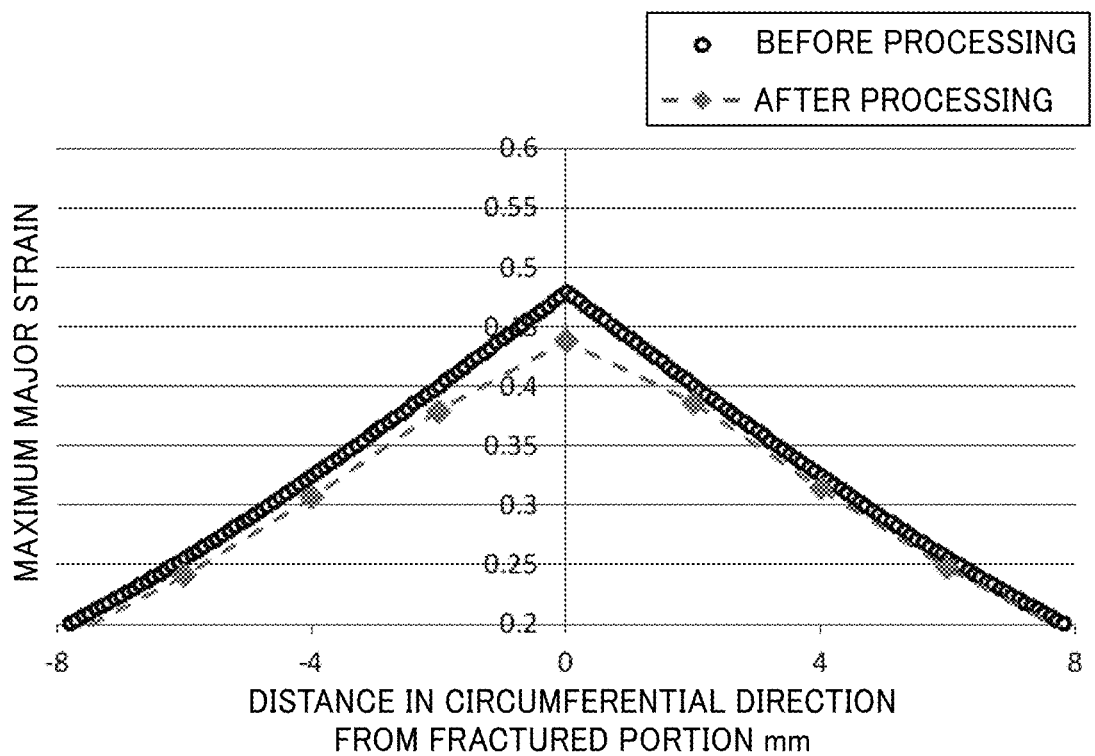
FIG. 22C is a diagram of strain distributions before and after being processed into data of circumferential strain gradients under the CAE analysis measurement environment for the sheet-shaped test piece 1c of the type 3.
Figure 22D:
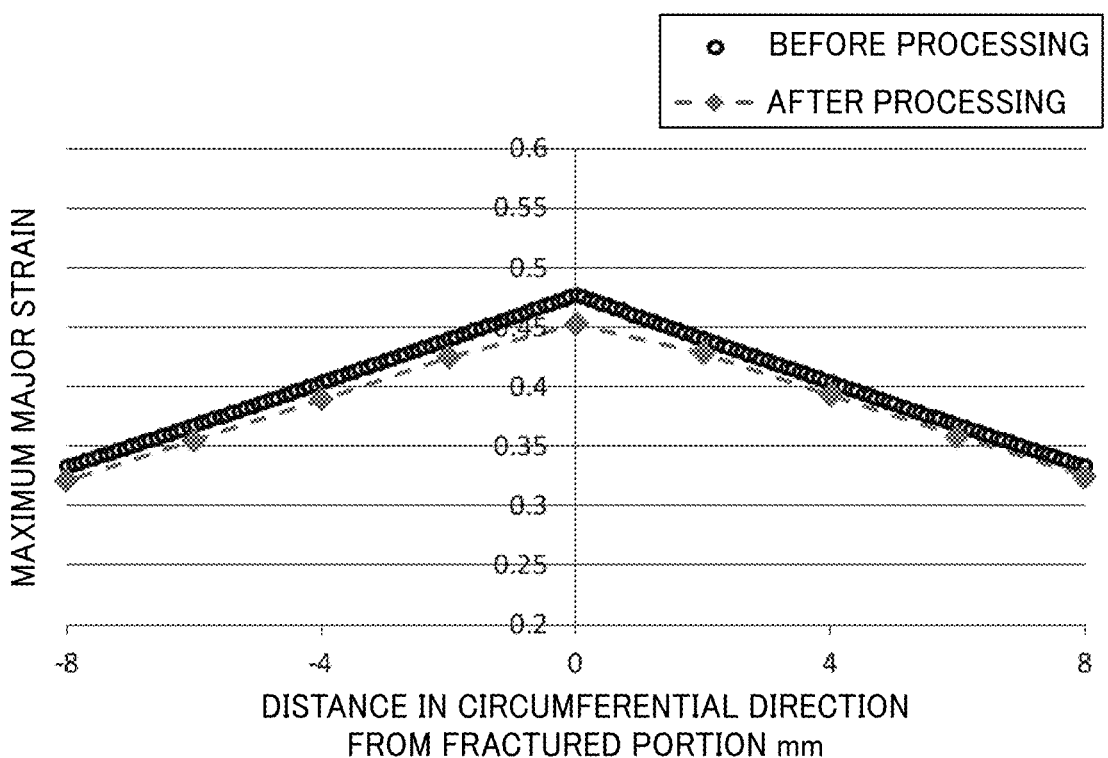
FIG. 22D is a diagram of strain distributions before and after being processed into data of circumferential strain gradients under the CAE analysis measurement environment for the sheet-shaped test piece 1d of the type 4.
Figure 22E:
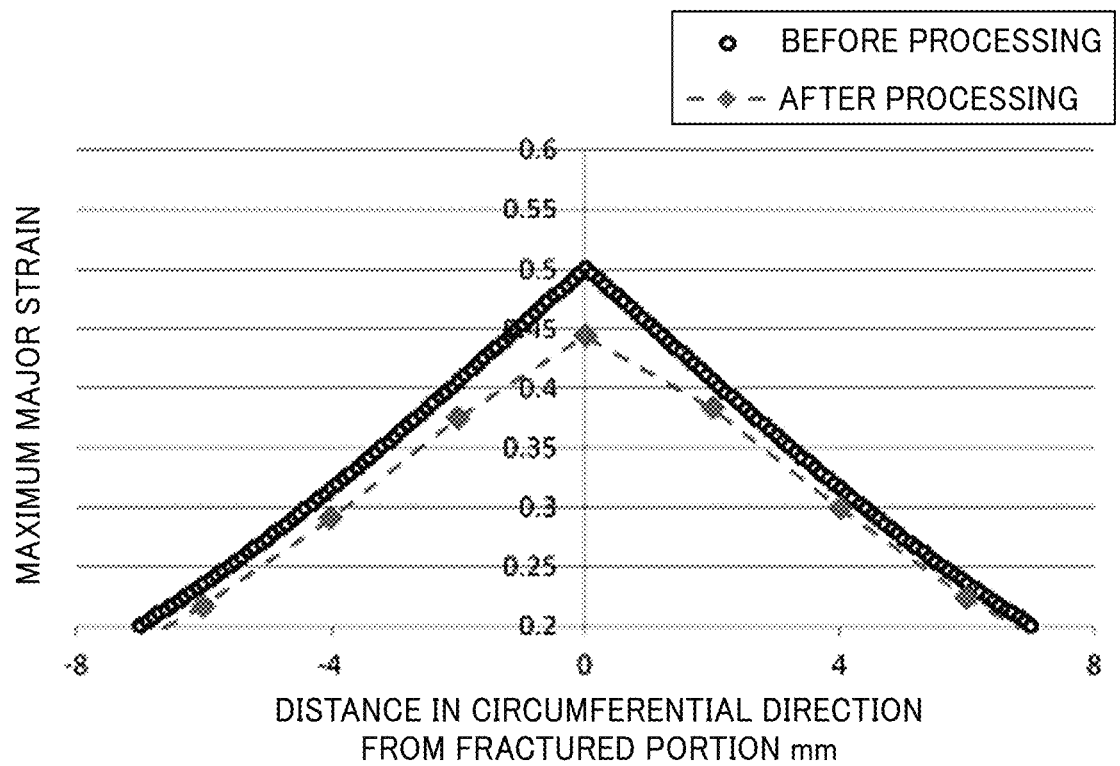
FIG. 22E is a diagram of strain distributions before and after being processed into data of circumferential strain gradients under the CAE analysis measurement environment for the sheet-shaped test piece 1e of the type 5.
Figure 22F:
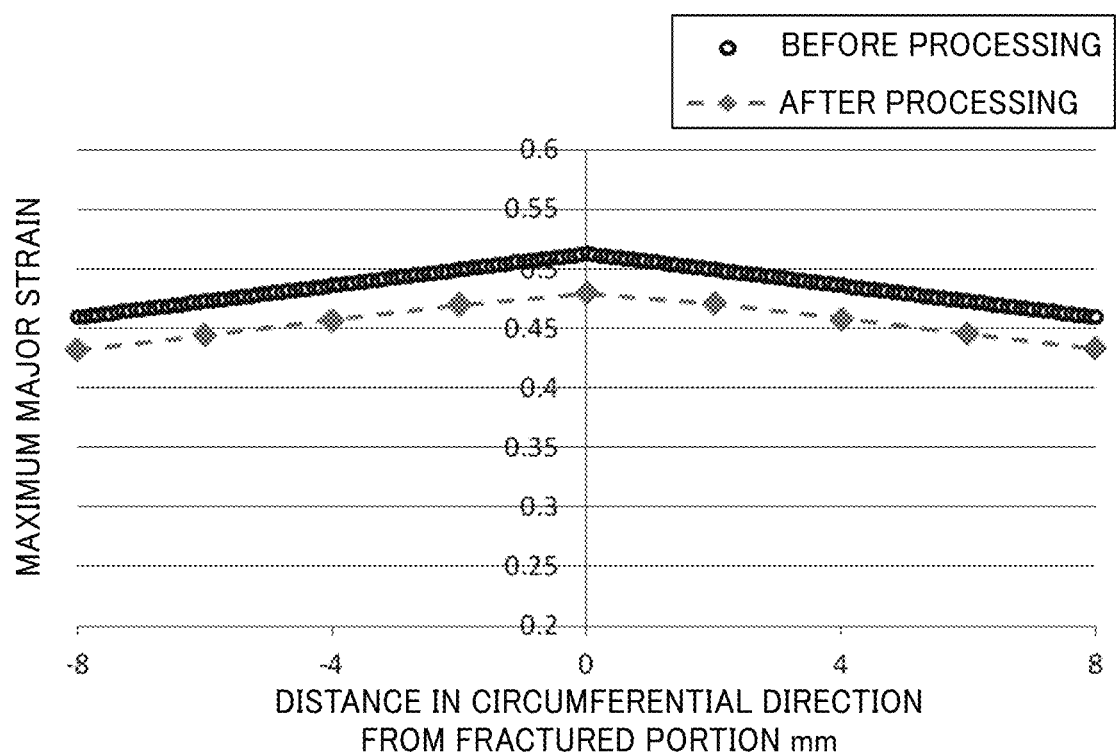
FIG. 22F is a diagram of strain distributions before and after being processed into data of circumferential strain gradients under the CAE analysis measurement environment for the sheet-shaped test piece 1f of the type 6.

A maximum major strain maximum element α, the normal strain gradient $\Delta\varepsilon_{N(CAE)}$ of the maximum major strain maximum element α, and the circumferential strain gradient $\Delta\varepsilon_{C(CAE)}$ of the maximum major strain maximum element α under a CAE analysis measurement environment with an element size of ES=2.0 mm and a gradient evaluation length of Ls(CAE)=4.0 mm were calculated by a finite element method of a process of press-forming a cold rolled steel sheet into the shape illustrated in FIG. 19. As a solver of the finite element method, LS-DYNA which is a commercially available FEM code was used. FIG. 20 shows a contour diagram illustrating the distribution of major strains obtained through CAE analysis of the press-formed component.

A strain gradient and a circumferential strain gradient were calculated by analyzing forming data using the element selection algorithm illustrated in FIGS. 13 and 16.

As a result, the following was obtained:

the maximum major strain $\varepsilon_{(CAE)}$ of the maximum major strain maximum element α=0.57;

the normal strain gradient $\Delta\varepsilon_{N(CAE)}$ of the maximum major strain maximum element α=0.0236; and the circumferential strain gradient $\Delta\varepsilon_{C(CAE)}$ of the maximum major strain maximum element α=0.0153.

(Fracture Determination Threshold Acquisition 1)

In order to calculate a fracture determination threshold $\varepsilon_{1(CAE)}^{*}$ for determining the presence or absence of stretch flange cracks, the following Expressions (10) to (13) were used. The expressions are specific examples of Expressions (1) to (4) in the first embodiment.

The experimental measurement environment and punching conditions were fixed as constants in advance.

Parameters of Expression (11) are material parameters, and parameters of Expressions (10), (12), and (13) are experimental measurement environment parameters.

$$\varepsilon_{1(CAE)}^{*} = \varepsilon_{1(exp)}^{*} \cdot \begin{pmatrix} a_1 + b_1 \cdot \Delta\varepsilon_{N(CAE)}^{c_1} + d_1 \cdot \Delta\varepsilon_{C(CAE)}^{e_1} + f_1 \cdot E.S.^{g_1} \cdot \\ \Delta\varepsilon_{N(CAE)}^{h_1} + i_1 \cdot E.S.^{j_1} \cdot \Delta\varepsilon_{C(CAE)}^{k_1} + l_1 \cdot L_{s(CAE)}^{m_1} \cdot \\ \Delta\varepsilon_{N(CAE)}^{n_1} + o_1 \cdot L_{s(CAE)}^{p_1} \cdot \Delta\varepsilon_{C(CAE)}^{q_1} \end{pmatrix}$$ Expression (10)

$$\varepsilon_{1(exp)}^{*} = a_2 + b_2 \cdot \Delta\varepsilon_{N(exp)}^{1.5} + c_2 \cdot \Delta\varepsilon_{C(exp)}^{1.5}$$ Expression (11)

$$\Delta\varepsilon_{N(exp)} = \Delta\varepsilon_{N(CAE)}$$ Expression (12)

$$\begin{pmatrix} a_3 + b_3 \cdot \varepsilon_{(CAE)}^{c_3} + d_3 \cdot E.S.^{e_3} + f_3 \cdot L_{s(CAE)}^{g_3} + h_3^{\varepsilon(CAE)} + \\ i_3^{E.S.} + j_3^{L_{s(CAE)}} + k_3^{\Delta\varepsilon_{N(CAE)}} + l_3^{\Delta\varepsilon_{C(CAE)}} + \\ m_3 \exp(n_3 \cdot \varepsilon_{(CAE)}) + o_3 \exp(p_3 \cdot E.S.) \end{pmatrix}$$

$$\Delta\varepsilon_{C(exp)} = \Delta\varepsilon_{C(CAE)}$$ Expression (13)

$$\begin{pmatrix} a_4 + b_4 \cdot \varepsilon_{(CAE)}^{c_4} + d_4 \cdot E.S.^{e_4} + f_4 \cdot L_{s(CAE)}^{g_4} + h_4 \cdot \\ \varepsilon_{(CAE)}^{i_4} \cdot E.S.^{j_4} + k_4 \cdot \varepsilon_{(CAE)}^{l_4} \cdot L_{s(CAE)}^{m_4} + n_4 \cdot E.S.^{o_4} \cdot \\ L_{s(CAE)}^{p_4} + q_4^{\varepsilon(CAE)} + r_4^{E.S.} + s_4 \exp(t_4 \cdot \varepsilon_{(CAE)}) + \\ u_4 \exp(v_4 \cdot E.S.) + w_4 \exp(x_4 \cdot L_{s(CAE)}) \end{pmatrix}$$

The fracture determination threshold $\varepsilon_{1(CAE)}^{*}$ was acquired by substituting parameters shown in Table 3 into the above Expressions (10) to (13).

TABLE 3

| Parameters in Expression (10) (Experimental measurement environment parameters) | | Parameters in Expression (11) (Material parameters) | | Parameters in Expression (12) (Experimental measurement environment parameters) | | Parameters in Expression (13) (Experimental measurement environment parameters) | |
|---|---|---|---|---|---|---|---|
| Symbol | Value | Symbol | Value | Symbol | Value | Symbol | Value |
| $a_1$ | 1.27 | $a_2$ | 0.389 | $a_3$ | −0.328 | $a_4$ | −0.312 |
| $b_1$ | 0.309 | $b_2$ | 5.26 | $b_3$ | 0.813 | $b_4$ | −7.7 |
| $c_1$ | −0.681 | $c_2$ | −5.93 | $c_3$ | 1.39 | $c_4$ | 2.64 |
| $d_1$ | 0.542 | | | $d_3$ | −0.853 | $d_4$ | −1.97 |
| $e_1$ | −0.632 | | | $e_3$ | −0.309 | $e_4$ | 0.841 |
| $f_1$ | 1.15 | | | $f_3$ | −1.16 | $f_4$ | −0.195 |
| $g_1$ | −2.1 | | | $g_3$ | −0.225 | $g_4$ | −0.2 |
| $h_1$ | 0.75 | | | $h_3$ | 0.614 | $h_4$ | 2.37 |
| $i_1$ | −0.0023 | | | $i_3$ | 0.144 | $i_4$ | 2.08 |
| $j_1$ | 1.86 | | | $j_3$ | 0.338 | $j_4$ | 0.974 |
| $k_1$ | −0.85 | | | $k_3$ | 3.13E−05 | $k_4$ | 0.0975 |
| $l_1$ | −0.4 | | | $l_3$ | 0.498 | $l_4$ | 1.1 |
| $m_1$ | 0.03 | | | $m_3$ | −0.036 | $m_4$ | −0.11 |
| $n_1$ | −0.61 | | | $n_3$ | −0.0542 | $n_4$ | 0.666 |
| $o_1$ | −0.623 | | | $o_3$ | 5.46E−04 | $o_4$ | 2.04 |
| $p_1$ | −0.038 | | | $p_3$ | 1.47 | $p_4$ | −0.546 |
| $q_1$ | −0.604 | | | | | $q_4$ | 1.9 |
| | | | | | | $r_4$ | 0.348 |
| | | | | | | $s_4$ | 0.216 |
| | | | | | | $t_4$ | 0.562 |
| | | | | | | $u_4$ | 0.225 |
| | | | | | | $v_4$ | 0.199 |
| | | | | | | $w_4$ | 0.727 |
| | | | | | | $x_4$ | 0.115 |

By substituting numerical values obtained through CAE analysis into the above Expressions (10) to (13),
the fracture determination threshold $\varepsilon_{1(CAE)}^{*}=0.4632$ was obtained.

(Stretch Flange Crack Prediction)

Since 0.57 as the maximum major strain $\varepsilon_{(CAE)}$ of the maximum major strain maximum element α obtained through the CAE analysis was higher than 0.4632 as the fracture determination threshold $\varepsilon_{1(CAE)}^{*}$, it was predicted that "stretch flange cracks will be initiated" in this saddle-shaped molded product.

The same test was conducted with varying flange heights H. The results are shown in Table 4.

TABLE 4

| H (mm) | ① $\varepsilon_{(CAE)}$ | ② $\varepsilon_1^{*}{}_{(CAE)}$ | ③ $\varepsilon_1^{*}{}_{(exp)}$ | ① ≥ ②? (Example) | ① ≥ ③? (Comparative Example) | Results |
|---|---|---|---|---|---|---|
| 20 | 0.57 | 0.4632 | 0.3969 | Cracks present | Cracks present | Cracks present |
| 19 | 0.54 | 0.4624 | 0.3960 | Cracks present | Cracks present | Cracks present |
| 18 | 0.51 | 0.4616 | 0.3954 | Cracks present | Cracks present | Cracks present |
| 17 | 0.48 | 0.4608 | 0.3949 | Cracks present | Cracks present | Cracks present |
| 16 | 0.45 | 0.4598 | 0.3942 | Cracks absent | Cracks present | Cracks absent |
| 15 | 0.42 | 0.4592 | 0.3936 | Cracks absent | Cracks present | Cracks absent |
| 14 | 0.39 | 0.4587 | 0.3931 | Cracks absent | Cracks absent | Cracks absent |

As shown in Table 4, according to the example in which prediction of stretch flange cracks was performed by using the fracture determination threshold $\varepsilon_{1(CAE)}^{*}$ as a threshold, a portion which will be fractured and a portion which will not be fractured during stretch flange forming of the cold rolled steel sheet could be produced with higher accuracy than that of a comparative example in which the fracture strain measurement value $\varepsilon_{1(exp)}^{*}$ was a threshold.

(Fracture Determination Threshold Acquisition 2)

A strain distribution obtained from each side bend test piece was approximated by using the following Expressions (14) and (15). These expressions are specific examples of Expression (9) in the first embodiment.

$$\varepsilon_N = \frac{\varepsilon_0}{\tanh(B_N \cdot C_N)+1}[\tanh\{(B_N - x_N) \times C_N\} + 1] \quad \text{Expression (14)}$$

$$\varepsilon_C = \frac{\varepsilon_0}{\tanh(B_C \cdot C_C)+1}[\tanh\{(B_C - x_C) \times C_C\} + 1] \quad \text{Expression (15)}$$

Strain distribution parameters obtained under the experimental measurement environment (0.1 mm pitch) are shown in Table 5.

TABLE 5

| Test piece type | $\varepsilon_0$ | $B_N$ | $C_N$ | $B_C$ | $C_C$ |
|---|---|---|---|---|---|
| 1 | 0.447 | 1.00 | 0.0119 | 1.00 | 0.0984 |
| 2 | 0.462 | 1.00 | 0.0101 | 1.00 | 0.0132 |
| 3 | 0.480 | 1.00 | 0.0481 | 1.00 | 0.0894 |
| 4 | 0.477 | 1.00 | 0.0323 | 1.00 | 0.0402 |
| 5 | 0.502 | 1.00 | 0.0737 | 1.00 | 0.105 |
| 6 | 0.513 | 1.00 | 0.0630 | 1.00 | 0.0132 |

Strain distributions obtained from the parameters were processed into data points under the CAE analysis measurement environment (2.0 mm pitch). The strain distributions after being processed are shown in FIGS. 21A to 21F and 22A to 22F.

Figure 23:
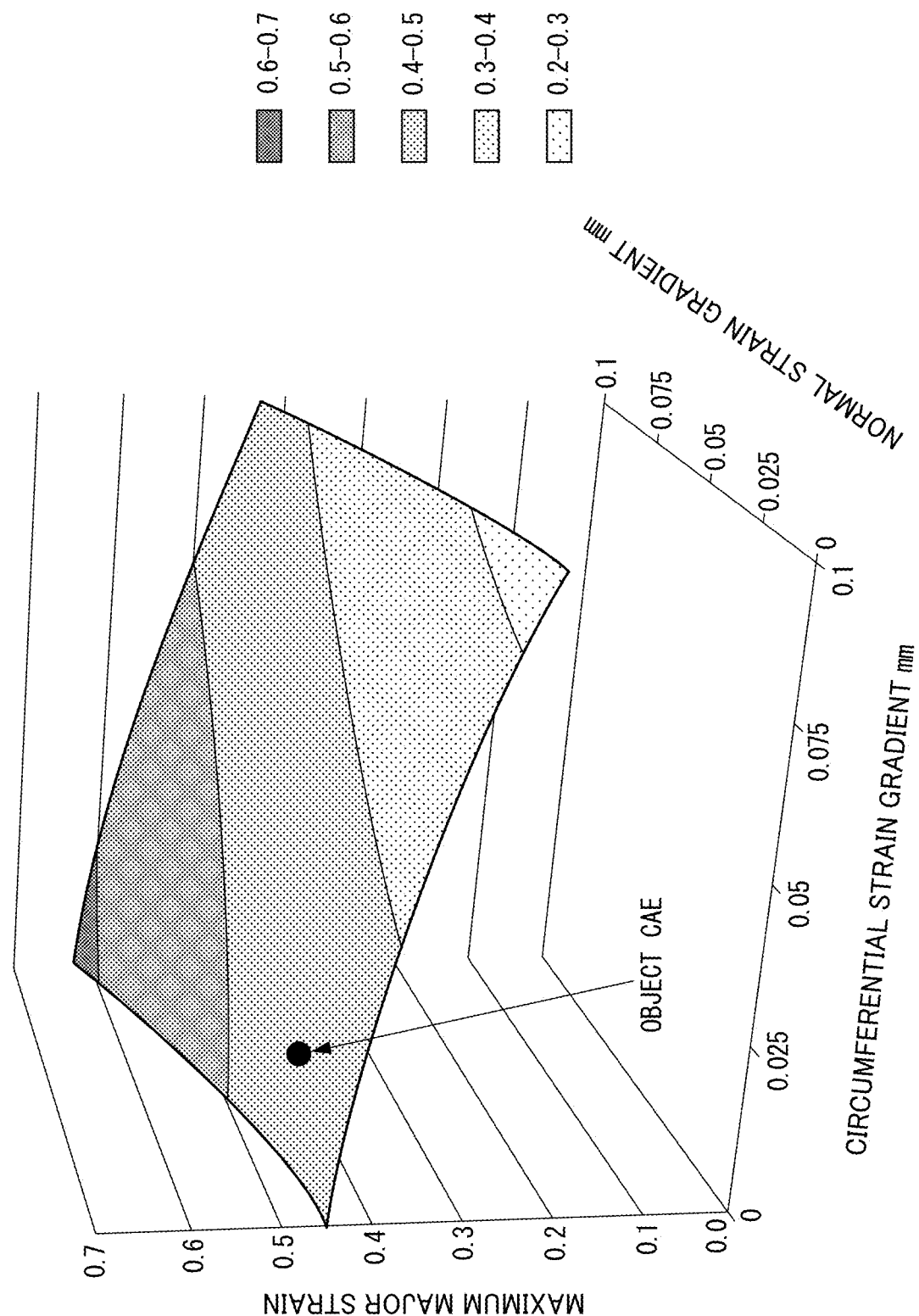
FIG. 23 is a view illustrating a stretch flange crack determination curved surface created on the basis of the diagrams of strain distributions after being processed.

A stretch flange crack determination curved surface obtained by using a response surface methodology method on the basis of the strain distributions after being processed is shown in FIG. 23, and this is represented by the following expression:

$$\varepsilon_{1(CAE)}^{*}=0.454+5.26 \times \Delta\varepsilon_{N(CAE)}^{1.5}-5.93 \times \Delta\varepsilon_{C(CAE)}^{1.5}.$$

When the numerical values are substituted into the above Expressions (14) and (15), the following is obtained:

the fracture determination threshold $\varepsilon_{1(CAE)}^{*}=0.454+5.26\times0.0236^{1.5}-5.93\times0.0153^{1.5}=0.462$.

(Stretch Flange Crack Prediction)

Since 0.57 as the maximum major strain $\varepsilon_{(CAE)}$ of the maximum major strain maximum element α obtained through the CAE analysis was higher than the fracture determination threshold $\varepsilon_{1(CAE)}^{*}$, it was predicted that "stretch flange cracks will be initiated" in this saddle-shaped molded product.

The same test was conducted with varying flange heights H. The results are shown in Table 6.

TABLE 6

| H (mm) | ① $\varepsilon_{(CAE)}$ | ② $\varepsilon_1^{*}{}_{(CAE)}$ | ③ $\varepsilon_1^{*}{}_{(exp)}$ | ① ≥ ②? (Example) | ① ≥ ③? (Comparative Example) | Results |
|---|---|---|---|---|---|---|
| 20 | 0.57 | 0.4630 | 0.3969 | Cracks present | Cracks present | Cracks present |
| 19 | 0.54 | 0.4619 | 0.3960 | Cracks present | Cracks present | Cracks present |
| 18 | 0.51 | 0.4610 | 0.3954 | Cracks present | Cracks present | Cracks present |
| 17 | 0.48 | 0.4599 | 0.3949 | Cracks present | Cracks present | Cracks present |
| 16 | 0.45 | 0.4590 | 0.3942 | Cracks absent | Cracks present | Cracks absent |
| 15 | 0.42 | 0.4584 | 0.3936 | Cracks absent | Cracks present | Cracks absent |
| 14 | 0.39 | 0.4581 | 0.3931 | Cracks absent | Cracks absent | Cracks absent |

As shown in Table 6, according to the example in which prediction of stretch flange cracks was performed by using the fracture determination threshold $\varepsilon_{1(CAE)}^{*}$ as a threshold, a portion which will be fractured and a portion which will not be fractured during stretch flange forming of the cold rolled steel sheet could be produced with higher accuracy than that of the comparative example in which the fracture strain measurement value $\varepsilon_{1(exp)}^{*}$ was a threshold.

INDUSTRIAL APPLICABILITY

As described above, according to the present invention, a portion which will be fractured and a portion which will not be fractured during stretch flange forming of a deformable sheet can be accurately predicted.

BRIEF DESCRIPTION OF THE REFERENCE SYMBOLS 1 (1a, 1b, 1c, 1d, 1e, 1f): SHEET-SHAPED TEST PIECE
6 (6a, 6b, 6c, 6d, 6e, 6f): NOTCH
6': ADJUSTMENT NOTCH
10: SIDE BEND TESTER
12: ARM
13: AXIS
14: BASE
15: HYDRAULIC CYLINDER
17: IMAGE CAPTURING DEVICE
18: BOLT
19: HOLDING PORTION
100: STRETCH FLANGE CRACK PREDICTION APPARATUS
101: MEASUREMENT VALUE ACQUISITION UNIT
102: CAE ANALYSIS UNIT
103: FRACTURE DETERMINATION THRESHOLD ACQUISITION UNIT
104: PREDICTION UNIT

The invention claimed is:

1. A stretch flange crack prediction method of predicting initiation of stretch flange cracks that occurs in a flange end section during stretch flange forming of a deformable sheet, comprising:
   a measurement value acquisition process of acquiring, for each of a plurality of sheet-shaped test pieces, under an experimental measurement environment with a predetermined gauge length and a predetermined gradient evaluation length,
      a fracture strain measurement value,
      a normal strain gradient measurement value, and
      a circumferential strain gradient measurement value;
   performing a CAE analysis process by performing numerical analysis by a finite element method of a stretch flange forming process of the deformable sheet to obtain forming data regarding the flange end section, under a CAE analysis measurement environment with a predetermined element size and a predetermined gradient evaluation length, and acquiring, on the basis of the numerical analysis,
      a maximum major strain maximum element having a highest maximum major strain,
      a normal strain gradient of the maximum major strain maximum element, and
      a circumferential strain gradient of the maximum major strain maximum element;
   a fracture determination threshold acquisition process of acquiring a fracture determination threshold by converting the fracture strain measurement value obtained by the measurement value acquisition process within the experimental measurement environment, on the basis of, in addition to the normal strain gradient measurement value and the circumferential strain gradient measurement value,
      the element size,
      the gradient evaluation length,
      the normal strain gradient, and
      the circumferential strain gradient,
   obtained in the CAE analysis process; and
   a prediction process of predicting that stretch flange cracks will be initiated, when the maximum major strain is equal to or higher than the fracture determination threshold by comparing
      the maximum major strain of the maximum major strain maximum element and
      the fracture determination threshold
   to each other.

2. The stretch flange crack prediction method according to claim 1, further comprising:
   a fracture strain function acquisition process of acquiring a fracture strain function to define a fracture strain, using the normal strain gradient and the circumferential strain gradient as variables, on the basis of
      the fracture strain measurement value,
      the normal strain gradient measurement value, and
      the circumferential strain gradient measurement value
   obtained in the measurement value acquisition process,
   wherein, in the fracture determination threshold acquisition process, the fracture determination threshold is acquired by converting the fracture strain value according to the CAE analysis measurement environment on the basis of the following Expressions (1) to (4), $$\varepsilon_{1(CAE)}^* = f(\varepsilon_{1(exp)}^*, GL, L_{s(exp)}, \Delta\varepsilon_{N(exp)}, \Delta\varepsilon_{C(exp)}, ES, L_{s(CAE)}, \Delta\varepsilon_{N(CAE)}, \Delta\varepsilon_{C(CAE)}) \quad \text{Expression (1)}$$

$$\varepsilon_{1(exp)}^* = f(\Delta\varepsilon_{N(exp)}, \Delta\varepsilon_{C(exp)}) \quad \text{Expression (2)}$$

$$\Delta\varepsilon_{N(exp)} = f(GL, L_{s(exp)}, \Delta\varepsilon_{C(exp)}, \varepsilon_{(CAE)}, ES, L_{s(CAE)}, \Delta\varepsilon_{N(CAE)}, \Delta\varepsilon_{C(CAE)}) \quad \text{Expression (3)}$$

$$\Delta\varepsilon_{C(exp)} = f(GL, L_{s(exp)}, \Delta\varepsilon_{N(exp)}, \varepsilon_{(CAE)}, ES, L_{s(CAE)}, \Delta\varepsilon_{N(CAE)}, \Delta\varepsilon_{C(CAE)}) \quad \text{Expression (4)}$$

here, $\varepsilon_{1(CAE)}^*$ is the fracture determination threshold, $\varepsilon_{1(exp)}$ is the fracture strain measurement value acquired in the measurement value acquisition process, GL is the gauge length used in the measurement value acquisition process, $L_{S(exp)}$ is the gradient evaluation length used in the measurement value acquisition process, $\Delta\varepsilon_{N(exp)}$ is the normal strain gradient measurement value acquired in the measurement value acquisition process, $\Delta\varepsilon_{C(exp)}$ is the circumferential strain gradient measurement value acquired in the measurement value acquisition process, $\varepsilon_{(CAE)}$ is the maximum major strain of the maximum major strain maximum element, ES is the element size used in the CAE analysis process, $L_{S(CAE)}$ is the gradient evaluation length used in the CAE analysis process, $\Delta\varepsilon_{N(CAE)}$ is the normal strain gradient acquired in the CAE analysis process, and $\Delta\varepsilon_{C(CAE)}$ is the circumferential strain gradient acquired in the CAE analysis process.

3. The stretch flange crack prediction method according to claim 1, further comprising:

a fracture strain function acquisition process of acquiring a fracture strain function to define a fracture strain, using the normal strain gradient and the circumferential strain gradient as variables, on the basis of the fracture strain measurement value, the normal strain gradient measurement value, and the circumferential strain gradient measurement value obtained in the measurement value acquisition process, wherein, in the fracture determination threshold acquisition process, the fracture determination threshold is acquired by converting the fracture strain value according to the CAE analysis measurement environment on the basis of the following Expressions (5) to (8), $$\varepsilon_{1(CAE)}^* = f(\varepsilon_{1(exp)}^*, GL, L_{s(exp)}, \Delta\varepsilon_{N(exp)}, \Delta\varepsilon_{C(exp)}, ES, L_{s(CAE)}, \Delta\varepsilon_{N(CAE)}, \Delta\varepsilon_{C(CAE)}) \quad \text{Expression (5)}$$

$$\varepsilon_{1(exp)}^* = f(\Delta\varepsilon_{N(exp)}, \Delta\varepsilon_{C(exp)}, Cl_{(exp)}, Cl_{(CAE)}) \quad \text{Expression (6)}$$

$$\Delta\varepsilon_{N(exp)} = f(GL, L_{s(exp)}, \Delta\varepsilon_{C(exp)}, \varepsilon_{(CAE)}, ES, L_{s(CAE)}, \Delta\varepsilon_{N(CAE)}, \Delta\varepsilon_{C(CAE)}) \quad \text{Expression (7)}$$

$$\Delta\varepsilon_{C(exp)} = f(GL, L_{s(exp)}, \Delta\varepsilon_{N(exp)}, \varepsilon_{(CAE)}, ES, L_{s(CAE)}, \Delta\varepsilon_{N(CAE)}, \Delta\varepsilon_{C(CAE)}) \quad \text{Expression (8)}$$

here, $\varepsilon_{1(CAE)}^*$ is the fracture determination threshold, $\varepsilon_{1(exp)}$ is the fracture strain measurement value acquired in the measurement value acquisition process, GL is the gauge length used in the measurement value acquisition process, $L_{S(exp)}$ is the gradient evaluation length used in the measurement value acquisition process, $Cl_{(exp)}$ is a processing condition when the sheet-shaped test pieces are obtained, $\Delta\varepsilon_{N(exp)}$ is the normal strain gradient measurement value acquired in the measurement value acquisition process, $\Delta\varepsilon_{C(exp)}$ is the circumferential strain gradient measurement value acquired in the measurement value acquisition process, $\varepsilon_{(CAE)}$ is the maximum major strain of the maximum major strain maximum element, ES is the element size used in the CAE analysis process, $L_{S(CAE)}$ is the gradient evaluation length used in the CAE analysis process, $Cl_{(CAE)}$ is a processing condition when the deformable sheet is obtained, $\Delta\varepsilon_{N(CAE)}$ is the normal strain gradient acquired in the CAE analysis process, and $\Delta\varepsilon_{C(CAE)}$ is the circumferential strain gradient acquired in the CAE analysis process.

4. The stretch flange crack prediction method according to claim 1, further comprising:

a strain distribution data acquisition process of acquiring, for each of the plurality of sheet-shaped test pieces, strain distribution data representing a correlation among the fracture strain measurement value, the normal strain gradient measurement value, and the circumferential strain gradient measurement value obtained in the measurement value acquisition process, wherein, in the fracture determination threshold acquisition process, the strain distribution data is processed based on the CAE analysis process, a fracture determination curved surface is generated by using the processed strain distribution data, and the fracture determination threshold is acquired from the fracture determination curved surface.

5. The stretch flange crack prediction method according to claim 4, wherein, in the fracture determination threshold acquisition process, a strain distribution function of the following Expression (9) is used to determine the strain distribution data, $$\varepsilon = f(B_N, C_N, B_C, C_C, \varepsilon_0) \quad \text{Expression (9)}$$

here, $\varepsilon$ is the strain distribution data, $\varepsilon_0$ is the maximum major strain, $B_N$ is a material parameter representing a broadening size of the vicinity of a peak in a normal direction, $C_N$ is a material parameter representing a severity of a gradient in the normal direction, $B_C$ is a material parameter representing a broadening size of the vicinity of a peak in a circumferential direction, and $C_C$ is a material parameter representing a severity of a gradient in the circumferential direction.

6. The stretch flange crack prediction method according to claim 1, further comprising:

a strain distribution data acquisition process of acquiring, for each of the plurality of sheet-shaped test pieces, strain distribution data representing a correlation among the fracture strain measurement value, the normal strain gradient measurement value, and the circumferential strain gradient measurement value obtained in the measurement value acquisition process by using a plurality of sheet-shaped test pieces processed under a plurality of test piece processing conditions as the plurality of sheet-shaped test pieces, wherein, in the fracture determination threshold acquisition process,
the strain distribution data under the test piece processing conditions according to the CAE analysis measurement environment is processed based on the CAE analysis process,
a fracture determination curved surface is generated by using the processed strain distribution data, and
the fracture determination threshold is acquired from the fracture determination curved surface.

7. The stretch flange crack prediction method according to claim 1,
wherein the plurality of sheet-shaped test pieces have end sections with notches having different shapes, and
in the measurement value acquisition process, for each of the plurality of sheet-shaped test pieces,
the fracture strain measurement value,
the normal strain gradient measurement value, and
the circumferential strain gradient measurement value
are measured and acquired while causing each of the plurality of sheet-shaped test pieces to fracture by applying in-plane tensile deformation and bending deformation so as to cause the notch to become a fractured portion.

8. The stretch flange crack prediction method according to claim 7,
wherein the shapes of the notches formed in the plurality of sheet-shaped test pieces include at least
a first notch shape having a relatively low normal strain gradient and a relatively low circumferential strain gradient,
a second notch shape having a relatively high normal strain gradient and a relatively high circumferential strain gradient,
a third notch shape having a relatively high normal strain gradient and a relatively low circumferential strain gradient, and
a fourth notch shape having a relatively low normal strain gradient and a relatively high circumferential strain gradient,
wherein the relatively low normal strain gradient is one in which a slope of a straight line fitted by a method of least squares to data points of the normal strain gradient is lower than an average value of all the plurality of sheet-shaped test pieces, and
wherein the relatively high normal strain gradient is one in which a slope of a straight line fitted by the method of least squares to data points of the normal strain gradient is higher than the average value of all the plurality of sheet-shaped test pieces.

9. The stretch flange crack prediction method according to claim 1,
wherein the fracture strain measurement value is a measurement value of a fracture strain at a fractured portion of the sheet-shaped test piece,
the normal strain gradient measurement value is a measurement value of a strain gradient in an inward direction in the sheet-shaped test piece from the fractured portion, and
the circumferential strain gradient measurement value is a measurement value of a strain gradient in a direction along the end section of the sheet-shaped test piece from the fractured portion.

10. The stretch flange crack prediction method according to claim 1,
wherein the CAE analysis process includes:
an element extraction process of extracting the maximum major strain maximum element having the maximum major strain from the forming data;
an element array specification process of specifying, by using the maximum major strain maximum element as a reference element, an element array directed toward an inside of the deformable sheet from the flange end section and an element array along the flange end section, on the basis of an element selection algorithm; and
a strain gradient calculation process of calculating, for the specified element array, the normal strain gradient of the maximum major strain maximum element and the circumferential strain gradient of the maximum major strain maximum element.

11. A stretch flange crack prediction apparatus for predicting initiation of stretch flange cracks that occurs in a flange end section during stretch flange forming of a deformable sheet, comprising:
a measurement value acquisition unit which acquires, for each of a plurality of sheet-shaped test pieces, under an experimental measurement environment with a predetermined gauge length and a predetermined gradient evaluation length,
a fracture strain measurement value,
a normal strain gradient measurement value, and
a circumferential strain gradient measurement value;
a CAE analysis unit which performs by numerical analysis by a finite element method of a stretch flange forming process of the deformable sheet obtaining forming data regarding the flange end section, under a CAE analysis measurement environment with a predetermined element size and a predetermined gradient evaluation length, and acquires, on the basis of the numerical analysis,
a maximum major strain maximum element having a highest maximum major strain,
a normal strain gradient of the maximum major strain maximum element, and
a circumferential strain gradient of the maximum major strain maximum element;
a fracture determination threshold acquisition unit which acquires a fracture determination threshold by converting the fracture strain measurement value obtained by the measurement value acquisition unit within the experimental measurement environment, on the basis of, in addition to the normal strain gradient measurement value and the circumferential strain gradient measurement value,
the element size,
the gradient evaluation length,
the normal strain gradient, and
the circumferential strain gradient
obtained in the CAE analysis unit; and
a prediction unit which predicts that stretch flange cracks will be initiated, when the maximum major strain is equal to or higher than the fracture determination threshold by comparing
the maximum major strain of the maximum major strain maximum element and
the fracture determination threshold
to each other.

12. The stretch flange crack prediction apparatus according to claim 11, further comprising:
a fracture strain function acquisition unit which acquires a fracture strain function to define a fracture strain, using the normal strain gradient and the circumferential strain gradient as variables, on the basis of
the fracture strain measurement value,
the normal strain gradient measurement value, and
the circumferential strain gradient measurement value
obtained by the measurement value acquisition unit,
wherein the fracture determination threshold acquisition unit acquires the fracture determination threshold by converting the fracture strain value according to the CAE analysis measurement environment on the basis of the following Expressions (1) to (4), $$\varepsilon_{1(CAE)}{}^*=f(\varepsilon_{1(exp)}{}^*,GL,L_{s(exp)},\Delta\varepsilon_{N(exp)},\Delta\varepsilon_{C(exp)},ES,L_{s(CAE)},\Delta\varepsilon_{N(CAE)},\Delta\varepsilon_{C(CAE)}) \quad \text{Expression (1)}$$

$$\varepsilon_{1(exp)}{}^*=f(\Delta\varepsilon_{N(exp)},\Delta\varepsilon_{C(exp)}) \quad \text{Expression (2)}$$

$$\Delta\varepsilon_{N(exp)}=f(GL,L_{s(exp)},\Delta\varepsilon_{C(exp)},\varepsilon_{(CAE)},ES,L_{s(CAE)},\Delta\varepsilon_{N(CAE)},\Delta\varepsilon_{C(CAE)}) \quad \text{Expression (3)}$$

$$\Delta\varepsilon_{C(exp)}=f(GL,L_{s(exp)},\Delta\varepsilon_{N(exp)},\varepsilon_{(CAE)},ES,L_{s(CAE)},\Delta\varepsilon_{N(CAE)},\Delta\varepsilon_{C(CAE)}) \quad \text{Expression (4)}$$

here, $\varepsilon_{1(CAE)}{}^*$ is the fracture determination threshold, $\varepsilon_{1(exp)}{}^*$ is the fracture strain measurement value acquired in the measurement value acquisition unit, GL is the gauge length used in the measurement value acquisition process, $L_{S(exp)}$ is the gradient evaluation length used in the measurement value acquisition unit, $\Delta\varepsilon_{N(exp)}$ is the normal strain gradient measurement value acquired in the measurement value acquisition unit, $\Delta\varepsilon_{C(exp)}$ is the circumferential strain gradient measurement value acquired in the measurement value acquisition unit, $\varepsilon_{(CAE)}$ is the maximum major strain of the maximum major strain maximum element, ES is the element size used in the CAE analysis unit, $L_{S(CAE)}$ is the gradient evaluation length used in the CAE analysis unit, $\Delta\varepsilon_{N(CAE)}$ is the normal strain gradient acquired in the CAE analysis unit, and $\Delta\varepsilon_{C(CAE)}$ is the circumferential strain gradient acquired in the CAE analysis unit.

13. The stretch flange crack prediction apparatus according to claim 11, further comprising:
a fracture strain function acquisition unit which acquires a fracture strain function to define a fracture strain, using the normal strain gradient and the circumferential strain gradient as variables, on the basis of
the fracture strain measurement value,
the normal strain gradient measurement value, and
the circumferential strain gradient measurement value
obtained by the measurement value acquisition unit,
wherein the fracture determination threshold acquisition unit acquires the fracture determination threshold by converting the fracture strain value according to the CAE analysis measurement environment on the basis of the following Expressions (5) to (8), $$\varepsilon_{1(CAE)}{}^*=f(\varepsilon_{1(exp)}{}^*,GL,L_{s(exp)},\Delta\varepsilon_{N(exp)},\Delta\varepsilon_{C(exp)},ES,L_{s(CAE)},\Delta\varepsilon_{N(CAE)},\Delta\varepsilon_{C(CAE)}) \quad \text{Expression (5)}$$

$$\varepsilon_{1(exp)}{}^*=f(\Delta\varepsilon_{N(exp)},\Delta\varepsilon_{C(exp)},Cl_{(exp)},Cl_{(CAE)}) \quad \text{Expression (6)}$$

$$\Delta\varepsilon_{N(exp)}=f(GL,L_{s(exp)},\Delta\varepsilon_{C(exp)},\varepsilon_{(CAE)},ES,L_{s(CAE)},\Delta\varepsilon_{N(CAE)},\Delta\varepsilon_{C(CAE)}) \quad \text{Expression (7)}$$

$$\Delta\varepsilon_{C(exp)}=f(GL,L_{s(exp)},\Delta\varepsilon_{N(exp)},\varepsilon_{(CAE)},ES,L_{s(CAE)},\Delta\varepsilon_{N(CAE)},\Delta\varepsilon_{C(CAE)}) \quad \text{Expression (8)}$$

here, $\varepsilon_{1(CAE)}{}^*$ is the fracture determination threshold, $\varepsilon_{1(exp)}{}^*$ is the fracture strain measurement value acquired in the measurement value acquisition process, GL is the gauge length used in the measurement value acquisition process, $L_{S(exp)}$ is the gradient evaluation length used in the measurement value acquisition process, $Cl_{(exp)}$ is a processing condition when the sheet-shaped test pieces are obtained, $\Delta\varepsilon_{N(exp)}$ is the normal strain gradient measurement value acquired in the measurement value acquisition process, $\Delta\varepsilon_{C(exp)}$ is the circumferential strain gradient measurement value acquired in the measurement value acquisition process, $\varepsilon_{(CAE)}$ is the maximum major strain of the maximum major strain maximum element, ES is the element size used in the CAE analysis unit, $LS_{(CAE)}$ is the gradient evaluation length used in the CAE analysis unit, $Cl_{(CAE)}$ is a processing condition when the deformable sheet is obtained, $\Delta\varepsilon_{N(CAE)}$ is the normal strain gradient acquired by the CAE analysis unit, and $\Delta\varepsilon_{C(CAE)}$ is the circumferential strain gradient acquired by the CAE analysis unit.

14. The stretch flange crack prediction apparatus according to claim 11, further comprising:
a strain distribution data acquisition unit which acquires, for each of the plurality of sheet-shaped test pieces, strain distribution data representing a correlation among
the fracture strain measurement value,
the normal strain gradient measurement value, and
the circumferential strain gradient measurement value
obtained by the measurement value acquisition unit,
wherein the fracture determination threshold acquisition unit
processes the strain distribution data based on the CAE analysis process,
generates a fracture determination curved surface by using the processed strain distribution data, and
acquires the fracture determination threshold from the fracture determination curved surface.

15. The stretch flange crack prediction apparatus according to claim 14,
wherein the fracture determination threshold acquisition unit uses a strain distribution function of the following Expression (9) to determine the strain distribution data, $$\varepsilon=f(B_N,C_N,B_C,C_C,\varepsilon_0) \quad \text{Expression (9)}$$

here, $\varepsilon$ is the strain distribution data, $\varepsilon_0$ is the maximum major strain, $B_N$ is a material parameter representing a broadening size of the vicinity of a peak in a normal direction, $C_N$ is a material parameter representing a severity of a gradient in the normal direction, $B_C$ is a material parameter representing a broadening size of the vicinity of a peak in a circumferential direction, and $C_C$ is a material parameter representing a severity of a gradient in the circumferential direction.

16. The stretch flange crack prediction apparatus according to claim 11, further comprising:
a strain distribution data acquisition unit which acquires, for each of the plurality of sheet-shaped test pieces, strain distribution data representing a correlation among the fracture strain measurement value,
the normal strain gradient measurement value, and
the circumferential strain gradient measurement value
obtained by the measurement value acquisition unit by using a plurality of sheet-shaped test pieces processed under a plurality of test piece processing conditions as the plurality of sheet-shaped test pieces,
wherein the fracture determination threshold acquisition unit
based on the CAE analysis process, processes the strain distribution data under the test piece processing conditions according to the CAE analysis measurement environment,
generates a fracture determination curved surface by using the processed strain distribution data, and
acquires the fracture determination threshold from the fracture determination curved surface.

17. The stretch flange crack prediction apparatus according to claim 11,
wherein the plurality of sheet-shaped test pieces have end sections with notches having different shapes, and
the measurement value acquisition unit measures and acquires, for each of the plurality of sheet-shaped test pieces,
the fracture strain measurement value,
the normal strain gradient measurement value, and
the circumferential strain gradient measurement value
while causing each of the plurality of sheet-shaped test pieces to fracture by applying in-plane tensile deformation and bending deformation so as to cause the notch to become a fractured portion.

18. The stretch flange crack prediction apparatus according to claim 17,
wherein the shapes of the notches formed in the plurality of sheet-shaped test pieces include at least
a first notch shape having a relatively low normal strain gradient and a relatively low circumferential strain gradient,
a second notch shape having a relatively high normal strain gradient and a relatively high circumferential strain gradient,
a third notch shape having a relatively high normal strain gradient and a relatively low circumferential strain gradient, and
a fourth notch shape having a relatively low normal strain gradient and a relatively high circumferential strain gradient.

19. The stretch flange crack prediction apparatus according to claim 11,
wherein the fracture strain measurement value is a measurement value of a fracture strain at a fractured portion of the sheet-shaped test piece,
the normal strain gradient measurement value is a measurement value of a strain gradient in an inward direction in the sheet-shaped test piece from the fractured portion, and
the circumferential strain gradient measurement value is a measurement value of a strain gradient in a direction along the end section of the sheet-shaped test piece from the fractured portion.

20. The stretch flange crack prediction apparatus according to claim 11,
wherein the CAE analysis unit includes:
an element extraction unit which extracts the maximum major strain maximum element having the maximum major strain from the forming data;
an element array specification unit which specifies, by using the maximum major strain maximum element as a reference element, an element array directed toward an inside of the deformable sheet from the flange end section and an element array along the flange end section, on the basis of an element selection algorithm; and
a strain gradient calculation unit which calculates, for the specified element array, the normal strain gradient of the maximum major strain maximum element and the circumferential strain gradient of the maximum major strain maximum element.

21. A non-transitory computer readable medium storing a program which causes a stretch flange crack prediction method of predicting initiation of stretch flange cracks that occurs in a flange end section during stretch flange forming of a deformable sheet, comprising:
a measurement value acquisition process of acquiring, for each of a plurality of sheet-shaped test pieces, under an experimental measurement environment with a predetermined gauge length and a predetermined gradient evaluation length,
a fracture strain measurement value,
a normal strain gradient measurement value, and
a circumferential strain gradient measurement value;
performing a CAE analysis process by performing numerical analysis by a finite element method of a stretch flange forming process of the deformable sheet to obtain forming data regarding the flange end section, under a CAE analysis measurement environment with a predetermined element size and a predetermined gradient evaluation length, and acquiring, on the basis of the numerical analysis,
a maximum major strain maximum element having a highest maximum major strain,
a normal strain gradient of the maximum major strain maximum element, and
a circumferential strain gradient of the maximum major strain maximum element;
a fracture determination threshold acquisition process of acquiring a fracture determination threshold by converting the fracture strain measurement value obtained by the measurement value acquisition process within the experimental measurement environment, on the basis of, in addition to the normal strain gradient measurement value and the circumferential strain gradient measurement value,
the element size,
the gradient evaluation length,
the normal strain gradient, and
the circumferential strain gradient,
obtained in the CAE analysis process; and
a prediction process of predicting that stretch flange cracks will be initiated, when the maximum major strain is equal to or higher than the fracture determination threshold by comparing
the maximum major strain of the maximum major strain maximum element and
the fracture determination threshold
to each other,
said method to be executed by the stretch flange crack prediction apparatus according to claim 11.

* * * * *